(12) United States Patent
Ferraris et al.

(10) Patent No.: US 10,046,284 B2
(45) Date of Patent: Aug. 14, 2018

(54) COMPATIBILIZED IMMISCIBLE POLYMER BLENDS AND MOLECULAR SIEVE MEMBRANES THEREOF

(71) Applicant: The Board of Regents of the University of Texas System, Austin, TX (US)

(72) Inventors: John P. Ferraris, Coppell, TX (US); Nimanka Panapitiya, Dallas, TX (US); Sumudu Wijenayake, Dallas, TX (US); Inga H. Musselman, Dallas, TX (US); Chamaal Karunaweera, Richardson, TX (US); Kenneth J. Balkus, Jr., The Colony, TX (US)

(73) Assignee: BOARD OF REGENTS, THE UNIVERSITY OF TEXAS SYSTEM, Austin, TX (US)

(*) Notice: Subject to any disclaimer, the term of this patent is extended or adjusted under 35 U.S.C. 154(b) by 51 days.

(21) Appl. No.: 15/068,314

(22) Filed: Mar. 11, 2016

(65) Prior Publication Data
US 2016/0263534 A1    Sep. 15, 2016

Related U.S. Application Data

(60) Provisional application No. 62/131,577, filed on Mar. 11, 2015.

(51) Int. Cl.
*B01D 53/22*        (2006.01)
*B01D 71/62*        (2006.01)
(Continued)

(52) U.S. Cl.
CPC ........ *B01D 71/62* (2013.01); *B01D 53/228* (2013.01); *B01D 67/0067* (2013.01);
(Continued)

(58) Field of Classification Search
CPC ............ B01D 53/228; B01D 67/0067; B01D 67/0079; B01D 69/148; B01D 71/021;
(Continued)

(56) References Cited

U.S. PATENT DOCUMENTS 4,973,629 A * 11/1990 Williams ............... C08L 79/04
                                                    525/432
5,733,657 A *  3/1998 Macheras ............. B01D 53/228
                                                    210/500.23
(Continued)

OTHER PUBLICATIONS

Panapitiya, Nimanka P. et al., "Gas Separation Membranes from Immiscible Polymer Blends Compatibilized with Small Molecules", Poster Presented at North American Membrane Society 24th Annual Meeting, May 2014.*
(Continued)

*Primary Examiner* — Jason M Greene
(74) *Attorney, Agent, or Firm* — Parker Highlander PLLC

(57) ABSTRACT

In some aspects, the present disclosure provides a polymer composition which comprises two polymer molecules and a compatibilizing agent. In some embodiments, the polymer composition is useful for the preparation of membranes used in the separation of two or more gases. In some embodiments, the polymer composition comprises a polyimide polymer and a polybenzimidazole polymer which have been compatibilizing with a small molecule or a metal organic framework.

21 Claims, 30 Drawing Sheets

(51) Int. Cl.
| | |
|---|---|
| *B01D 71/64* | (2006.01) |
| *B01D 71/02* | (2006.01) |
| *B01D 67/00* | (2006.01) |
| *C08L 79/04* | (2006.01) |
| *C08L 79/08* | (2006.01) |
| *C01B 3/50* | (2006.01) |
| *B01D 69/14* | (2006.01) |

(52) U.S. Cl.
CPC ....... *B01D 67/0079* (2013.01); *B01D 69/148* (2013.01); *B01D 71/021* (2013.01); *B01D 71/028* (2013.01); *B01D 71/64* (2013.01); *C01B 3/503* (2013.01); *C08L 79/04* (2013.01); *C08L 79/08* (2013.01); *B01D 2256/10* (2013.01); *B01D 2256/16* (2013.01); *B01D 2256/22* (2013.01); *B01D 2256/245* (2013.01); *C01B 2203/0405* (2013.01); *C01B 2203/0475* (2013.01)

(58) Field of Classification Search
CPC ...... B01D 71/028; B01D 71/62; B01D 71/64; C08L 79/04; C08L 79/08; C01B 3/503; C01B 2203/0405
See application file for complete search history.

(56) References Cited

U.S. PATENT DOCUMENTS

| | | | | |
|---|---|---|---|---|
| 6,339,121 B1* | 1/2002 | Rafailovich | ............... | C08J 5/18 524/445 |
| 2011/0192281 A1* | 8/2011 | Hosseini | ................ | B01D 71/62 96/10 |

OTHER PUBLICATIONS

Bae et al.,"A high-performance gas-separation membrane containing submicrometer-sized metal-organic framework crystals", *Angew. Chem. Int. Ed.*, 49, 9863-9866, 2010.
Chung et al., "Controlling the location of nanoparticles in polymer blends by tuning the length and end group of polymer brushes", *ACS Macro Letters*, 1, 252-256, 2012.
Chung et al., "Mixed matrix membranes (MMMs) comprising organic polymers with dispersed inorganic fillers for gas separation", *Prog. Polym. Sci.*, 32, 483-507, 2007.
Fenouillot et al., "Uneven distribution of nanoparticles in immiscible fluids: morphology development in polymer blends", *Polymer*, 50:1333e50, 2009.
Goodarzi et al., "Assessment of role of morphology in gas permselectivity of membranes based on polypropylene/ethylene vinyl acetate/clay nanocomposite", *Membr. Sci.*, 445, 76-87, 2013.
Hosseini et al., "Hydrogen separation and purification in membranes of miscible polymer blends with interpenetration networks", *Polymer*, 49, (6), 1594-1603, 2008.
Isayev, *Encyclopedia of polymer blends in Fundamentals*, vol. 1., 2010.
Lively et al., "A high-flux polyimide hollow fiber membrane to minimize footprint and energy penalty for $CO_2$ recovery from flue gas", *J. Membr. Sci.*, 423-424: 302-313, 2012.
Low et al., "Carbon molecular sieve membranes derived from pseudo-interpenetrating polymer networks for gas separation and carbon capture", *Carbon*, 49: 2104-2112, 2011.
Mannan, "Recent applications of polymer blends in gas separation membranes", *Chem Eng Technol.*, 36, 1838-1846, 2013.
Ning and Koros, "Carbon molecular sieve membranes derived from Matrimid® polymide for nitrogen/methane separation", *Carbon*, 66, 511-522, 2014.
Ordonez et al., "Molecular sieving realized with ZIF-8/ Matrimid® mixed-matrix membranes", *J. Membr. Sci.*, 361, 28-37, 2010.
Panapitiya et al., "Gas separation membranes from immiscible polymer blends compatibilized with small molecules", Poster presented at Northe American Membrane Society $24^{th}$ Annual Meeting, May 2014.
Park et al., "Polymers with cavities tuned for fast selective transport of small molecules and ions", *Science*, 318, 254-258, 2007.
Paul, "Creating new types of carbon-based membranes", *Science*, 335, 413, 2012.
Perez et al., "Mixed-matrix membranes containing MOF-5 for gas separations", *J. Membr. Sci.*, 328, 165-173, 2009.
Qiu et al., "Sub-$T_g$ cross-linking of a polyimide membrane for enhanced CO2 plasticization resistance for natural gas separation", *Macromolecules*, 44, 6046-6056, 2011.
Ribeiro et al., "Pure- and mixed-gas carbon dioxide/ethane permeability and diffusivity in a cross-linked poly(ethylene oxide) copolymer", *J. Membr. Sci.*, 377, 110-123, 2011.
Robeson, *J. Membr. Sci.*, "The upper bound revisited", 320, 390-400, 2008.
Robeson, *Polymer Blends: A Comprehensive Review. HANSER*: 2007.
Rungta et al., "Carbon molecular sieve dense film membranes derived from Matrimid® for ethylene/ethane separation", J. *Carbon*, 50, 1488-1502, 2012.
Sakaguchi et al., "Synthesis and properties of F-containing poly (diphenylacetylene) membranes", *Macromolecules*, 38,8327-8332, 2005.
Sanders et al., "Gas permeability, diffusivity, and free volume of thermally rearranged polymers based on 3, 3'-dihydroxy-4, 4'-diamino-biphenyl (HAB) and 2, 2'-bis-(3, 4-dicarboxyphenyl) hexafluoropropane dianhydride (6FDA)", *J. Membr. Sci.*, 409-410, 232-241, 2012.
Semsarzadeh and Ghalei, "Characterization and gas permeability of polyurethane and polyvinyl acetate blend membranes with polyethylene oxide—polypropylene oxide block copolymer", *Membr. Sci.*, 401-402, 97-108, 2012.
Suzuki, et al., "Gas transport properties of 6FDA-TAPOB hyperbranched polyimide membrane", *Polymer*, 45, 7167-7171,2004.
Wijenayake et al., "Surface cross-linking of ZIF-8/polyimide mixed matrix membranes (MMMs) for gas separation", *Ind. Eng. Chem. Res.*, 52, 6991-7001, 2013.
Yang, et al., "Symmetric and asymmetric zeolitic imidazolate frameworks (ZIFs)/polybenzimidazole (PBI) nanocomposite membranes for hydrogen purification at high temperatures", *Adv. Energy Mater.* 2, 1358-1367, 2012.

* cited by examiner

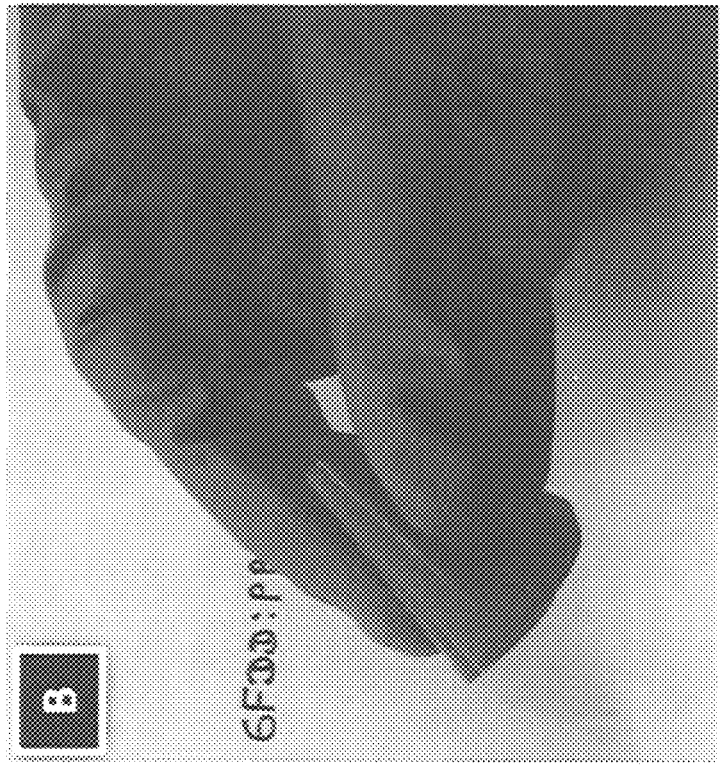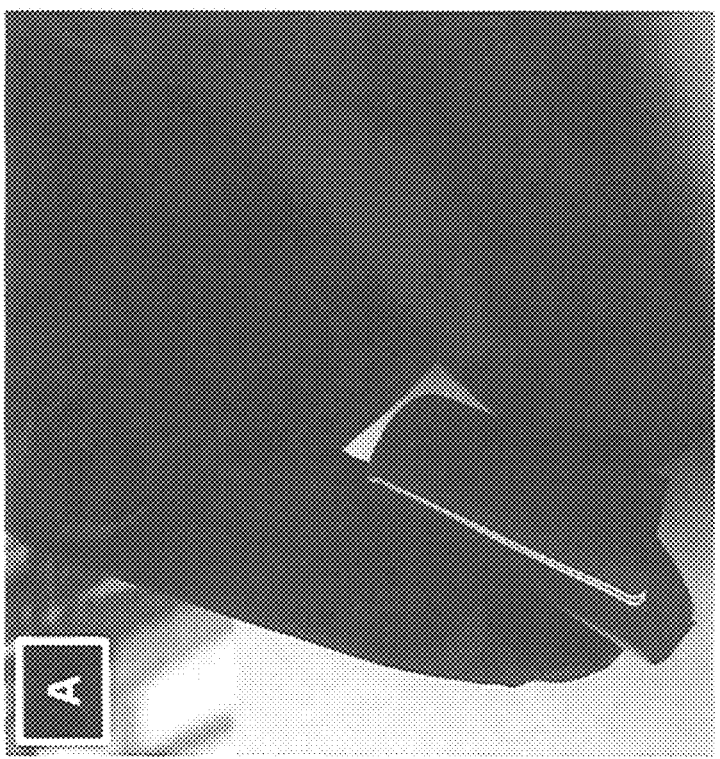
FIGS. 3A-B

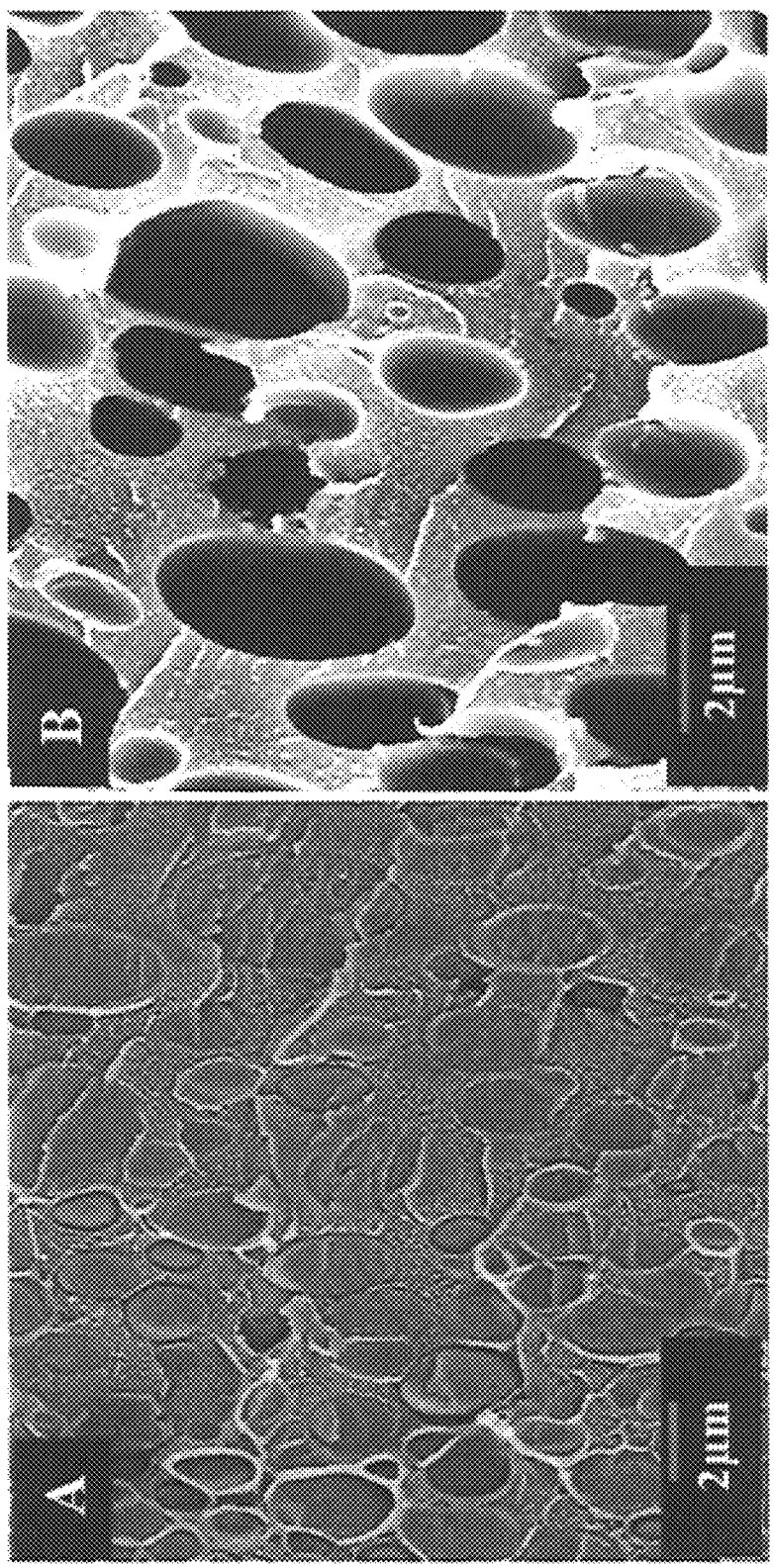
FIGS. 4A-B

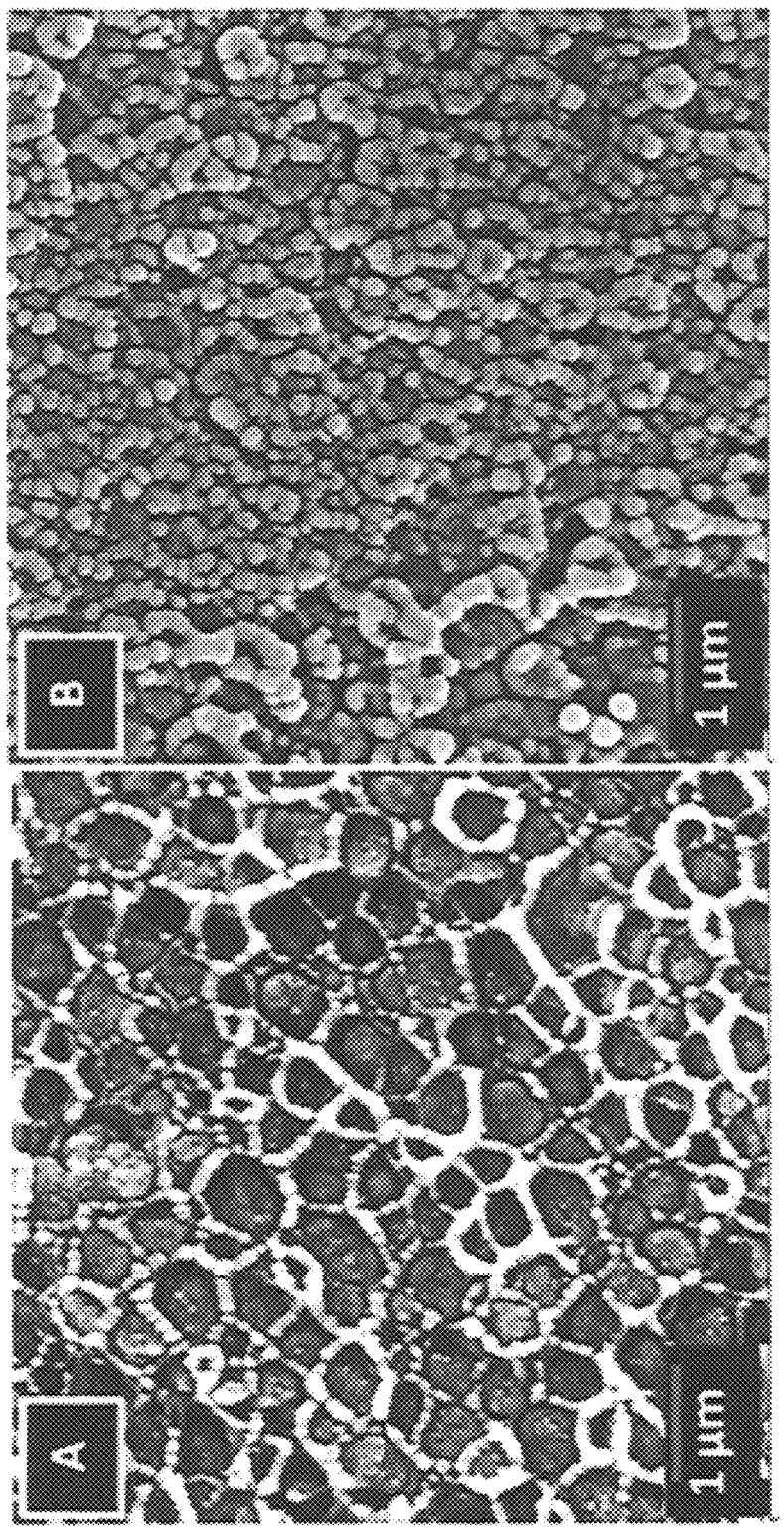
FIGS. 5A-B

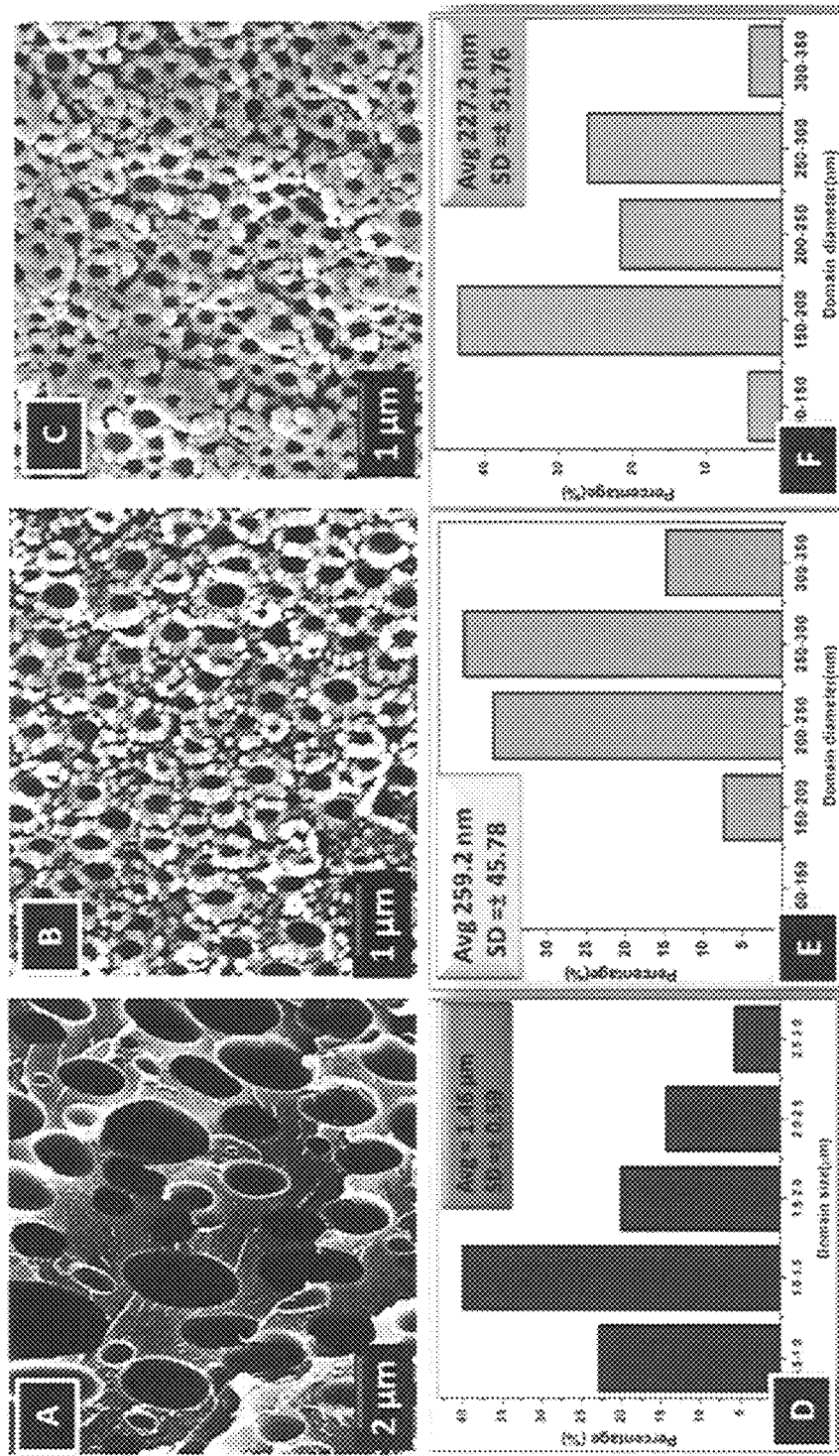
FIGS. 6A-F

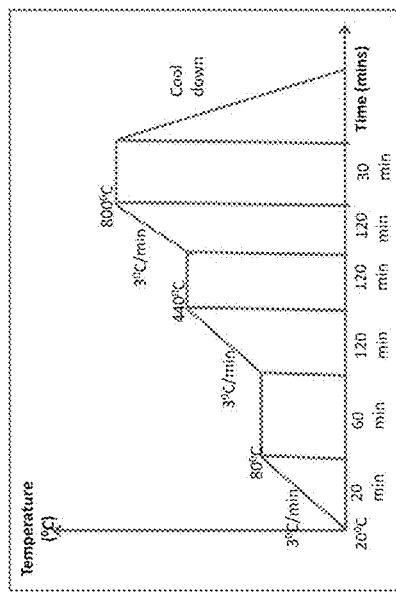
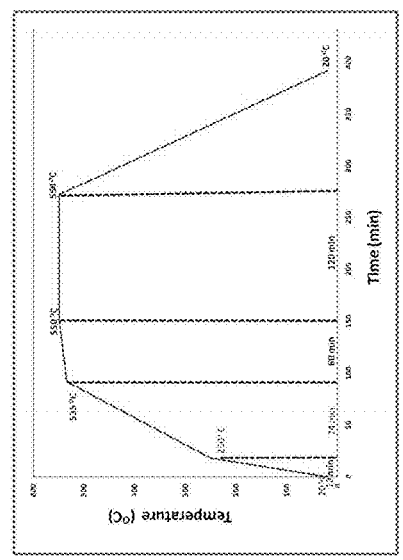
FIGS. 25A & 25B
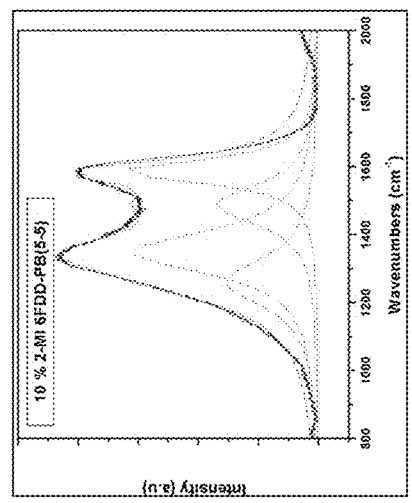
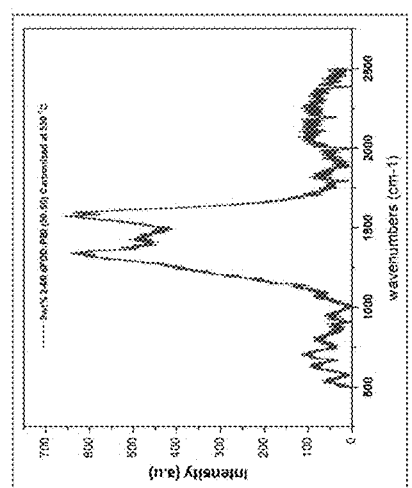
FIGS. 26A & 26B

COMPATIBILIZED IMMISCIBLE POLYMER BLENDS AND MOLECULAR SIEVE MEMBRANES THEREOF

This application claims the benefit of U.S. Provisional Application Ser. No. 62/131,577 filed on Mar. 11, 2015, the entirety of which is incorporated herein by reference.

This invention was made with government support under Grant Number CBET-0933563 awarded by the National Science Foundation, and Grant Number DE-FE0001293, awarded by the Department of Energy. The government has certain rights in the invention.

BACKGROUND

1. Field

The present disclosure generally relates to the fields of polymer materials and gas separation membranes. More specifically, it relates to the polymer blends, which are immiscible before the addition of a compatibilizing agent that are useful for the separation of two or more different gas molecules.

2. Related Art

Membrane technology has become a promising alternative to conventional energy intensive gas separation methods. Membranes are being used commercially, for $H_2$ recovery, $CO_2$ recovery from natural gas and onsite nitrogen production from air (Bernardo et al., 2009; Baker and Lokhandwala, 2008; Baker, 2002; Ma et al., 2013). However, the selectivity/permeability tradeoff of polymer based membranes in gas separations, shown by Robeson (Robeson, 2008; Robeson, 1991), has motivated research to develop membranes that surpass the upper bound (FIG. 1).

Despite the many efforts that have been made to reach the upper bound, including synthesis of new polymers (Sakaguchi et al., 2005; Lively et al., 2012; Sanders et al., 2012; Park et al.), cross-linking of the polymers (Qiuj et al., 2011; Ribeiro et al., 2011; Wijenayake et al., 2013), fabrication of inorganic-organic composite materials (mixed-matrix membranes) (Ordonez et al., 2010; Bae et al., 2010; Perez et al., 2009; Chung et al., 2007), use of polymer blends (Mannan, et al., 2013), and use of carbon molecular sieve membranes (CMSM) (Park et al., 2007; Ning and Koros, 2014; Rungta et al., 2012; Low et al., 2011; Paul, 2012), very few systems have emerged that exceed this now two-decade old limit.

On the other hand, polymer blends of polyimides (PIs) are attractive, since blending can synergistically combine favorable properties of polymers such as high selectivity and high permeability, which cannot be attained with a single polymer (Hosseini et al., 2008). Also, polymer blending is less time consuming and cost effective approach compared to the development of new materials and further it allows changing properties like gas permeability by varying the blend composition. However, due to the unfavorable thermodynamics of mixing (Robeson, 2007; Isayev, 2010), polymers can phase separate and requires compatibilizer to obtain uniform morphologies.

Generally, copolymers (Semsarzadeh et al., 2011) and nanoparticles (Fenouillot et al., 2009; Goodarzi, et al., 2013) are used to compatibilize immiscible polymer blends to obtain uniform microstructures. However, the synthesis of copolymers is tedious and applicability is limited to a single blend (U.S. Pat. No. 6,339,121). Nanoparticles also need synthesis and sometimes chemical modifications (Chung et al., 2012). Given the need for overcoming these obstacles to produce compatibilized immiscible polymer blends, polymers prepared using other compatibilization methods are needed.

Additionally, the polymer blends may be used in the preparation of a gas separation membrane. One important aspect of determining the performance of an immiscible polymer blend based membrane is the blend's morphology (Robeson, 2010). The matrix-droplet type morphology is preferred for membrane transportation over the others, since it can provide a large interfacial area to enhance flux. 6FDA based PI polymers have high gas permeabilities due to high free volume (Suzuki, et al., 2004) while PBI polymers have high selectivity (Yang, et al., 2012). The present disclosure provides the use of small molecules and metal organic frameworks (MOFs) to compatibilize immiscible blends of polybenzimidazole polymers and 6FDA-based co-polyimide (9FDD) polymers to form membranes with a uniform and novel microstructure to improve gas separation performances. These compatibilized immiscible blends may have one or more advantages including the use of small molecules which are commercially available, inexpensive, and easy to use.

By combining both polymers, the resulting membranes possess a unique microstructure containing thin, continuous ribbons in an otherwise noncontinuous polymer matrix. The dispersed, highly permeable phase occupies most of the effective area/volume (dispersed phase) to achieve high flux (FIG. 2) while the continuous phase is composed of PBI to ensure higher selectivity.

SUMMARY

In one aspect, the present disclosure provides compositions comprising a mixture of compounds comprising:

(A) a polyimide polymer of the formula:

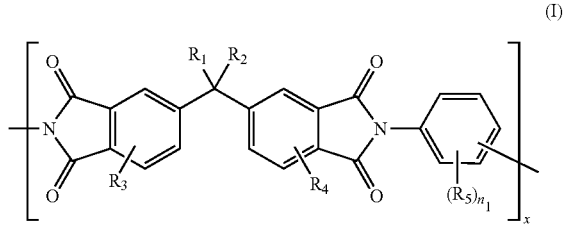

(I)

wherein:

x is 1-500; wherein each repeating unit can have different substituents at $R_1$, $R_2$, $R_3$, $R_4$, $R_5$, and $n_1$;

$R_1$ and $R_2$ are each independent selected from alkyl$_{(C \leq 12)}$, substituted alkyl$_{(C \leq 12)}$, aryl$_{(C \leq 12)}$, or substituted aryl$_{(C \leq 12)}$;

$R_3$ and $R_4$ are each independently selected from hydrogen, halo, hydroxy, amino, cyano, carboxy, nitro, alkyl$_{(C \leq 12)}$, substituted alkyl$_{(C \leq 12)}$, alkoxy$_{(C \leq 12)}$ or substituted alkoxy$_{(C \leq 12)}$;

$R_5$ is hydrogen, halo, hydroxy, amino, cyano, carboxy, nitro, alkyl$_{(C \leq 12)}$, substituted alkyl$_{(C \leq 12)}$, aryl$_{(C \leq 12)}$, substituted aryl$_{(C \leq 12)}$, alkoxy$_{(C \leq 12)}$ or substituted alkoxy$_{(C \leq 12)}$; and $n_1$ is 0, 1, 2, 3, or 4;

(B) a polybenzimidazole polymer of the formula:

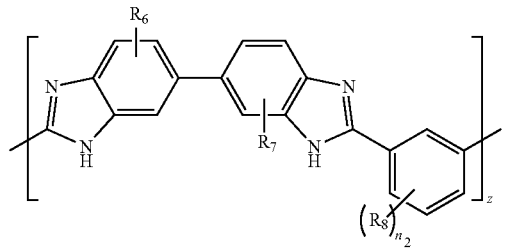

(II)

wherein:

z is 1-200;

$R_6$ and $R_7$ are each independently selected from hydrogen, halo, hydroxy, amino, cyano, carboxy, nitro, alkyl$_{(C \leq 12)}$, substituted alkyl$_{(C \leq 12)}$, alkoxy$_{(C \leq 12)}$ or substituted alkoxy$_{(C \leq 12)}$ alkylamino$_{(C \leq 12)}$, substituted alkylamino$_{(C \leq 12)}$, dialkylamino$_{(C \leq 12)}$, substituted dialkylamino$_{(C \leq 12)}$;

$R_8$ is hydrogen, halo, hydroxy, amino, cyano, carboxy, nitro, alkyl$_{(C \leq 12)}$, substituted alkyl$_{(C \leq 12)}$, aryl$_{(C \leq 12)}$, substituted aryl$_{(C \leq 12)}$, alkoxy$_{(C \leq 12)}$ or substituted alkoxy$_{(C \leq 12)}$; and $n_2$ is 0, 1, 2, 3, or 4; and (C) a chemical compound of the formula:

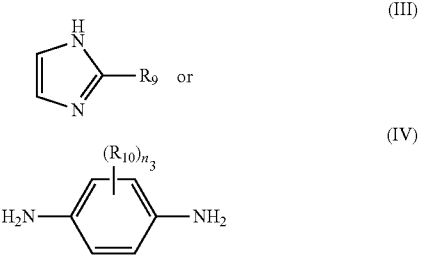

wherein:

$R_9$ is alkyl$_{(C \leq 12)}$, aryl$_{(C \leq 12)}$, aralkyl$_{(C \leq 12)}$, or a substituted version of any of these groups;

$R_{10}$ is amino, cyano, halo, hydroxy, or nitro, or alkyl$_{(C \leq 8)}$, cycloalkyl$_{(C \leq 8)}$, alkoxy$_{(C \leq 8)}$, acyl$_{(C \leq 8)}$, amido$_{(C \leq 8)}$, acyloxy$_{(C \leq 8)}$, alkylamino$_{(C \leq 8)}$, dialkylamino$_{(C \leq 8)}$, or a substituted version of any of these groups;

$n_3$ is 0, 1, 2, 3, or 4.

In some embodiments, the compound of formula I is further defined as:

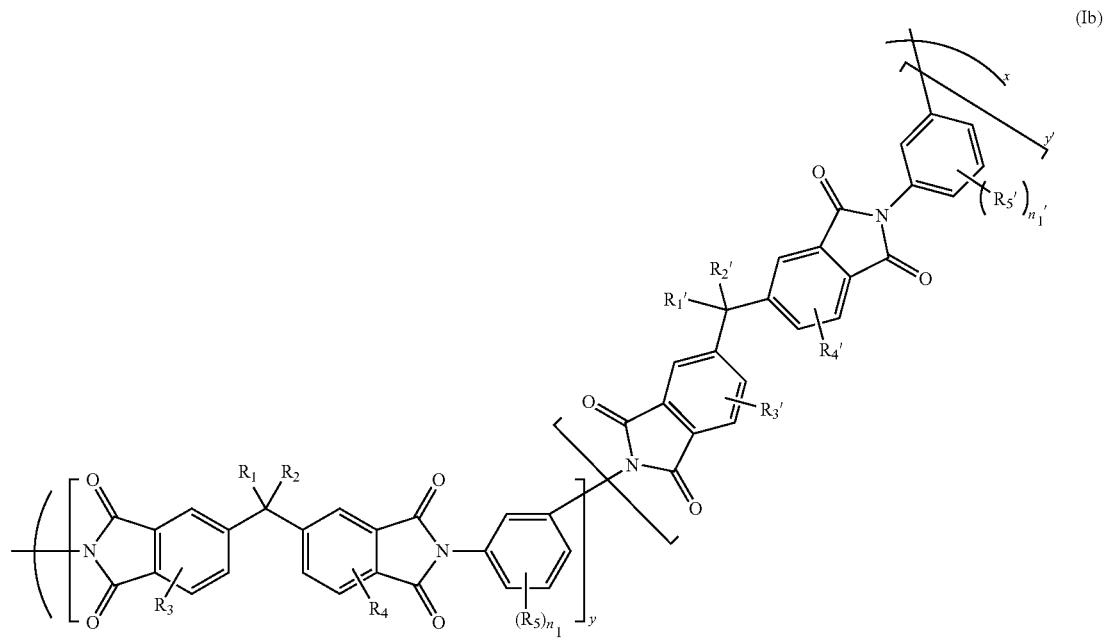

(Ib)

wherein:
y and y' are each independently selected from 0, 1, 2, 3, 4, 5, 6, 7, 8, 9, or 10, provided that the sum of y and y' is greater than 1 and less than 10 and the product of x and the sum of y and y' is less than 500;

$R_1$, $R_2$, $R_1'$, and $R_2'$ are each independent selected from alkyl$_{(C \leq 12)}$, substituted alkyl$_{(C \leq 12)}$, aryl$_{(C \leq 12)}$, or substituted aryl$_{(C \leq 12)}$;

$R_3$, $R_4$, $R_3'$ and $R_4'$ are each independently selected from hydrogen, halo, hydroxy, amino, cyano, carboxy, nitro, alkyl$_{(C \leq 12)}$, substituted alkyl$_{(C \leq 12)}$, alkoxy$_{(C \leq 12)}$, or substituted alkoxy$_{(C \leq 12)}$;

$R_5$ and $R_5'$ are each independently selected from hydrogen, halo, hydroxy, amino, cyano, carboxy, nitro, alkyl$_{(C \leq 12)}$, substituted alkyl$_{(C \leq 12)}$, aryl$_{(C \leq 12)}$, substituted aryl$_{(C \leq 12)}$, alkoxy$_{(C \leq 12)}$, or substituted alkoxy$_{(C \leq 12)}$; and $n_1$ and $n_1'$ are each independently selected from 0, 1, 2, 3, or 4.

In some embodiments, $R_1$, $R_2$, $R_1'$, and $R_2'$ are fluoroalkyl$_{(C \leq 12)}$. In some embodiments, $R_1$, $R_2$, $R_1'$, and $R_2'$ are trifluoromethyl. In some embodiments, $R_3$, $R_4$, $R_3'$, and $R_4'$ are hydrogen. In some embodiments, $R_5$ is alkyl$_{(C \leq 12)}$ or substituted alkyl$_{(C \leq 12)}$. In some embodiments, $R_5$ is methyl. In other embodiments, $R_5$ is carboxy. In some embodiments, $R_5'$ is alkyl$_{(C \leq 12)}$ or substituted alkyl$_{(C \leq 12)}$. In some embodiments, $R_5'$ is methyl. In other embodiments, $R_5'$ is carboxy. In some embodiments, y is 2, 3, 4, 5, 8, 9, or 10. In some embodiments, y is 3, 4, or 9. In some embodiments, y' is 1, 2, 3, 4, or 5. In some embodiments, y' is 1 or 2. In some embodiments, y' is 1.

In some embodiments, (C) is a compound of the formula:

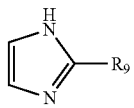

(III)

wherein: $R_9$ is alkyl$_{(C \leq 12)}$, aryl$_{(C \leq 12)}$, aralkyl$_{(C \leq 12)}$, or a substituted version of any of these groups. In some embodiments, $R_9$ is alkyl$_{(C \leq 12)}$ or substituted alkyl$_{(C \leq 12)}$. In some embodiments, $R_9$ is methyl, ethyl, or phenyl. In some embodiments, $R_{10}$ is alkyl$_{(C \leq 8)}$ such as methyl. In some embodiments, $n_3$ is 4.

In some embodiments, the composition of the polymer of formula I and the polymer of formula II are immiscible when the chemical compound is not present but are miscible when the chemical compound is present. In some embodiments, the composition of the polymer of formula I and the polymer of formula II are mixed with the chemical compound is present and then the chemical compound of formula III is removed under vacuum or at an elevated temperature.

In some embodiments, the composition comprises from about 1 wt % to about 20 wt % of the chemical compound of formula III. In some embodiments, the composition comprises from about 3 wt % to about 12 wt % of the chemical compound of formula III. In some embodiments, the composition comprises a ratio of the polymer of formula I to the polymer of formula II is from about 1:99 to about 99:1. In some embodiments, the composition comprises a ratio of the polymer of formula I to the polymer of the formula II is from about 90:10 to about 10:90. In some embodiments, the composition is cast into a membrane. In some embodiments, the composition has a glass transition temperature greater than 300° C. In some embodiments, the composition comprises a polymer domain of less than about 1.0 μm. In some embodiments, the polymer domain is less than about 0.5 μm. In some embodiments, the composition is formulated as a carbon molecular sieve membrane.

In still yet another aspect, the present disclosure provides carbon molecular sieve membranes comprising the carbonized composition of the compositions described herein. In some embodiments, the carbon molecular sieve membrane comprises a matrix-droplet type morphology.

In yet another aspect, the present disclosure provides methods of preparing a composition comprising admixing an immiscible polyimide polymer with polybenzimidazole polymer with a small molecule compatibilizer agent to obtain the composition, wherein the composition comprises a mixture of the polyimide and polybenzimidazole, and wherein the mixture comprises a polymer domain of less than 1.25 μm. In some embodiments, the small molecule compatibilizer agent comprises an imidazole functional group. In some embodiments, the small molecule compatibilizer agent has the formula:

(III)

wherein: $R_9$ is alkyl$_{(C \leq 12)}$, aryl$_{(C \leq 12)}$, aralkyl$_{(C \leq 12)}$, or a substituted version of any of these groups. In some embodiments, $R_9$ is methyl, ethyl, phenyl, or a substituted version of any of these groups thereof. In some embodiments, the polybenzimidazole has the formula:

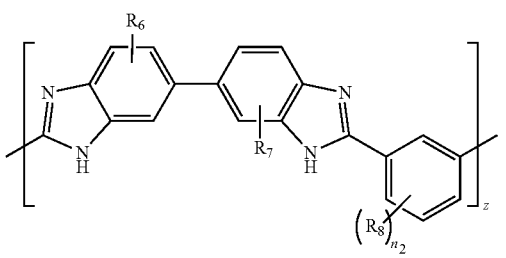

(II)

wherein:
z is 1-200;
$R_6$ and $R_7$ are each independently selected from hydrogen, halo, hydroxy, amino, cyano, carboxy, nitro, alkyl$_{(C \leq 12)}$, substituted alkyl$_{(C \leq 12)}$, alkoxy$_{(C \leq 12)}$, or substituted alkoxy$_{(C \leq 12)}$, alkylamino$_{(C \leq 12)}$, substituted alkylamino$_{(C \leq 12)}$, dialkylamino$_{(C \leq 12)}$, substituted dialkylamino$_{(C \leq 12)}$;
$R_8$ is hydrogen, halo, hydroxy, amino, cyano, carboxy, nitro, alkyl$_{(C \leq 12)}$, substituted alkyl$_{(C \leq 12)}$, aryl$_{(C \leq 12)}$, substituted aryl$_{(C \leq 12)}$, alkoxy$_{(C \leq 12)}$, or substituted alkoxy$_{(C \leq 12)}$; and
$n_2$ is 0, 1, 2, 3, or 4.

In some embodiments, z is from 50 to 150. In some embodiments, $R_6$ and $R_7$ is hydrogen. In some embodiments, $R_8$ is hydrogen. In some embodiments, the polyimide has the formula:

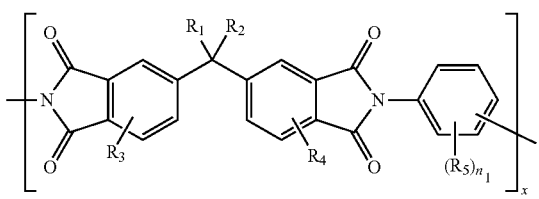

(I)

wherein:
- x is 1-500; wherein each repeating unit can have different substituents at $R_1$, $R_2$, $R_3$, $R_4$, $R_5$, and $n_1$;
- $R_1$ and $R_2$ are each independent selected from alkyl$_{(C\leq12)}$, substituted alkyl$_{(C\leq12)}$, aryl$_{(C\leq12)}$, or substituted aryl$_{(C\leq12)}$;
- $R_3$ and $R_4$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$;
- $R_5$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and
- $n_1$ is 0, 1, 2, 3, or 4.

In some embodiments, the polyimide is further defined as:

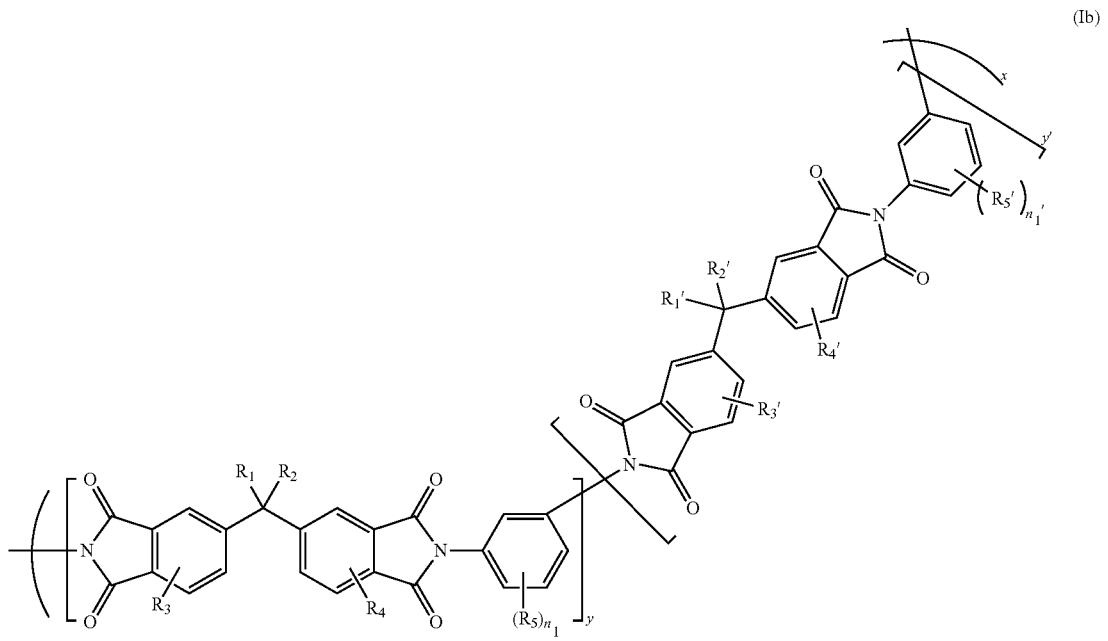

(Ib)

wherein:
- y and y' are each independently selected from 0, 1, 2, 3, 4, 5, 6, 7, 8, 9, or 10, provided that the sum of y and y' is greater than 1 and less than 10 and the product of x and the sum of y and y' is less than 500;
- $R_1$, $R_2$, $R_1'$, and $R_2'$ are each independent selected from alkyl$_{(C\leq12)}$, substituted alkyl$_{(C\leq12)}$, aryl$_{(C\leq12)}$, or substituted aryl$_{(C\leq12)}$;
- $R_3$, $R_4$, $R_3'$ and $R_4'$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$;
- $R_5$ and $R_5'$ are each independently selected from hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and
- $n_1$ and $n_1'$ are each independently selected from 0, 1, 2, 3, or 4.

In some embodiments, $R_1$, $R_2$, $R_1'$, and $R_2'$ are fluoroalkyl$_{(C\leq12)}$. In some embodiments, $R_1$, $R_2$, $R_1'$, and $R_2'$ are trifluoromethyl. In some embodiments, $R_3$, $R_4$, $R_3'$, and $R_4'$ are hydrogen. In some embodiments, $R_5$ is alkyl$_{(C\leq12)}$ or substituted alkyl$_{(C\leq12)}$. In some embodiments, $R_5$ and $R_5'$ are methyl. In other embodiments, $R_5$ is carboxy. In some embodiments, $R_5'$ is alkyl$_{(C\leq12)}$ or substituted alkyl$_{(C\leq12)}$. In some embodiments, $R_5$ and $R_5'$ are methyl. In other embodiments, $R_5'$ is carboxy. In some embodiments, y is 2, 3, 4, 5, 6, 7, 8, 9, or 10. In some embodiments, y' is 1, 2, 3, 4, or 5.

In some embodiments, the methods further comprise admixing the polyimide and polybenzimidazole in a solvent. In some embodiments, the solvent is dimethylacetamide. In some embodiments, the methods further comprise reducing the amount of solvent. In some embodiments, the methods further comprise heating the composition to a temperature from about 25° C. to about 200° C. In some embodiments, the methods comprise heating the mixture vaporizes the small molecule compatibilizer agent. In some embodiments, the mixtures comprise from about 1 wt % to about 20 wt % of the small molecule compatibilizer agent. In some embodiments, the mixtures comprise from about 3 wt % to about 12 wt % of the small molecule compatibilizer agent. In some embodiments, the mixtures comprise a ratio of polyimide to the polybenzimidazole is from about 1:99 to about 99:1. In some embodiments, the mixtures comprise a ratio of polyimide to the polybenzimidazole is from about 90:10 to about 10:90.

In some embodiments, the methods further comprise casting the composition into a membrane. In some embodiments, the methods further comprise annealing the membrane under vacuum. In some embodiments, annealing further comprises heating the membrane to a temperature from about 50° C. to about 500° C. under vacuum. In some embodiments, the temperature is from about 50° C. to about 300° C. In some embodiments, annealing comprises heating the membrane for a time period from about 24 hours to about 240 hours. In some embodiments, the time period from about 36 hours to about 96 hours. In some embodiments, annealing comprises heating to 80° C. for 24 hour, then heating to 150° C. for 12 hours, then heating 200° C. for 12 hours, then heating to 250° C. for 12 hours, and then cooled to room temperature wherein all heating is conducted under vacuum. In some embodiments, the membranes comprise a polymer domain of less than 1.0 µm. In some embodiments, the polymer domain is less than 0.5 µm.

In yet another aspect, the present disclosure provides methods of preparing a carbon molecular sieve membrane comprising:

(A) obtaining a membrane prepared according to the methods described herein; and (B) heating the membrane to a temperature from about 400° C. to about 1000° C.

In some embodiments, the temperature is from about 400° C. to about 750° C. or from about 450° C. to about 650° C. In some embodiments, the temperature is about 550° C. In some embodiments, the temperature is as described in FIGS. 25A & 25B. In some embodiments, the membrane is heated for a time period from about 5 minutes to about 480 minutes. In some embodiments, the time period is from about 60 minutes to about 360 minutes. In some embodiments, the method comprises heating the membrane to the temperature under an inert environment. In some embodiments, the inert environment is a nitrogen environment. In some embodiments, the carbon molecular sieve membrane comprises the matrix-droplet type morphology.

In yet another aspect, the present disclosure provides compositions comprising a mixture of polymers comprising:
(A) a polyimide polymer of the formula:

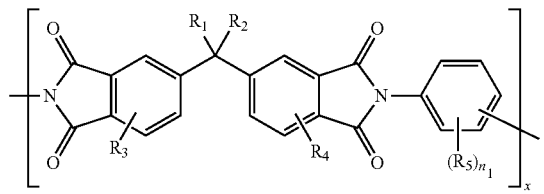

(I)

wherein:
x is 1-500; wherein each repeating unit can have different substituents at $R_1$, $R_2$, $R_3$, $R_4$, $R_5$, and $n_1$;
$R_1$ and $R_2$ are each independent selected from alkyl$_{(C \leq 12)}$, substituted alkyl$_{(C \leq 12)}$, aryl$_{(C \leq 12)}$, or substituted aryl$_{(C \leq 12)}$;
$R_3$ and $R_4$ are each independently selected from hydrogen, halo, hydroxy, amino, cyano, carboxy, nitro, alkyl$_{(C \leq 12)}$, substituted alkyl$_{(C \leq 12)}$, alkoxy$_{(C \leq 12)}$ or substituted alkoxy$_{(C \leq 12)}$;
$R_5$ is hydrogen, halo, hydroxy, amino, cyano, carboxy, nitro, alkyl$_{(C \leq 12)}$, substituted alkyl$_{(C \leq 12)}$, aryl$_{(C \leq 12)}$, substituted aryl$_{(C \leq 12)}$, alkoxy$_{(C \leq 12)}$, or substituted alkoxy$_{(C \leq 12)}$; and
$n_1$ is 0, 1, 2, 3, or 4;

(B) a polybenzimidazole polymer of the formula:

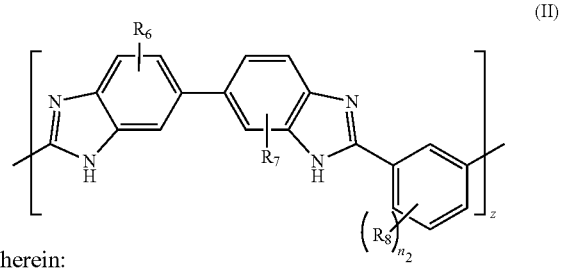

(II)

wherein:
z is 1-200;
$R_6$ and $R_7$ are each independently selected from hydrogen, halo, hydroxy, amino, cyano, carboxy, nitro, alkyl$_{(C \leq 12)}$, substituted alkyl$_{(C \leq 12)}$, alkoxy$_{(C \leq 12)}$, or substituted alkoxy$_{(C \leq 12)}$, alkylamino$_{(C \leq 12)}$, substituted alkylamino$_{(C \leq 12)}$, dialkylamino$_{(C \leq 12)}$, substituted dialkylamino$_{(C \leq 12)}$;
$R_8$ is hydrogen, halo, hydroxy, amino, cyano, carboxy, nitro, alkyl$_{(C \leq 12)}$, substituted alkyl$_{(C \leq 12)}$, aryl$_{(C \leq 12)}$, substituted aryl$_{(C \leq 12)}$, alkoxy$_{(C \leq 12)}$, or substituted alkoxy$_{(C \leq 12)}$; and
$n_2$ is 0, 1, 2, 3, or 4; and (C) a metal organic framework.

In some embodiments, the compound of formula I is further defined as:

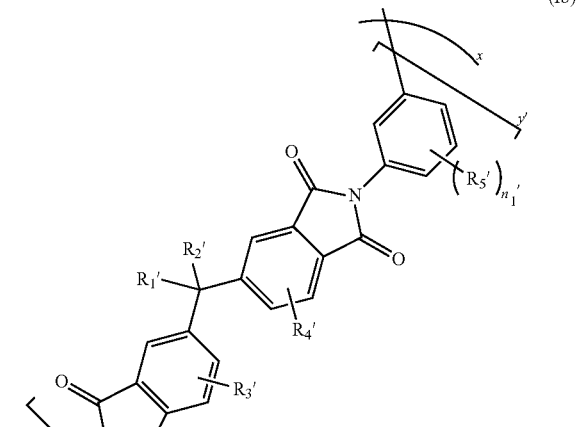

(Ib)

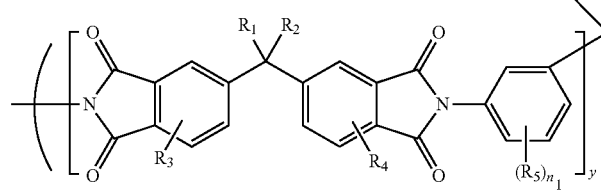

wherein:
y and y' are each independently selected from 0, 1, 2, 3, 4, 5, 6, 7, 8, 9, or 10, provided that the sum of y and y' is greater than 1 and less than 10 and the product of x and the sum of y and y' is less than 500;

$R_1$, $R_2$, $R_1'$, and $R_2'$ are each independent selected from alkyl$_{(C\leq12)}$, substituted alkyl$_{(C\leq12)}$, aryl$_{(C\leq12)}$, or substituted aryl$_{(C\leq12)}$;

$R_3$, $R_4$, $R_3'$ and $R_4'$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$;

$R_5$ and $R_5'$ are each independently selected from hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and $n_1$ and $n_1'$ are each independently selected from 0, 1, 2, 3, or 4.

In some embodiments, $R_1$, $R_2$, $R_1'$, and $R_2'$ are fluoroalkyl$_{(C\leq12)}$. In some embodiments, $R_1$, $R_2$, $R_1'$, and $R_2'$ are trifluoromethyl. In some embodiments, $R_3$, $R_4$, $R_3'$, and $R_4'$ are hydrogen. In some embodiments, $R_5$ is alkyl$_{(C\leq12)}$ or substituted alkyl$_{(C\leq12)}$. In some embodiments, $R_5$ is methyl. In other embodiments, $R_5$ is carboxy. In some embodiments, $R_5'$ is alkyl$_{(C\leq12)}$ or substituted alkyl$_{(C\leq12)}$. In some embodiments, $R_5'$ is methyl. In other embodiments, $R_5'$ is carboxy. In some embodiments, y is 2, 3, 4, 5, 8, 9, or 10. In some embodiments, y is 3, 4, or 9. In some embodiments, y' is 1, 2, 3, 4, or 5. In some embodiments, y' is 1 or 2. In some embodiments, y' is 1.

In some embodiments, the metal organic framework comprises an imidazole functional group. In some embodiments, the metal organic framework is a zeolitic imidazolate framework. In some embodiments, the metal organic framework is ZIF-8. In some embodiments, the composition of the polymer of formula I and the polymer of formula II are immiscible when the metal organic framework is not present but are miscible when the metal organic framework is present. In some embodiments, the mixture comprises from about 1 wt % to about 50 wt % of the metal organic framework. In some embodiments, the mixture comprises from about 3 wt % to about 12 wt % of the metal organic framework.

In some embodiments, the mixture comprises a ratio of the polymer of formula I to the polymer of formula II is from about 1:99 to about 99:1. In some embodiments, the mixture comprises a ratio of the polymer of formula I to the polymer of the formula II is from about 90:10 to about 10:90. In some embodiments, the composition is cast into a membrane. In some embodiments, the composition has a glass transition temperature greater than 300° C. In some embodiments, the composition comprises polymer domains of less than about 1.0 μm. In some embodiments, the polymer domains are less than about 0.5 μm.

In still yet another aspect, the present disclosure provides methods of preparing a composition comprising admixing an immiscible polyimide polymer with polybenzimidazole polymer with a metal organic framework to obtain the composition wherein the composition comprises a mixture of the polyimide and polybenzimidazole. In some embodiments, the metal organic framework comprises an imidazole functional group. In some embodiments, the metal organic framework is a zeolitic inmidazolate framework. In some embodiments, the metal organic framework is ZIF-8. In some embodiments, the polybenzimidazole has the formula:

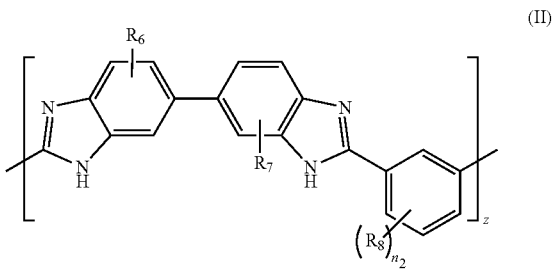

wherein:
z is 1-200;

$R_6$ and $R_7$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$, alkylamino$_{(C\leq12)}$, substituted alkylamino$_{(C\leq12)}$, dialkylamino$_{(C\leq12)}$, substituted dialkylamino$_{(C\leq12)}$;

$R_8$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and $n_2$ is 0, 1, 2, 3, or 4.

In some embodiments, z is from 50 to 150. In some embodiments, $R_6$ and $R_7$ is hydrogen. In some embodiments, $R_8$ is hydrogen. In some embodiments, the polyimide has the formula:

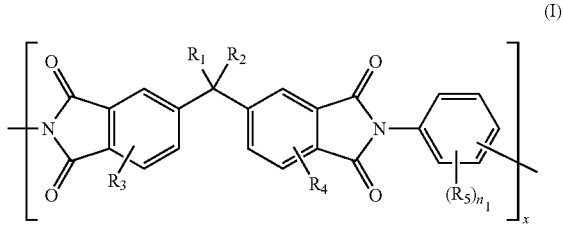

wherein:
x is 1-500; wherein each repeating unit can have different substituents at $R_1$, $R_2$, $R_3$, $R_4$, $R_5$, and $n_1$;

$R_1$ and $R_2$ are each independent selected from alkyl$_{(C\leq12)}$, substituted alkyl$_{(C\leq12)}$, aryl$_{(C\leq12)}$, or substituted aryl$_{(C\leq12)}$;

$R_3$ and $R_4$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$ or substituted alkoxy$_{(C\leq12)}$;

$R_5$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and $n_1$ is 0, 1, 2, 3, or 4. In some embodiments, the polyimide is further defined as:

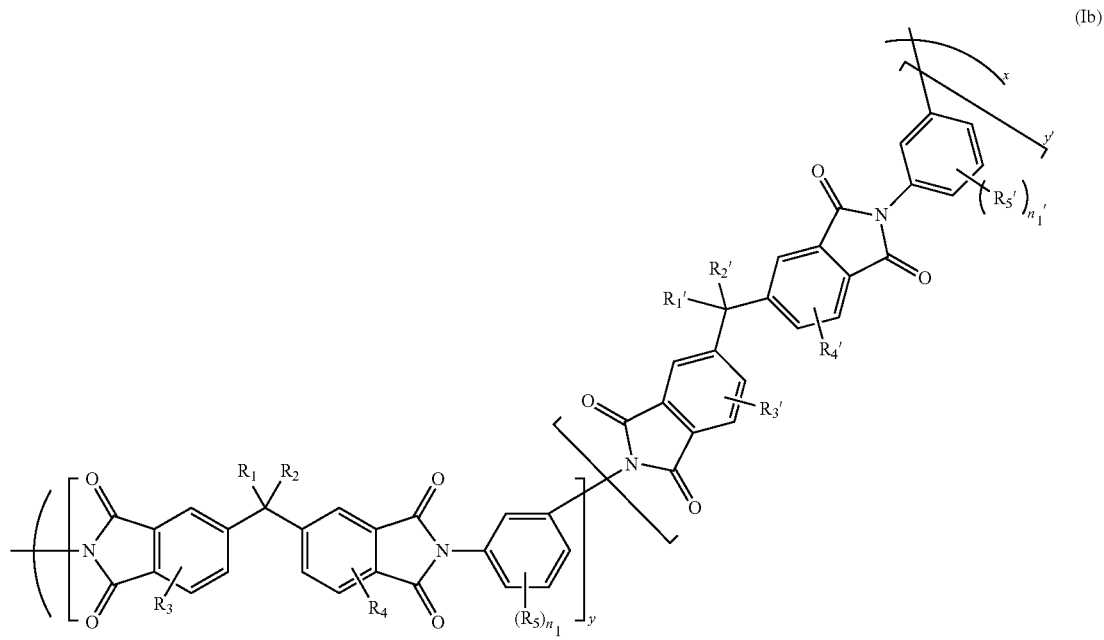

wherein:
y and y' are each independently selected from 0, 1, 2, 3, 4, 5, 6, 7, 8, 9, or 10, provided that the sum of y and y' is greater than 1 and less than 10 and the product of x and the sum of y and y' is less than 500;

$R_1$, $R_2$, $R_1'$, and $R_2'$ are each independent selected from alkyl$_{(C \leq 12)}$, substituted alkyl$_{(C \leq 12)}$, aryl$_{(C \leq 12)}$, or substituted aryl$_{(C \leq 12)}$;

$R_3$, $R_4$, $R_3'$ and $R_4'$ are each independently selected from hydrogen, halo, hydroxy, amino, cyano, carboxy, nitro, alkyl$_{(C \leq 12)}$, substituted alkyl$_{(C \leq 12)}$, alkoxy$_{(C \leq 12)}$, or substituted alkoxy$_{(C \leq 12)}$;

$R_5$ and $R_5'$ are each independently selected from hydrogen, halo, hydroxy, amino, cyano, carboxy, nitro, alkyl$_{(C \leq 12)}$, substituted alkyl$_{(C \leq 12)}$, aryl$_{(C \leq 12)}$, substituted aryl$_{(C \leq 12)}$, alkoxy$_{(C \leq 12)}$, or substituted alkoxy$_{(C \leq 12)}$; and $n_1$ and $n_1'$ are each independently selected from 0, 1, 2, 3, or 4.

In some embodiments, $R_1$, $R_2$, $R_1'$, and $R_2'$ are fluoroalkyl$_{(C \leq 12)}$. In some embodiments, $R_1$, $R_2$, $R_1'$, and $R_2'$ are trifluoromethyl. In some embodiments, $R_3$, $R_4$, $R_3'$, and $R_4'$ are hydrogen. In some embodiments, $R_5$ is alkyl$_{(C \leq 12)}$ or substituted alkyl$_{(C \leq 12)}$. In some embodiments, $R_5$ is methyl. In some embodiments, $R_5$ is carboxy. In some embodiments, $R_5'$ is alkyl$_{(C \leq 12)}$ or substituted alkyl$_{(C \leq 12)}$. In some embodiments, $R_5'$ are methyl. In some embodiments, $R_5'$ is carboxy. In some embodiments, y is 2, 3, 4, 5, 6, 7, 8, 9, or 10. In some embodiments, y' is 1, 2, 3, 4, or 5.

In some embodiments, the method further comprises admixing the polyimide and polybenzimidazole in a solvent. In some embodiments, the solvent is dimethylacetamide. In some embodiments, the method further comprises reducing the amount of solvent. In some embodiments, the mixture comprises from about 1 wt % to about 50 wt % of the metal organic framework. In some embodiments, the mixture comprises from about 3 wt % to about 12 wt % of the metal organic framework. In some embodiments, the mixture comprises a ratio of polyimide to the polybenzimidazole is from about 1:99 to about 99:1. In some embodiments, the mixture comprises a ratio of polyimide to the polybenzimidazole is from about 90:10 to about 10:90.

In some embodiments, the method further comprises casting the composition into a membrane. In some embodiments, the method further comprises annealing the membrane under vacuum. In some embodiments, annealing further comprises heating the membrane to a temperature from about 50° C. to about 500° C. under vacuum. In some embodiments, the temperature is from about 50° C. to about 300° C. In some embodiments, annealing comprises heating the membrane for a time period from about 24 hours to about 240 hours. In some embodiments, the time period from about 36 hours to about 96 hours. In some embodiments, annealing comprises heating to 80° C. for 24 hour, then heating to 150° C. for 12 hours, then heating 200° C. for 12 hours, then heating to 250° C. for 12 hours, and then cooled to room temperature wherein all heating is conducted under vacuum. In some embodiments, the membrane comprises a domain of less than 1.0 μm.

In still yet another aspect, the present disclosure provides compositions prepared by the methods described herein.

In yet another aspect, the present disclosure provides methods of using a composition described herein to separate one gas from a mixture of two or more gases. In some embodiments, the composition is formulated as a membrane. In some embodiments, the composition is formulated as a carbon molecular sieve membrane. In some embodiments, the gas mixture is a mixture of hydrogen, carbon dioxide, nitrogen, oxygen, or methane. In some embodiments, the gas mixture is hydrogen and carbon dioxide, hydrogen and nitrogen, hydrogen and methane, carbon dioxide and nitrogen, carbon dioxide and methane, or oxygen and nitrogen. In some embodiments, the gas mixture is hydrogen and carbon dioxide. In some embodiments, the composition has a $H_2/CO_2$ selectivity of greater than 1.5. In some embodiments, the composition has a $H_2/CO_2$ selectivity of greater than 10. In some embodiments, the method comprises separating hydrogen from a mixture of hydrogen and carbon dioxide. In some embodiments, the method results in hydrogen with a reduction of the carbon dioxide of greater than 50%. In some embodiments, the purity of hydrogen is greater than 50%.

It is contemplated that any method or composition described herein can be implemented with respect to any other method or composition described herein.

The use of the word "a" or "an" when used in conjunction with the term "comprising" in the claims and/or the specification may mean "one," but it is also consistent with the meaning of "one or more," "at least one," and "one or more than one."

These, and other, embodiments of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

FIGS. 3A & 3B show optical images of 6FDD:PBI (50:50) membranes with 5 wt % (FIG. 3A) and 9 wt % (FIG. 3B) 2-methylimidazole.

FIGS. 4A & 4B show SEM images of a 6FDD:PBI (50:50) membrane cross-section before (FIG. 4A) and after selective THF extraction of 6FDD (FIG. 4B) in the absence of a compatibilizing agent.

FIGS. 5A & 5B show a SEM images of 6FDD:PBI (50:50) membrane cross-section with 5 wt % (FIG. 5A) and 9 wt % (FIG. 5B) 2-methylimidazole.

FIGS. 6A-6F show SEM images (FIGS. 6A-6C) and the histograms (FIGS. 6D-F) of the 6FDD, extracted 6FDD:PBI (50:50) membranes with 0 wt % (FIGS. 6A & 6D), 5 wt % (FIGS. 6B & 6E), and 9 wt % (FIGS. 6C & 6F) of 2-methylimidazole.

FIGS. 25A & 25B show temperature profile for carbonization of the membranes.

FIGS. 26A & 26B show Raman spectra of 9 wt % 2-MI 6FDD:PBI (50:50) CMSM carbonized at (FIG. 26A) 800° C. and (FIG. 26B) 550° C.

(FIG. 28B) and 800° C. (FIG. 28C).

DETAILED DESCRIPTION OF THE DISCLOSURE

Figure 1:
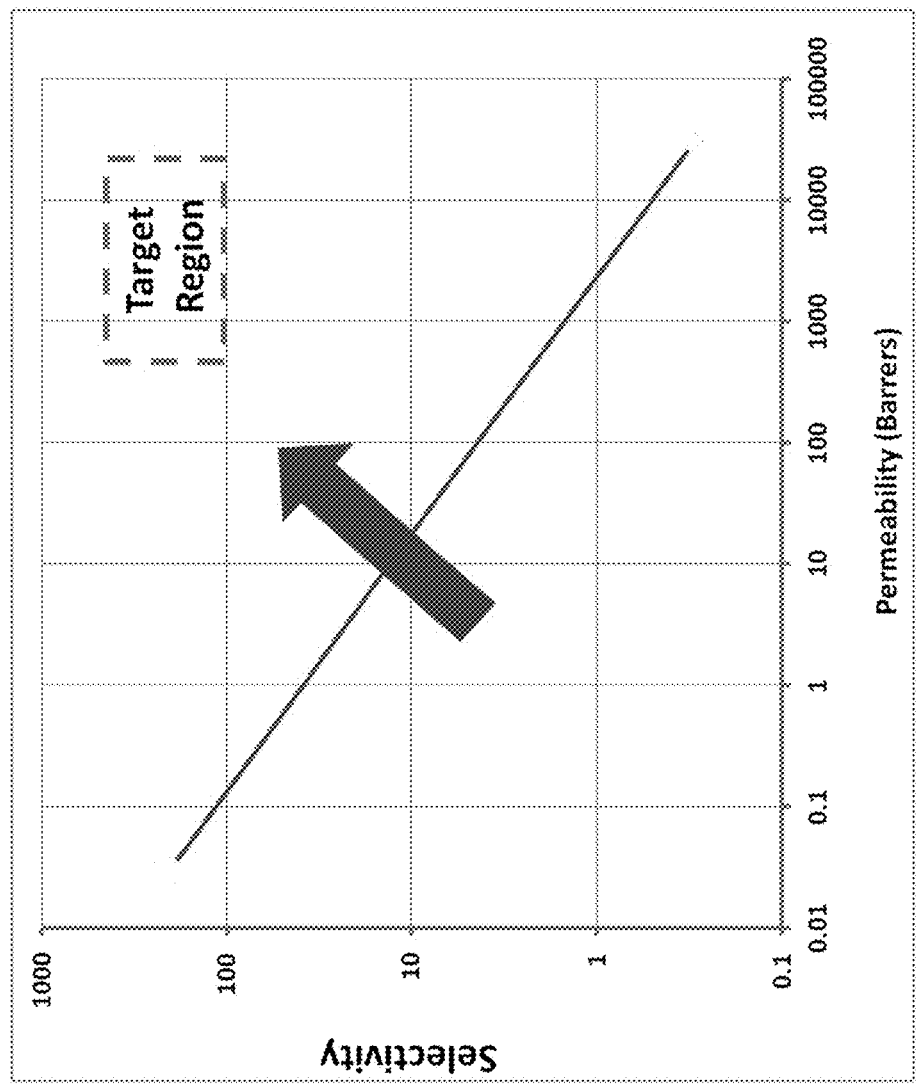
FIG. 1 shows the Robeson upper bound for gas separations
Figure 2:
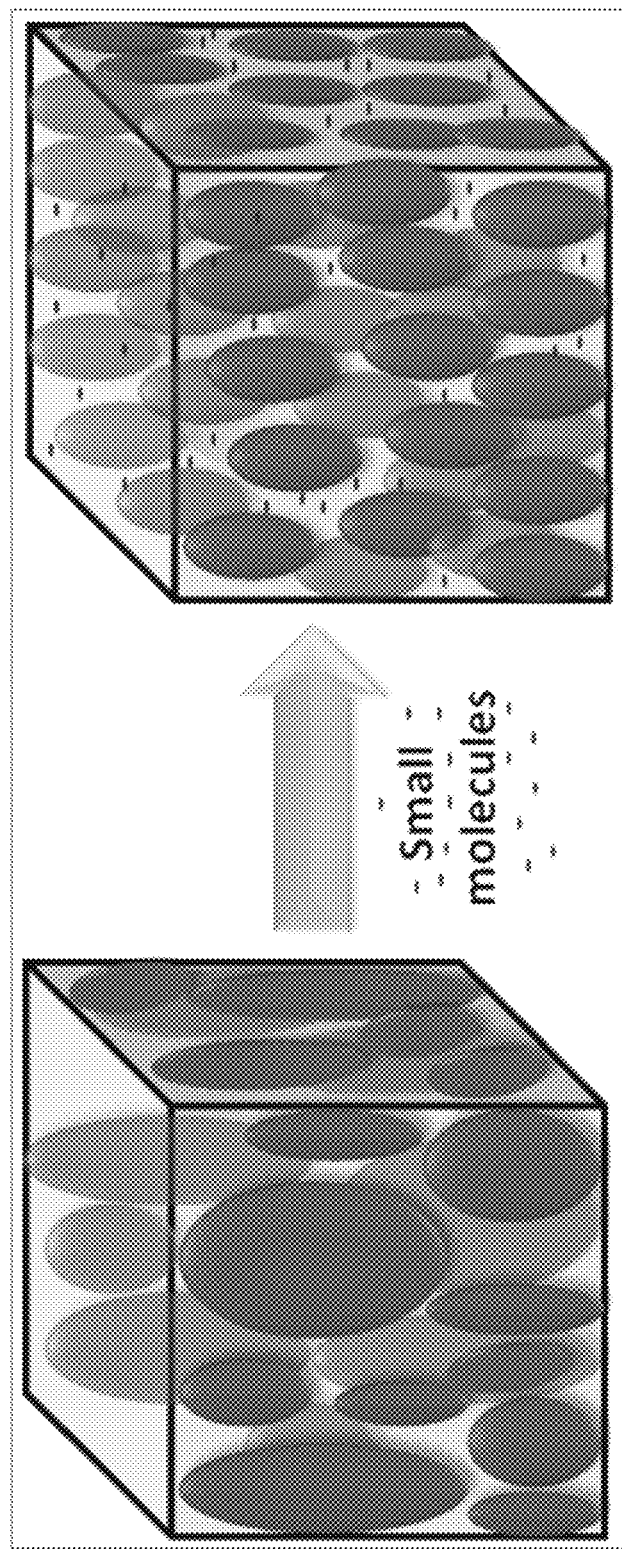
FIG. 2 shows an illustration of the membrane microstructure in which highly permeable polymer (dark) is dispersed in a continuous highly selective polymer (light).

In some aspects, the present disclosure provides a compatibilized polymer blend wherein the polymer blend was immiscible before the addition of a metal organic framework or a small molecule compatibilizing agent. In some embodiments, the polymer blend comprises a polyimide and a polyimidazole polymer. In some aspects, the polymer blend is casted into a membrane useful for the separation of two or more gases from a mixture.

I. POLYMERIC COMPOSITIONS

In some aspects of the present disclosure, a polymer blend comprising a polyimide polymer and a polybenzimidazole polymer is described. In one aspect, the polyimide polymer is of the formula:

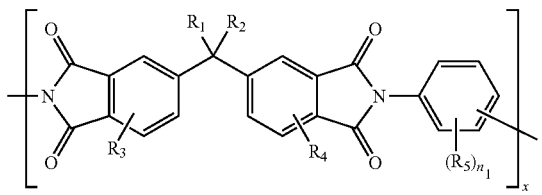

(I)

wherein: x is 1-500; wherein each repeating unit can have different substituents at $R_1$, $R_2$, $R_3$, $R_4$, $R_5$, and $n_1$; $R_1$ and $R_2$ are each independent selected from alkyl$_{(C\leq12)}$, substituted alkyl$_{(C\leq12)}$, aryl$_{(C\leq12)}$, or substituted aryl$_{(C\leq12)}$; $R_3$ and $R_4$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$ or substituted alkoxy$_{(C\leq12)}$; $R_5$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and $n_1$ is 0, 1, 2, 3, or 4.

In another aspect, the polybenzimidazole polymer is of the formula:

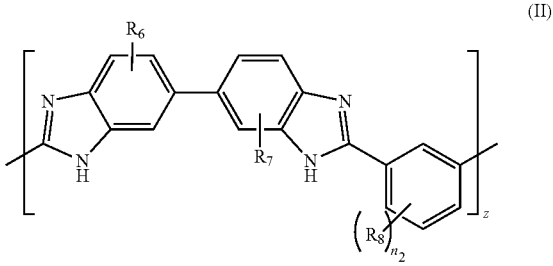

(II)

wherein: z is 1-200; $R_6$ and $R_7$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$, alkylamino$_{(C\leq12)}$, substituted alkylamino$_{(C\leq12)}$, dialkylamino$_{(C\leq12)}$, substituted dialkylamino$_{(C\leq12)}$; $R_8$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and $n_2$ is 0, 1, 2, 3, or 4.

In some aspects, the polybenzimidazole polymer and the polyimide polymer are substantially immiscible without the presence of an additional compatibilizing molecule. Some non-limiting examples of polyimide polymers used herein include:

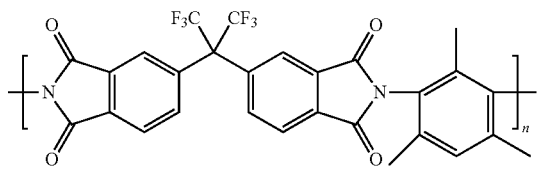
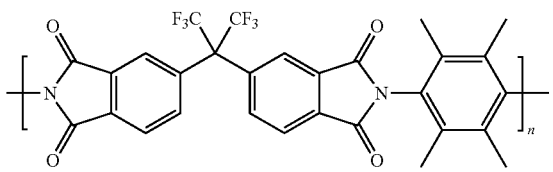

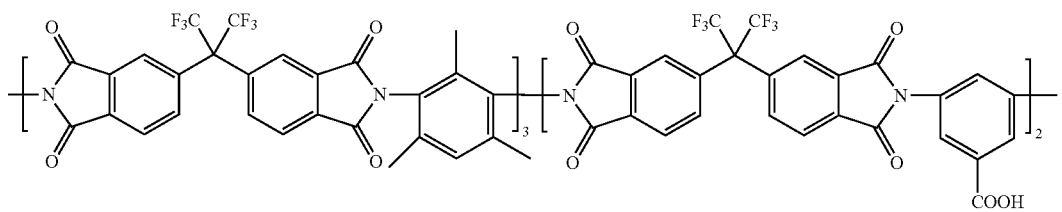

6FDD (3:2)

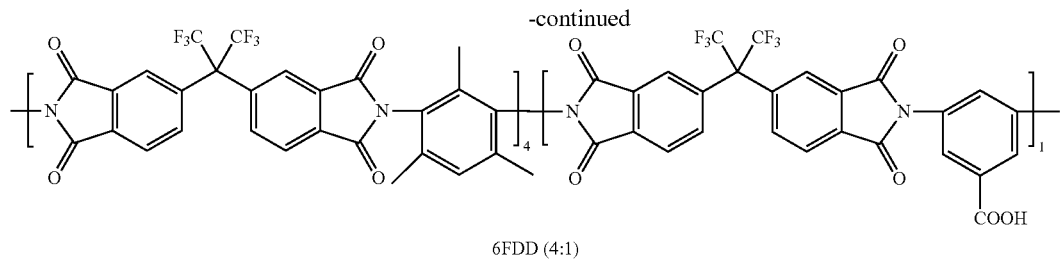

6FDD (4:1)

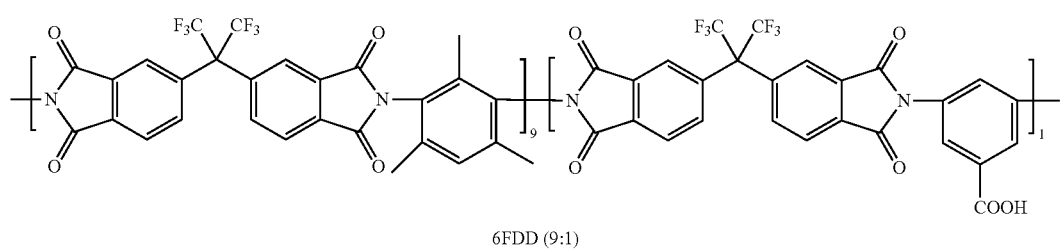

6FDD (9:1)

As used herein, the term "immiscible" is used to describe a polymer composition which forms with an average domain of the polymers of greater than 1.0 µm. In some embodiments, the average domain is greater than 1.25 µm. In some embodiments, the average domain is greater than 1.5 µm.

II. COMPATIBILIZING AGENT

In some aspects, the present disclosure provides polymer blends which contain a compatibilizing agent. In some embodiments, the compatibilizing agent is a small molecule which contains a heteroaryl group such as pyrrole or an imidazole. In some embodiments, the small molecule contains an imidazole group. In some embodiments, the small molecule is a compound of the formula:

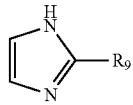

(III)

wherein $R_9$ is alkyl$_{(C \le 12)}$, aryl$_{(C \le 12)}$, aralkyl$_{(C \le 12)}$, or a substituted version of any of these groups.

In some embodiments, the small molecule is 2-methylimidazole (2-MI), 2-ethylimidazole (2-EI), or 2-phenylimidazole (2-PI). Table 1 shows the melting and boiling points of three non-limiting examples of small molecule compatibilizing agents.

TABLE 1

Melting and boiling points of small molecule compatibilizers

| Small molecule | Melting Point (° C.) | Boiling Point (° C.) |
|---|---|---|
| 2-MI | 142-143 | 267 |
| 2-EI | 78-81 | 268 |
| 2-PI | 142-148 | 340 |

In some aspects of the present disclosure, the polymer blend is compatibilized with a metal organic framework. The metal organic framework is a structure comprising a repeating unit of metal atoms or a cluster of metal atoms and ligands which form a 1D, 2D, or 3D structure such that the structure is porous. In some embodiments, the ligands in the metal organic framework contain an imidazole group. In some embodiments, the ligand is methylimidazole. In some embodiments, the metal atoms in the metal organic framework is iron, copper, cobalt, zinc, lithium, cadmium, chromium, or aluminum. In some embodiments, the metal atom is zinc.

In some aspects, the present disclosure provides a polymer blend which comprises less than 50% by weight of the compatibilizing agent. In some embodiments, the blend comprises less than 20% by weight of the compatibilizing agent. In some embodiments, the blend comprises less than 12% by weight of the compatibilizing agent. In some embodiments, the blend comprises 1%, 2%, 3%, 4%, 5%, 6%, 7%, 8%, 9%, 10%, 11%, 12%, 13%, 14%, 15%, 16%, 17%, 18%, 19%, 20% by weight, or any range derivable therein of the compatibilizing agent. In some aspects, the compatibilizing agent may be added to one polymer or the other polymer blend or both before the polymers are combined. In other aspects, the compatibilizing agent is added after the two polymers after the polymers have been combined.

III. SEPARATION OF GASES

In some aspects, the present disclosure provides methods of separating one or more gases from a mixture. In some embodiments, the gases to be separated are selected from hydrogen, nitrogen, oxygen, methane, carbon dioxide, carbon monoxide or helium. Some non-limiting examples of gas pairs that may be separated using the polymer blends include hydrogen and carbon dioxide, hydrogen and nitrogen, hydrogen and oxygen, hydrogen and methane, nitrogen and carbon dioxide, nitrogen and methane, nitrogen and oxygen, carbon dioxide and oxygen, carbon dioxide and nitrogen, carbon dioxide and methane, or oxygen and methane.

In some aspects, the polymer blend described herein comprises one polymer which has high selectivity for a specific gas while the other polymer has a high permeability for the other gas. In some embodiments, the combination of the two polymers results in a synergistic enhancement in separation and/or permeability over either polymer individually. In some embodiments, a polymer with a highly selective has a selectivity greater than 10. In some embodiments, the selectivity is 11. In some embodiments, a polymer with a high permeability has a permeability from about 100 to about 500 barrers. In some embodiments, the combination of the two polymers results in a polymer which exceeds the Robeson limit for separation.

IV. MEMBRANES

In some aspects, the present disclosure provides methods of prepare membranes from the polymer blends described herein. The membranes may be useful in the separation of a gas from a mixture of two or more gases. The membrane, in some embodiments, is cast using a variety of different methods including solution casting to obtain a flat membrane. However, in other embodiments, the polymer blend morphology described herein can be applied to fabricate other forms of membranes such as hollow fibers and tubular membranes. In some embodiments, the compatibilizing agent is removed during the preparation of the membrane. In some embodiments, the small molecule compatibilizing agent is removed during the annealing of the membrane. In some aspects, the membranes are prepared by casting a concentrated solution of the polymer blend with the compatibilizing molecule onto a glass table followed by drying. The membrane is then removed from the glass and annealed using heat, vacuum, or both. In some embodiments, the annealing process lasts from 1 hour to 1 week. In some embodiments, the membrane is heated during the annealing to a temperature from about 50° C. to about 300° C.

V. DEFINITIONS

When used in the context of a chemical group: "hydrogen" means —H; "hydroxy" means —OH; "oxo" means =O; "carbonyl" means —C(=O)—; "carboxy" means —C(=O)OH (also written as —COOH or —CO₂H); "halo" means independently —F, —Cl, —Br or —I; "amino" means —NH₂; "hydroxyamino" means —NHOH; "nitro" means —NO₂; imino means =NH; "cyano" means —CN; "isocyanate" means —N=C=O; "azido" means —N₃; in a monovalent context "phosphate" means —OP(O)(OH)₂ or a deprotonated form thereof; in a divalent context "phosphate" means —OP(O)(OH)O— or a deprotonated form thereof; "mercapto" means —SH; and "thio" means =S; "sulfonyl" means —S(O)₂—; and "sulfinyl" means —S(O)—.

In the context of chemical formulas, the symbol "—" means a single bond, "=" means a double bond, and "≡" means triple bond. The symbol "----" represents an optional bond, which if present is either single or double. The symbol "⌇" represents a single bond or a double bond. Thus, for example, the formula

includes

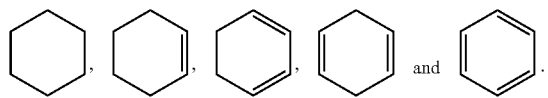

And it is understood that no one such ring atom forms part of more than one double bond. Furthermore, it is noted that the covalent bond symbol "—", when connecting one or two stereogenic atoms, does not indicate any preferred stereochemistry. Instead, it covers all stereoisomers as well as mixtures thereof. The symbol "⌇", when drawn perpendicularly across a bond (e.g., |—CH₃ for methyl) indicates a point of attachment of the group. It is noted that the point of attachment is typically only identified in this manner for larger groups in order to assist the reader in unambiguously identifying a point of attachment. The symbol "◄" means a single bond where the group attached to the thick end of the wedge is "out of the page." The symbol "⫶⫶⫶" means a single bond where the group attached to the thick end of the wedge is "into the page". The symbol "⌇" means a single bond where the geometry around a double bond (e.g., either E or Z) is undefined. Both options, as well as combinations thereof are therefore intended. Any undefined valency on an atom of a structure shown in this application implicitly represents a hydrogen atom bonded to that atom.

When a group "R" is depicted as a "floating group" on a ring system, for example, in the formula:

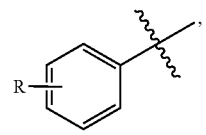

then R may replace any hydrogen atom attached to any of the ring atoms, including a depicted, implied, or expressly defined hydrogen, so long as a stable structure is formed. When a group "R" is depicted as a "floating group" on a fused ring system, as for example in the formula:

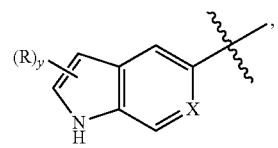

then R may replace any hydrogen attached to any of the ring atoms of either of the fused rings unless specified otherwise. Replaceable hydrogens include depicted hydrogens (e.g., the hydrogen attached to the nitrogen in the formula above), implied hydrogens (e.g., a hydrogen of the formula above that is not shown but understood to be present), expressly defined hydrogens, and optional hydrogens whose presence depends on the identity of a ring atom (e.g., a hydrogen attached to group X, when X equals —CH—), so long as a stable structure is formed. In the example depicted, R may reside on either the 5-membered or the 6-membered ring of the fused ring system. In the formula above, the subscript letter "y" immediately following the group "R" enclosed in parentheses, represents a numeric variable. Unless specified otherwise, this variable can be 0, 1, 2, or any integer greater than 2, only limited by the maximum number of replaceable hydrogen atoms of the ring or ring system.

For the groups and classes below, the number of carbon atoms in the group is as indicated as follows: "$C_n$" defines the exact number (n) of carbon atoms in the group/class. "$C{\leq}n$" defines the maximum number (n) of carbon atoms that can be in the group/class, with the minimum number as small as possible for the group in question, e.g., it is understood that the minimum number of carbon atoms in the group "alkenyl$_{(C{\leq}8)}$" or the class "alkene$_{(C{\leq}8)}$" is two. Compare with "alkoxy$_{(C{\leq}10)}$", which designates alkoxy groups having from 1 to 10 carbon atoms. "$C_{n-n'}$" defines both the minimum (n) and maximum number (n') of carbon atoms in the group. Thus, "alkyl$_{(C2-10)}$" designates those alkyl groups having from 2 to 10 carbon atoms. Typically the carbon number indicator follows the group it modifies, is enclosed with parentheses, and is written entirely in subscript; however, the indicator may also precede the group, or be written without parentheses, without signifying any change in meaning. Thus, the terms "C5 olefin", "C5-olefin", "olefin$_{(C5)}$", and "olefin$_{C5}$" are all synonymous.

The term "saturated" as used herein means the compound or group so modified has no carbon-carbon double and no carbon-carbon triple bonds, except as noted below. In the case of substituted versions of saturated groups, one or more carbon oxygen double bond or a carbon nitrogen double bond may be present. And when such a bond is present, then carbon-carbon double bonds that may occur as part of keto-enol tautomerism or imine/enamine tautomerism are not precluded.

The term "aliphatic" when used without the "substituted" modifier signifies that the compound/group so modified is an acyclic or cyclic, but non-aromatic hydrocarbon compound or group. In aliphatic compounds/groups, the carbon atoms can be joined together in straight chains, branched chains, or non-aromatic rings (alicyclic). Aliphatic compounds/groups can be saturated, that is joined by single bonds (alkanes/alkyl), or unsaturated, with one or more double bonds (alkenes/alkenyl) or with one or more triple bonds (alkynes/alkynyl).

The term "alkyl" when used without the "substituted" modifier refers to a monovalent saturated aliphatic group with a carbon atom as the point of attachment, a linear or branched acyclic structure, and no atoms other than carbon and hydrogen. The groups —CH$_3$ (Me), —CH$_2$CH$_3$ (Et), —CH$_2$CH$_2$CH$_3$ (n-Pr or propyl), —CH(CH$_3$)$_2$ (i-Pr, $^i$Pr or isopropyl), —CH$_2$CH$_2$CH$_2$CH$_3$ (n-Bu), —CH(CH$_3$)CH$_2$CH$_3$ (sec-butyl), —CH$_2$CH(CH$_3$)$_2$ (isobutyl), —C(CH$_3$)$_3$ (tert-butyl, t-butyl, t-Bu or $^t$Bu), and —CH$_2$C(CH$_3$)$_3$ (neo-pentyl) are non-limiting examples of alkyl groups. An "alkane" refers to the compound H—R, wherein R is alkyl as this term is defined above. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —SCH$_3$, —OCH$_3$, —OCH$_2$CH$_3$, —C(O)CH$_3$, —NHCH$_3$, —NHCH$_2$CH$_3$, —NHC(NH)NH$_2$, —N(CH$_3$)$_2$, —C(O)NH$_2$, —OC(O)CH$_3$, or —S(O)$_2$NH$_2$. The following groups are non-limiting examples of substituted alkyl groups: —CH$_2$OH, —CH$_2$Cl, —CF$_3$, —CH$_2$CN, —CH$_2$C(O)OH, —CH$_2$C(O)OCH$_3$, —CH$_2$C(O)NH$_2$, —CH$_2$C(O)CH$_3$, —CH$_2$OCH$_3$, —CH$_2$OC(O)CH$_3$, —CH$_2$NH$_2$, —CH$_2$N(CH$_3$)$_2$, and —CH$_2$CH$_2$Cl.

The term "aryl" when used without the "substituted" modifier refers to a monovalent unsaturated aromatic group with an aromatic carbon atom as the point of attachment, said carbon atom forming part of a one or more six-membered aromatic ring structure, wherein the ring atoms are all carbon, and wherein the group consists of no atoms other than carbon and hydrogen. If more than one ring is present, the rings may be fused or unfused. As used herein, the term does not preclude the presence of one or more alkyl or aralkyl groups (carbon number limitation permitting) attached to the first aromatic ring or any additional aromatic ring present. Non-limiting examples of aryl groups include phenyl (Ph), methylphenyl, (dimethyl)phenyl, —C$_6$H$_4$CH$_2$CH$_3$ (ethylphenyl), naphthyl, and a monovalent group derived from biphenyl. When this term is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —SCH$_3$, —OCH$_3$, —OCH$_2$CH$_3$, —C(O)CH$_3$, —NHCH$_3$, —NHCH$_2$CH$_3$, —NHC(NH)NH$_2$, —N(CH$_3$)$_2$, —C(O)NH$_2$, —OC(O)CH$_3$, or —S(O)$_2$NH$_2$.

The term "aralkyl" when used without the "substituted" modifier refers to the monovalent group-alkanediyl-aryl, in which the terms alkanediyl and aryl are each used in a manner consistent with the definitions provided above. Non-limiting examples are: phenylmethyl (benzyl, Bn) and 2-phenyl-ethyl. When the term aralkyl is used with the "substituted" modifier one or more hydrogen atom from the alkanediyl and/or the aryl group has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$H, or —S(O)$_2$NH$_2$. Non-limiting examples of substituted aralkyls are: (3-chlorophenyl)-methyl, and 2-chloro-2-phenyl-eth-1-yl.

The term "alkoxy" when used without the "substituted" modifier refers to the group —OR, in which R is an alkyl, as that term is defined above. Non-limiting examples include: —OCH$_3$ (methoxy), —OCH$_2$CH$_3$ (ethoxy), —OCH$_2$CH$_2$CH$_3$, —OCH(CH$_3$)$_2$ (isopropoxy), —OC(CH$_3$)$_3$ (tert-butoxy), —OCH(CH$_2$)$_2$, —O-cyclopentyl, and —O-cyclohexyl. The term "alcohol" corresponds to an alkane, as defined above, wherein at least one of the hydrogen atoms has been replaced with a hydroxy group. When any of these terms is used with the "substituted" modifier one or more hydrogen atom has been independently replaced by —OH, —F, —Cl, —Br, —I, —NH$_2$, —NO$_2$, —CO$_2$H, —CO$_2$CH$_3$, —CN, —SH, —SCH$_3$, —OCH$_3$, —OCH$_2$CH$_3$, —C(O)CH$_3$, —NHCH$_3$, —NHCH$_2$CH$_3$, —NHC(NH)NH$_2$, —N(CH$_3$)$_2$, —C(O)NH$_2$, —OC(O)CH$_3$, or —S(O)$_2$NH$_2$.

The term "alkylamino" when used without the "substituted" modifier refers to the group —NHR, in which R is an alkyl, as that term is defined above. Non-limiting examples include: —NHCH$_3$ and —NHCH$_2$CH$_3$. The term "dialkylamino" when used without the "substituted" modifier refers to the group —NRR', in which R and R' can be the same or different alkyl groups, or R and R' can be taken together to represent an alkanediyl. Non-limiting examples of dialkylamino groups include: —N(CH$_3$)$_2$ and —N(CH$_3$)(CH$_2$CH$_3$). The terms "arylamino", "aralkylamino", and "alkoxyamino" when used without the "substituted" modifier, refers to groups, defined as —NHR, in which R is aryl, aralkyl, and alkoxy, respectively. A non-limiting example of an arylamino group is —NHC$_6$H$_5$. The term "alkylimino" when used without the "substituted" modifier refers to the divalent group =NR, in which R is an alkyl, as that term is defined above. When any of these terms is used with the "substituted" modifier one or more hydrogen atom attached to a carbon atom has been independently replaced by —OH, —F, —Cl, —Br, —I, —NH$_2$, —NO$_2$, —CO$_2$H, —CO$_2$CH$_3$, —CN, —SH, —OCH$_3$, —OCH$_2$CH$_3$, —C(O)CH$_3$, —NHCH$_3$, —NHCH$_2$CH$_3$, —N(CH$_3$)$_2$, —C(O)NH$_2$, —C(O)NHCH$_3$, —C(O)N(CH$_3$)$_2$, —OC(O)CH$_3$, —NHC(O)CH$_3$, —S(O)$_2$H, or —S(O)$_2$NH$_2$.

As used herein, the term "about" refers to the stated value, plus or minus 5% of that stated value.

As used herein, the abbreviations PBI, a polybenzimidazole polymer; 2-MI, 2-methylimidazole; 2-EI, 2-ethylimidazole; 2-PI, 2-phenylimidazole; PDI, polydispersity index; and 6FDD, a 6FDA based co-polyimide polymer.

The above definitions supersede any conflicting definition in any of the reference that is incorporated by reference herein. The fact that certain terms are defined, however, should not be considered as indicative that any term that is undefined is indefinite. Rather, all terms used are believed to describe the disclosure in terms such that one of ordinary skill can appreciate the scope and practice the present disclosure.

VI. EXAMPLES

The following examples are included to demonstrate particular embodiments of the disclosure. It should be appreciated by those of skill in the art that the techniques disclosed in the examples which follow represent techniques discovered by the inventor to function well in the practice of the disclosure, and thus can be considered to constitute particular modes for its practice. However, those of skill in the art should, in light of the present disclosure, appreciate that many changes can be made in the specific embodiments which are disclosed and still obtain a like or similar result without departing from the spirit and scope of the disclosure.

Example 1—Materials and Methods

All chemicals and solvents were used as received unless otherwise noted. Anhydrous 1-methyl-2-pyrrolidone (NMP, 99.8% purity) and 2-methylimidazole were purchased from Sigma Aldrich. Anhydrous dimethyl acetamide (DMAc, 99.8% purity) was purchased from EMD chemicals. 4,4-(hexafluoroisopropylidene) diphthalic anhydride (6FDA, >99% purity) was purchased from Akron Polymer Systems Inc. and was dried under vacuum at 150° C. prior to use. 2,4,6-Trimethyl-1,3-phenylenediamine (DAM, >97% purity) was purchased from TCI America and purified further by vacuum sublimation. 3,5-Diaminobenzoic acid (DABA, 98% purity) was purchased from Sigma-Aldrich and was purified by recrystallization from water. Polybenzimidazole (PBI) was purchased from PBI Performance Inc. (26 wt. % in DMAc, 1.5% (w/w) LiCl, Mw~30000) and was used as received.

The synthesis of 6FDD (Scheme 1) was carried out using thermal imidization (in NMP) following a published procedure (Omole et al., 2008). The synthesized polymer had a Mw of 170,000 and PDI of 2.3.

Scheme 1: Preparation of 6FDD

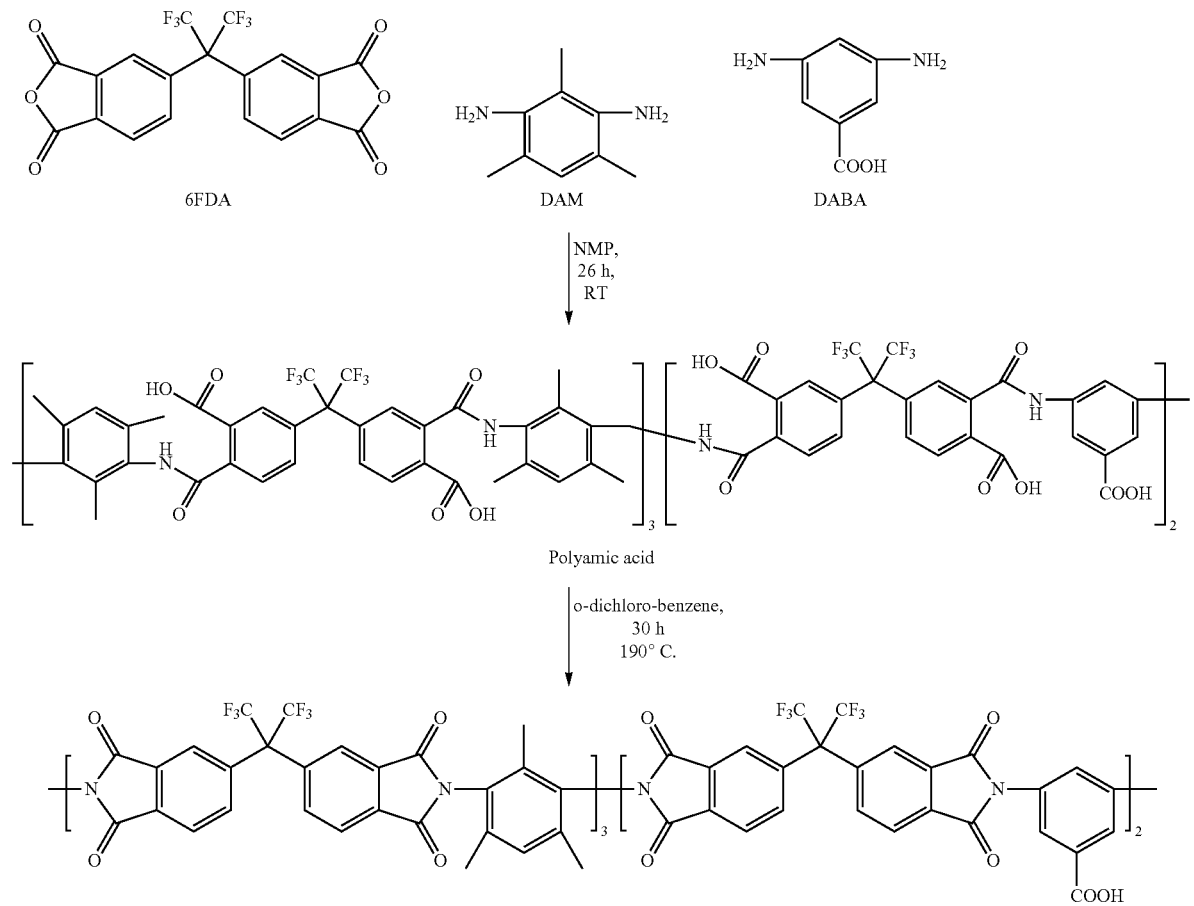

Separate solutions of ~2% (w/w) PBI and 6FDD were prepared in DMAc by stirring at 80° C. for 24 h. In the preparation of polymer blends, solutions of 6FDD were always added to PBI solutions. The total polymer concentration of the final polymer mixture solution was ~2% (w/w). To induce phase separation as well as to concentrate the blend solution, excess DMAc was evaporated at 80° C. The concentrated polymer solutions were then cast onto a glass substrate using a Sheen automatic applicator (1133N) equipped with a doctor blade. The membranes were initially dried using a heated casting table (50° C. for 12 hours) under a $N_2$ flow. Finally, the membranes were peeled off from the glass substrate and annealed further under vacuum using a heating cycle from 80° C. to 250° C., followed by cooling down to room temperature under vacuum.

The 2-MI compatibilized membranes were fabricated in the same way as the polymer blend membrane, but with the addition of a 2-MI solution. The weight ratios of 5% and 9% [(weight of 2-MI/(total polymer weight+2-MI weight)] in DMAc were prepared separately by stirring at 80° C. This cycle was repeated for two hours and then ⅓ of the PBI solution was added to the dispersion. Then resulting 2-MI polymer dispersion was subjected to alternate stirring and sonication. This cycle was repeated twice and then the rest of the PBI was added and stirred at 80° C. in a closed glass vial. After that the 6FDD polymer solution was added dropwise to the 2-MI/PBI mixture and stirred further. Finally, excess DMAc was evaporated at 80° C. Casting, drying and annealing of the membranes were performed using the same protocol as for the polymer blends.

Example 2—Membrane Properties

Membranes prepared from the polymer blends with the compatibilization agent described herein show good membrane flexibility. The flexibility of the membranes is shown in FIG. 3.

i. SEM Investigation of Membrane Microstructure

Microstructures of these novel blend membranes were analyzed with SEM imaging. First the morphology of the 6FDD:PBI (50:50) membrane was investigated on freeze-fractured cross-sections (FIG. 4A). To confirm the identities of the dispersed and continuous phases, samples of the membranes were subjected to Soxhlet extraction using THF, which selectively removed 6FDD. FIG. 4B shows an SEM image of a 6FDD:PBI (50:50) THF-extracted membrane confirming that the dispersed phase is 6FDD and the continuous phase is PBI. This confirmed that the membrane microstructure has the desired matrix-droplet (MD) type morphology as expected in the novel hypothesized model.

However the size and the distribution of the dispersed phase domains are not uniform which is typical of an immiscible polymer blend. When 5 wt % of 2-MI was incorporated into the 6FDD:PBI (50:50) blend, surprisingly the domain sizes of the 6FDD became smaller and more uniform compared to the pure polymer blend (FIGS. 5A & 5B). This observation was similar to the ZIF-8 6FDD:PBI (50:50) system described in Example 5. This effect is further illustrated by the histograms in FIGS. 6D-F.

Since the 6FDD domain sizes were very small, the 6FDD phase was extracted with THF. The average domain size of the dispersed phase is large and shows a wide distribution (1.46±0.60 μm) in the 6FDD:PBI (50:50) blend (FIG. 6D) without 2-MI addition. However, with only 5 wt % added 2-MI to the same blend (FIG. 6E, the average domain size decreased to 260±40 nm. It is important to note that not only did the dispersed domains become smaller, but also they also became more uniform after the incorporation of 2-MI. As the 2-MI loading was further increased to 9 wt % the domain size of the 6FDD phase became even smaller in size (FIG. 6F). The average diameter of the dispersed phase further decreased to 230±50 nm, which is a modest reduction compared to that of the 5 wt % 2-MI but a large reduction compared to 6FDD:PBE (50:50). This indicates that as the 2-MI loading increases, the domain size of the dispersed phase became smaller and uniform compared to that of the pure blend suggesting an enhanced compatibility between the polymers.

ii. ATR-FTIR Analysis of Membranes

ATR-FTIR spectroscopy was performed in order to confirm the presence of individual components in the blend membranes and also to investigate if any major chemical change had occurred during the membrane fabrication process. First ATR-FTIR spectroscopic analysis was performed on pure polymers and 6FDD:PBI (50:50) blends. 6FDD shows characteristic peaks corresponding to polyimides at 1785 $cm^{-1}$ (symmetric C=O stretching vibration), 1721 $cm^{-1}$ (asymmetric C=O stretching vibration), 730 $cm^{-1}$ (deformation of imide ring band of OC—N—CO), and 1252 $cm^{-1}$ (—CF stretch) from the 6FDA group. The broad weak absorption at 3200-3500 $cm^{-1}$ can be attributed to the vibration band of —OH in the DABA moiety (Qiu et al., 2011).

Figure 7:
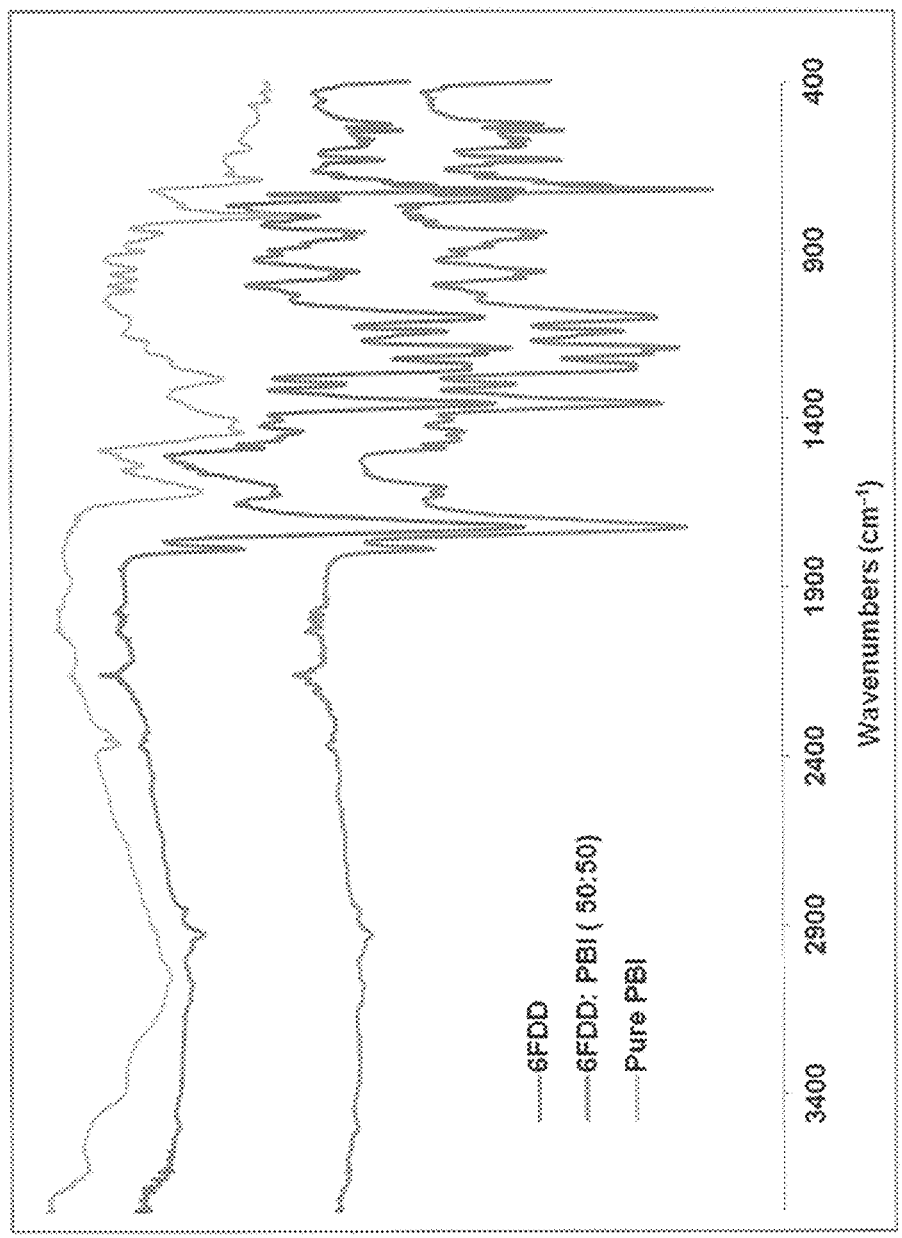
FIG. 7 shows ATR-FTIR spectra of 6FDD, PBI, and 6FDD:PBI (50:50).
Figure 8:
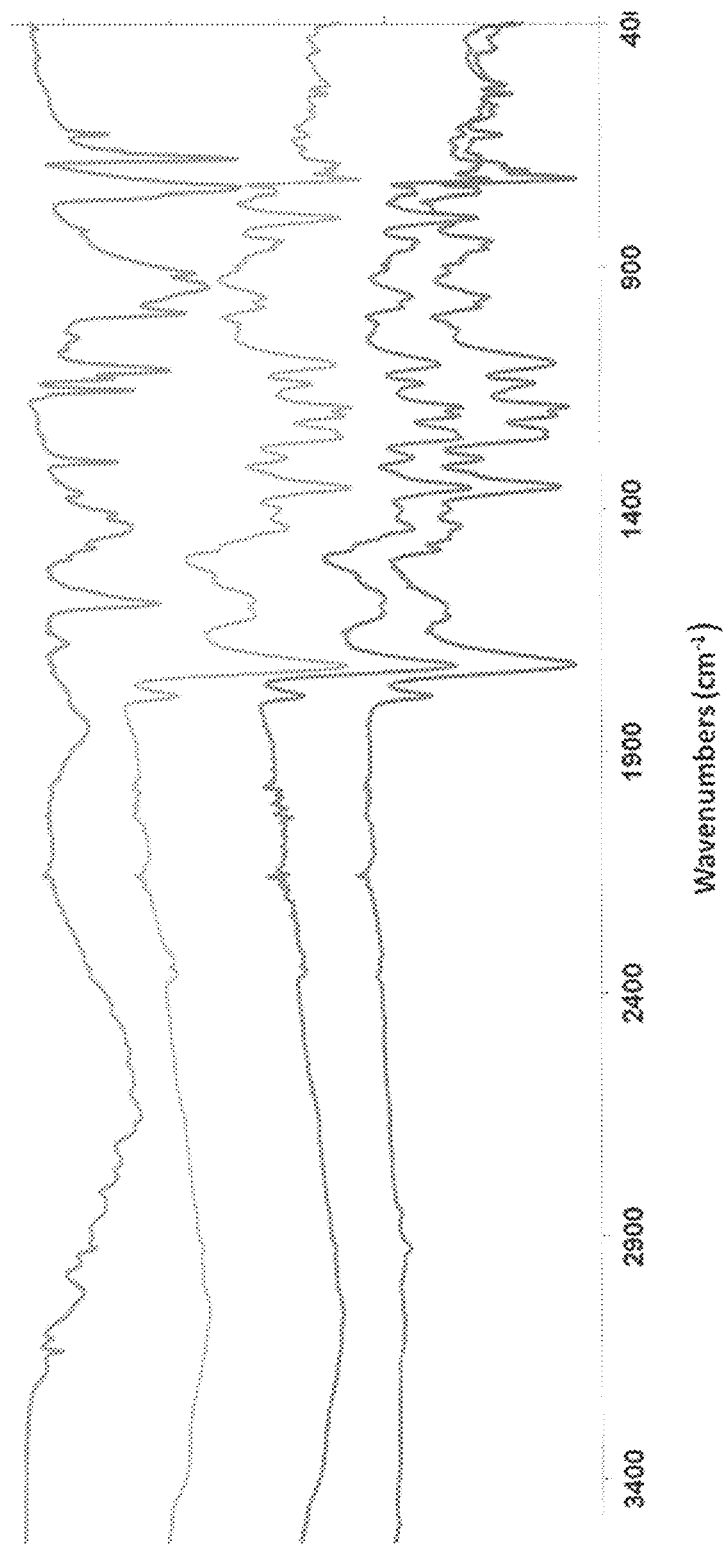
FIG. 8 shows ATR-FTIR spectra of 2-methylimidazole (top) and 6FDD:PBI (50:50) with 9 wt % (second from top), 5 wt % (third from top), and 0 wt % (bottom) of 2-methylimidazole.
Figure 9:
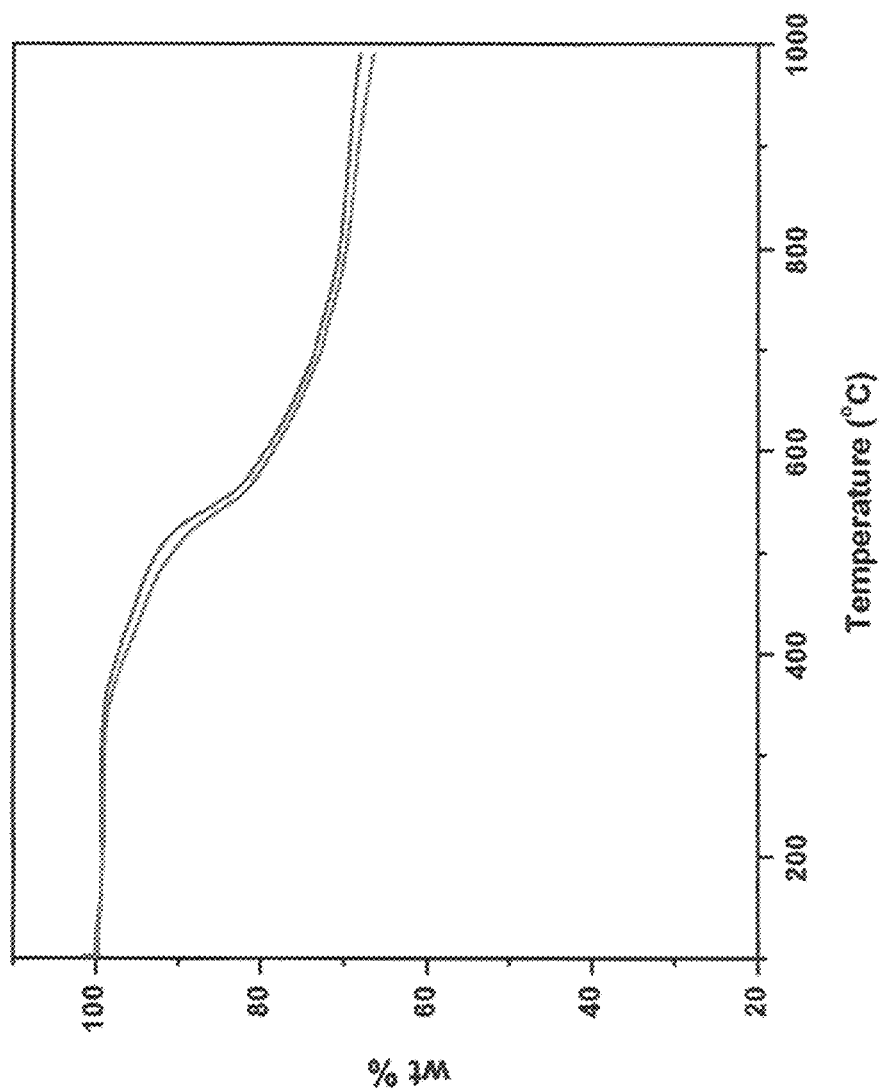
FIG. 9 shows a TGA plot of 6FDD:PBI (50:50) blend membrane with 9 wt % and 5 wt % 2-methylimidazole.

RBI shows characteristic peaks at 1440, 1600, and 1620 $cm^{-1}$ (benzimidazole ring vibration modes), 1500-1650 $cm^{-1}$ (derived from —C=C and —C—N stretching) and 2800-3500 $cm^{-1}$ (N—H stretching) (Kumbharkar et al., 2011). In the 6FDD:PBI (50:50) blend, these peak positions were present without major chemical shifts. However it is possible to have some interactions in-between COOR groups of 6FDD and —N—H groups of PBI, which may not have been observed due to the overlapping. These spectra suggest the presence of both polymers and absence of major chemical changes in 6FDD:PBI (50:50) blend compared to pure polymers (FIG. 7). Next the membranes with 2-MI were compared with the 6FDD:PBI (50:50) membrane. 2-MI shows characteristic vibrations at 3470 cm-1 (—N—H stretch), 780 $cm^{-1}$ (—N—H waging), 1110 $cm^{-1}$ (C—N stretching), 2500-3200 $cm^{-1}$ (C—H stretch in imidazole ring) and 1850 $cm^{-1}$ (imidazole ring vibration absorption) (Liu and Li, 2010). However, the —NH absorption at 3470 $cm^{-1}$ was not observed which could be due to the intermolecular H-bonding. As shown in FIG. 8, all the membranes fabricated with 2-MI show a similar spectra to that of pure 6FDD:PBI (50:50) membrane. Here also the characteristic peaks of both PBI and 6FDD polymers were present in the membranes without any major peak shifts. Furthermore, none of the peaks corresponding to 2-MI were found in nay of the blend membranes. This could be due to the boiling off of 2-MI during the annealing process. However, to confirm the absence of 2-MI in membranes, a TGA experiment was conducted with 6FDD:PBI (50:50) membranes where one contained 9 wt % 2-MI initial loading and another without 2-MI (FIG. 9).

The TGA plot confirmed that 2-MI is not present in the membrane after annealing. Also the ATR-FTIR results suggest that chemical functionalities have not undergone major alterations due to the membrane fabrication procedure, which includes phase transition of 2-MI.

iii. Compatibilization with 2-MI

Compatibilization of immiscible polymer blends have been achieved utilizing different materials including copolymers and nanoparticles (Semsarzadeh et al., 2012, Fenouillot et al., 2009 and Goodarzi et al., 2013). In copolymer controlled compatibilizers, the copolymer is localized at the interface which lowers the interfacial tension. Generally, the copolymers are made of subunits of both polymers and thus it can migrate and localize at the interface. On the other hand, nanoparticles have also been employed and some of those have been grafted with polymer chains in order to be compatible with one polymer phase (Chung et al., 2012). In addition to these materials, nanomaterials such as graphene oxide have also been used as compatibilizers due to the nanomaterials' amphiphilic nature which also allow the nanomaterials to localize at the interface (Cao et al., 2012). Wu and coworkers have reported that the graphene oxide sheets form H-bonding with polar polyimide polymers while forming strong hydrophobic interactions with polyphenylene oxide (Cao et al., 2012). Similarly 2-methylimidazole also contains an aromatic region which possibly forms hydrophobic interactions while polar —NH and imine functionalities can form H-bonding. To investigate this effect, two membranes were fabricated incorporating 33.3 wt % 2-MI in 6FDD and in PBI. Both membranes were annealed at 100° C. for five days and the temperature was set at 100° C., which is lower the melting temperature of 2-MI. Resulting membranes were analyzed with TGA and ATR-FTIR.

Figure 10:
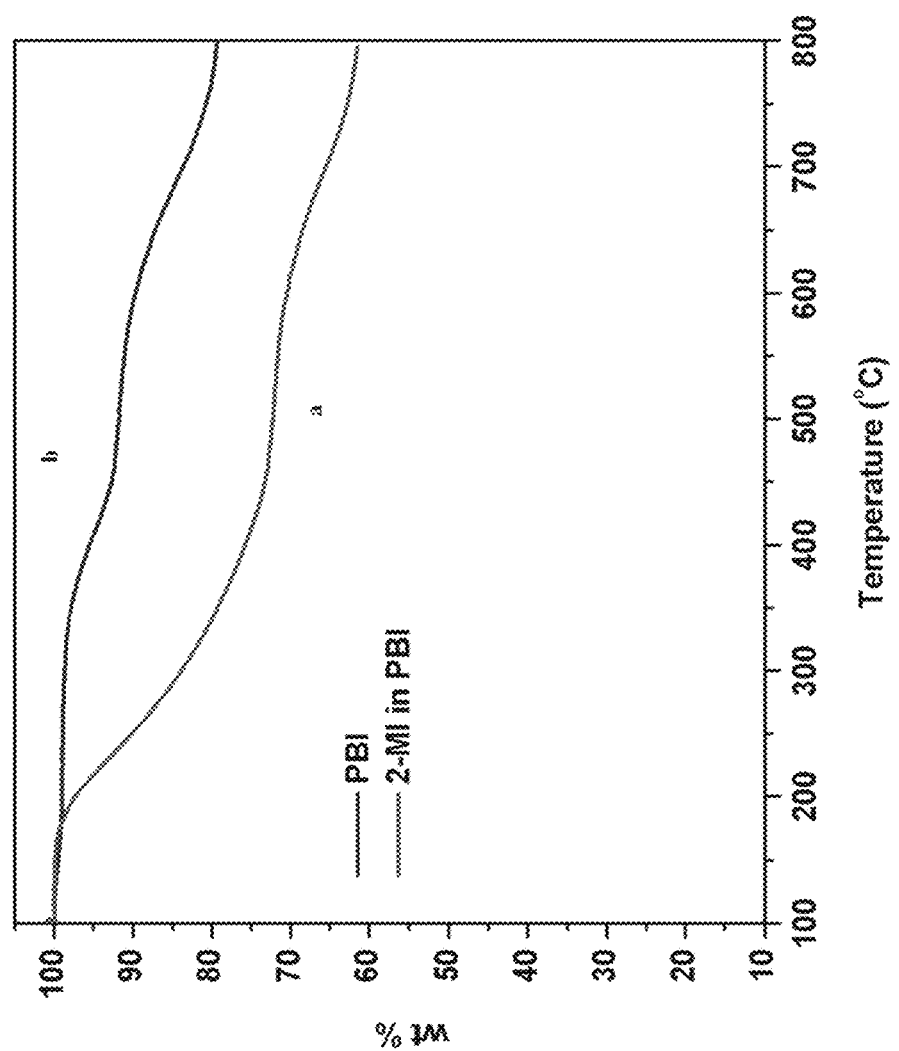
FIG. 10 shows a TGA plot of PBI without 2-methylimidazole (top) and with 2-methylimidazole (bottom).
Figure 11:
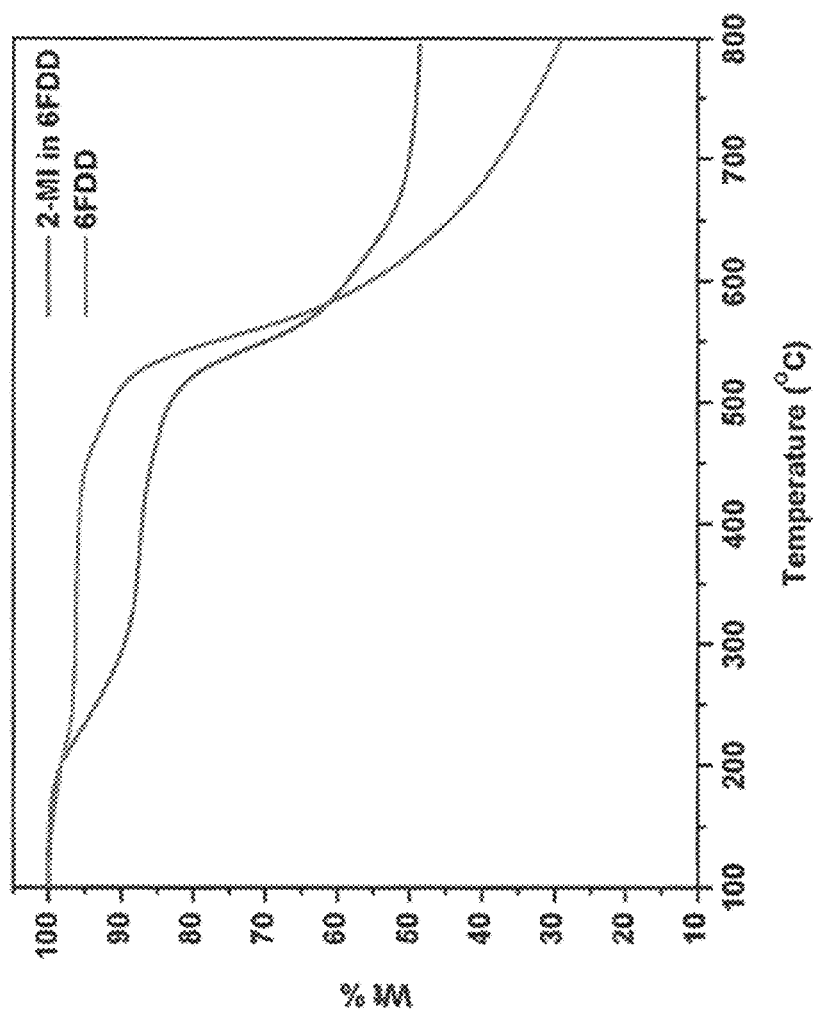
FIG. 11 shows a TGA plot of 6FDD without 2-methylimidazole (top) and with 2-methylimidazole (bottom).

The weight loss from 200-400° C. region is attributed to the removal of 2-MI. (FIGS. 10 & 11). The melting point of 2-MI is 142-143° C. while the boiling point is 267° C. (Sigma Aldrich Item M50850). This weight loss in both TGA plots confirmed the presence of 2-MI in membranes. Also the lack of weight loss up to 200° C. confirmed that the membranes are free of DMAc.

After confirming the presence of 2-MI ATR-FTIR analysis of the membranes was performed to investigate the chemical interactions between polymers and 2-MI.

Figure 12:
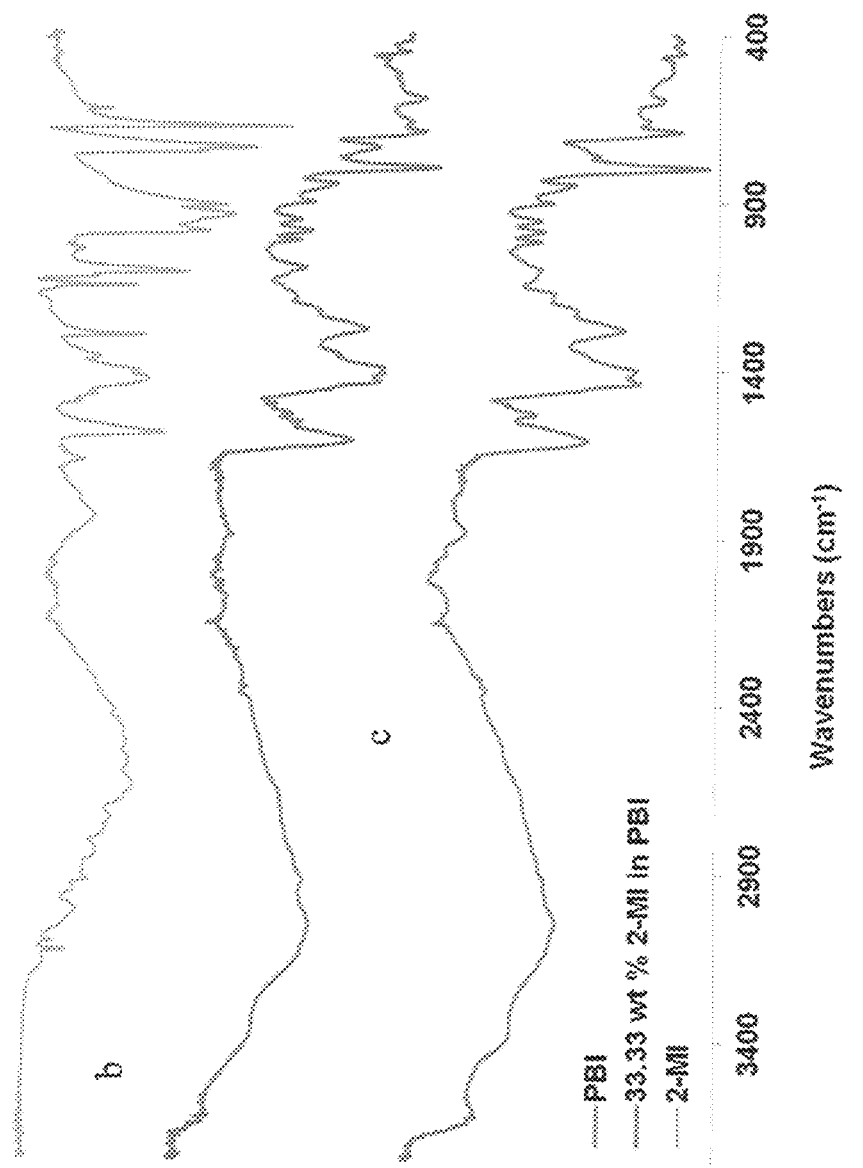
FIG. 12 shows ATR-FTIR spectra of 2-methylimidazole (top), PBI with 33.3 wt % 2-methylimidazole (middle), and PBI (bottom).
Figure 13:
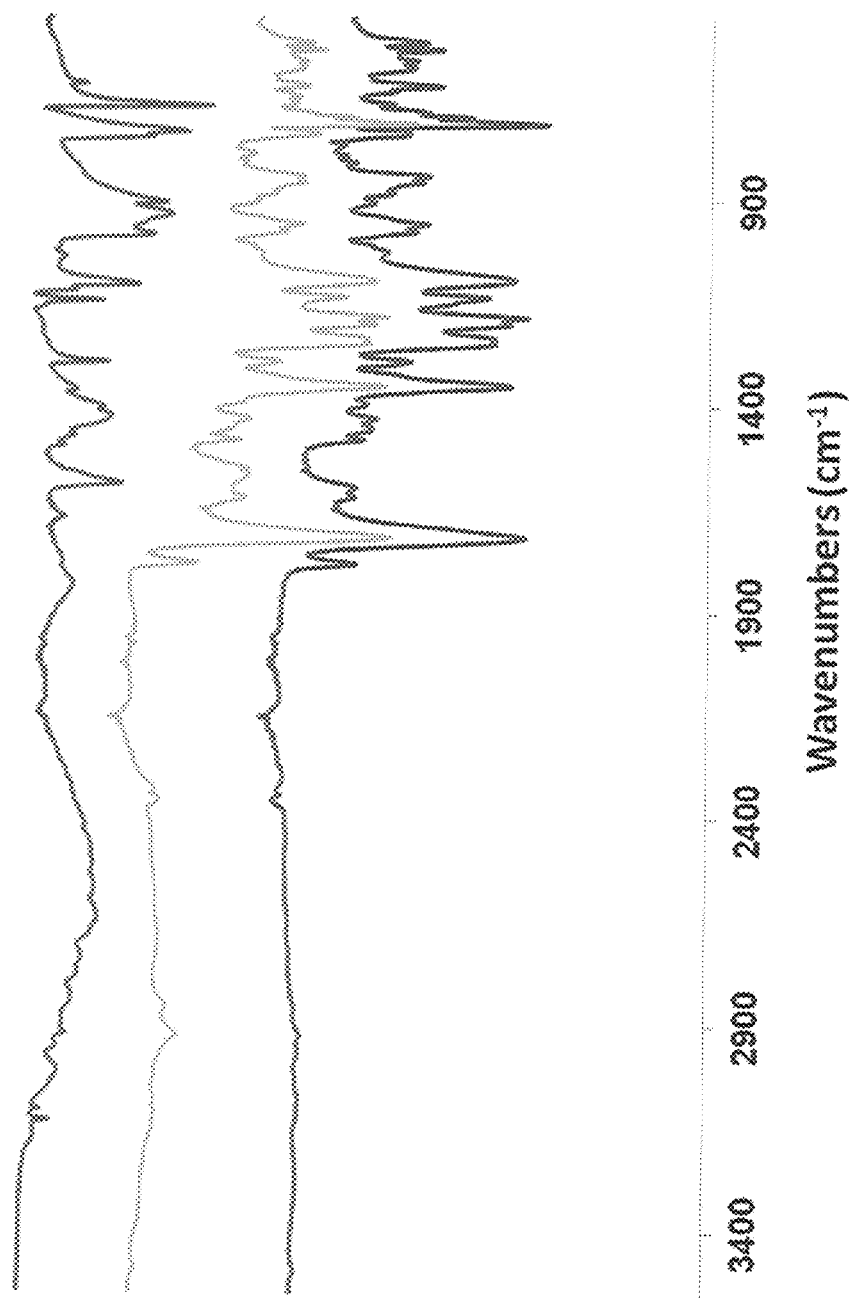
FIG. 13 shows ATR-FTIR spectra of 2-methylimidazole (top), 6FDD with 33.3 wt % 2-methylimidazole (middle), and 6FDD (bottom).

In the comparison of the ATR-FTIR spectra of PBI with and without 2-MI, the —NH stretch, the benzimidazole ring vibration region, and —C═N stretching was compared with the —CH stretch and imidazole ring vibrations of 2-MI where possible interactions would occur (FIG. 12). However, significant peak shifts were not observed in the 33.3 wt % 2-MI in PBI membrane in the regions of interest. The —C—H stretching vibration region of the 2-MI was not present in the 33.3 wt % 2-MI in PBI, which could be due to the partial overlap with the —C—H stretching absorption region of the PBI. This suggests that there are no strong chemical interactions between 2-MI and PBI. However, since 2-MI has an imidazole moiety similar to PBI, it is possible that the 2-MI packs well within the polymer chains. Therefore, even though, ATR-FTIR analysis could not confirm the presence of chemical interactions, it is possible to have additional hydrophobic interactions especially in the overlapping regions. The comparison of ATR-FTIR spectra of the membrane containing 33.3 wt % 2-MI in 6FDD with 2-MI and pure 6FDD reveals that most of the vibrations correspond to 2-MI overlap with that of the blend membrane (FIG. 13). However, the —C═N stretching vibration that appears at ~1593 cm$^{-1}$ appeared more red-shifted in the blend membrane. It has been reported previously that the —OH functionalities are capable of forming H-bonds with imine N (Qu, 2007).

Figure 14:
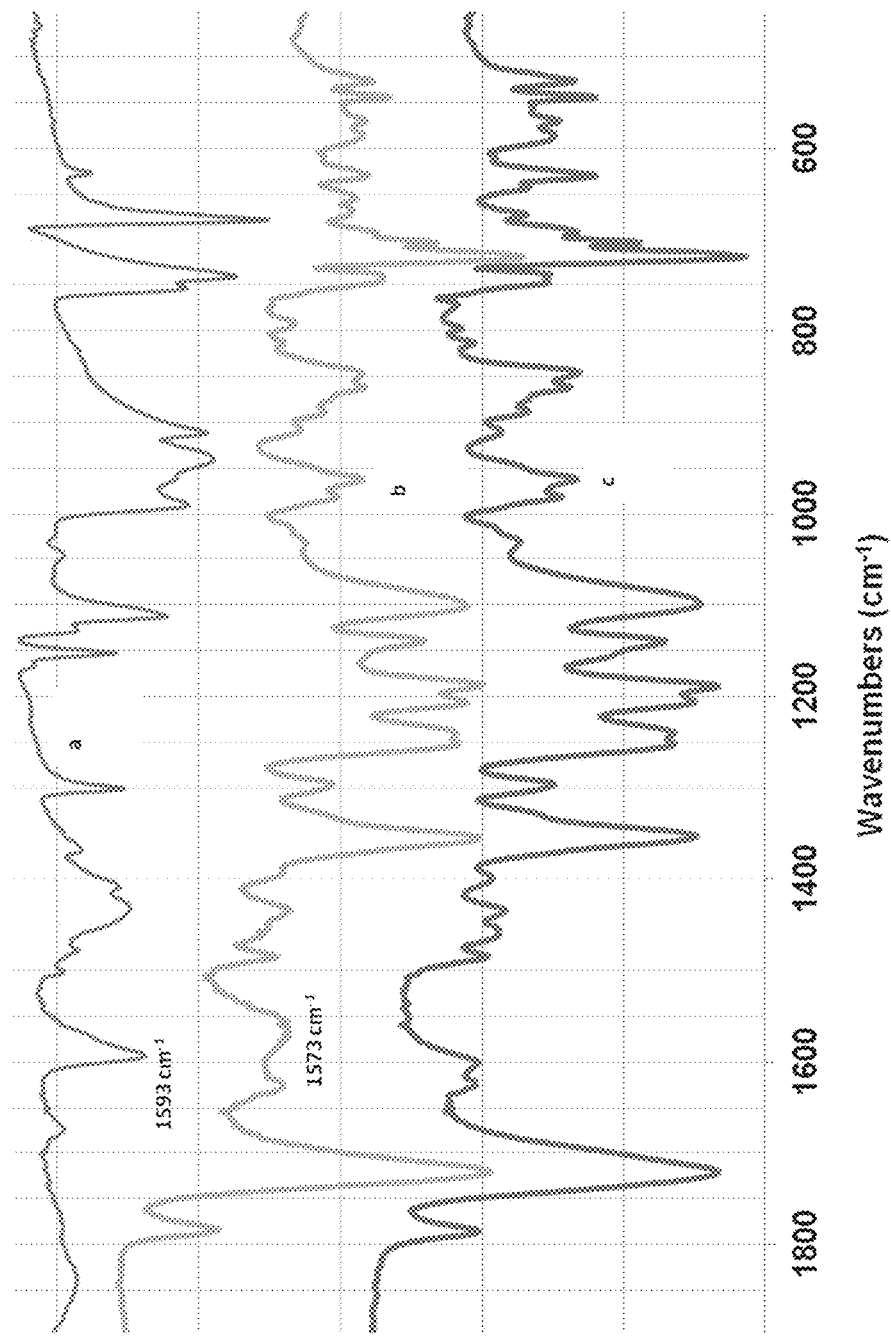
FIG. 14 shows an expansion of the ATR-FTIR spectra of 2-methylimidazole (top), 6FDD with 33.3 wt % 2-methylimidazole (middle), and 6FDD (bottom) around the 600-1900 cm$^{-1}$ region.
Figure 15:
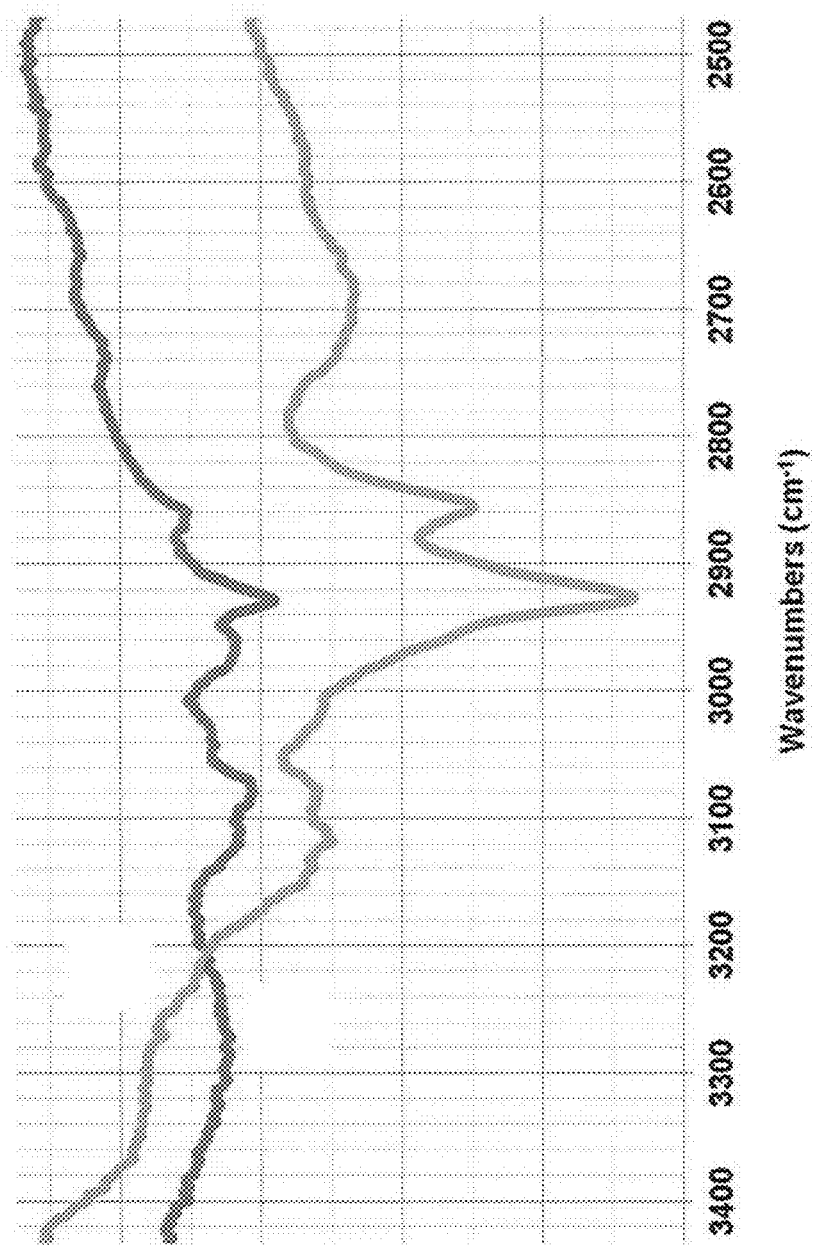
FIG. 15 shows a comparison of the ATR-FTIR spectra of 6FDD with (bottom) and without (bottom) 2-methylimidazole with expansion around the 2500-3400 cm$^{-1}$ region.

Therefore, an investigation was performed on the 2500-3500 cm$^{-1}$ region where the —OH stretch of the —COOH group in the DABA moiety of 6FDD and the 1200-1900 cm$^{-1}$ region where —C═N stretch from 2-MI appears. As shown in the FIG. 14, a ~20 cm$^{-1}$ red shift on the imine stretching was observed suggesting a clear alteration to the original bond. To confirm this effect, the —OH stretching absorption was investigated further.

In pure 6FDD, a weak broad peak appears between 3200-3400 cm$^{-1}$ which is assigned to the —OH stretching vibration of 6FDD. However, when the 2-MI is incorporated into the 6FDD, the —OH stretching absorption no longer appeared in the spectrum, suggesting possible interactions with 2-MI and most probably H-bonding between —OH and the imine functional groups as previously described (Omole et al., 2008).

Figure 16:
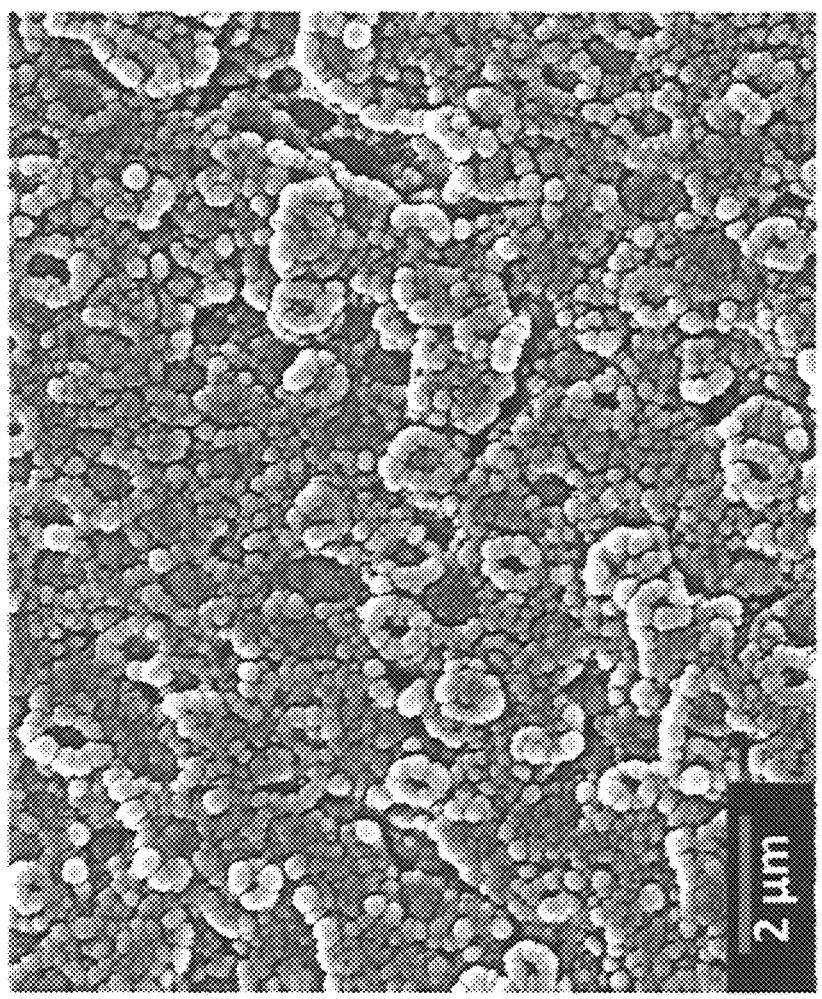
FIG. 16 shows a SEM image of a cross-section of 9 wt % 2-methylimidazole 6FDD:PBI (50:50) membrane prepared as described herein.

Since 2-MI can potentially form hydrophobic and π-π interactions with PBI and H-bonds with 6FDD, it is possible for 2-MI to localize at the interface during the phase separation of the polymers acting analogously to a surfactant. However, one can envision that 2-MI can be either at the 6FDD or PBI phase. If 2-MI localizes in the 6FDD domains, the uniform morphology the dispersed phase would not be observed. Because, there will be no restriction to the phase coarsening of the dispersed phase to lower the interfacial tension. Therefore, if 2-MI localizes at the 6FDD domains a microstructure similar to pure 6FDD:PBI (50:50) blend would be observed. Localization of the nanoparticles in the continuous phase can also lead to uniformly dispersed domain structures where the nanoparticles can act as a physical barrier for coalescence. However, with the lower surface area as compared to a nanoparticle, 2-MI may not be efficient in restricting coalescence. Therefore, 2-MI should localize at the interface, similar to a surfactant, minimizing interfacial tension between the polymer phases. To further support this argument, another membrane was fabricated by slightly modifying the procedure. In the prior method, 2-MI was added to PBI and subjected to prolonged stirring and sonication before adding 6FDD. In the modified procedure, 2-MI was first added to 6FDD and subjected to stirring and sonication and then PBI was added. This membrane was cast following the same procedure. The resulting membrane microstructure was investigated under SEM imaging and shown in FIG. 16. Surprisingly this membrane also contains a microstructure similar to the other 2-MI added membranes with uniform 6FDD domains. If 2-MI localizes at 6FDD phase since imine groups can interact with 2-MI, uniform size distribution of 6FDD would not be observed since there is no restriction for phase coarsening. Therefore, 2-Mt has to migrate from the 6FDD phase out either to the interface or to the PBI phase in order to obtain such morphology. Considering the ability of 2-MI to potentially form interactions with PBI as well, without wishing to be bound by any theory, the 2-MI may localize at the interface, minimizing overall interfacial energy of the system.

Example 3—Gas Separation Properties

6FDD is a glassy polyimide having high gas permeability with relatively low $H_2/CO_2$ selectivity. PBI has higher selectivity values for $H_2$ separations but low $H_2$ permeability (Table 2). A ~800% increase in $H_2$ permeability was obtained in the 6FDD:PBI (50:50) blend compared to pure PBI. Also, the selectivity of the PBI was retained since the adsorbed gasses have to pass through the continuous highly selective PBI phase.

TABLE 2

Gas Permeability Properties of the Membranes

| Membrane | P—$H_2$ (Barrers) | P—$CO_2$ (Barrers) | α-$H_2$/$CO_2$ |
|---|---|---|---|
| 6FDD:PBI (50:50) | 7.54 | 0.73 | 11.05 |
| 5 wt % 2-MI 6FDD:PBI (50:50) | 5.8 | 0.51 | 11.3 |
| 9 wt % 2-MI 6FDD:PBI (50:50) | 4.0 | 0.10 | 39 |
| 6FDD | 100 | 52.60 | 1.9 |
| PBI | 1.11 | 0.1 | 11.1 |

Figure 17:
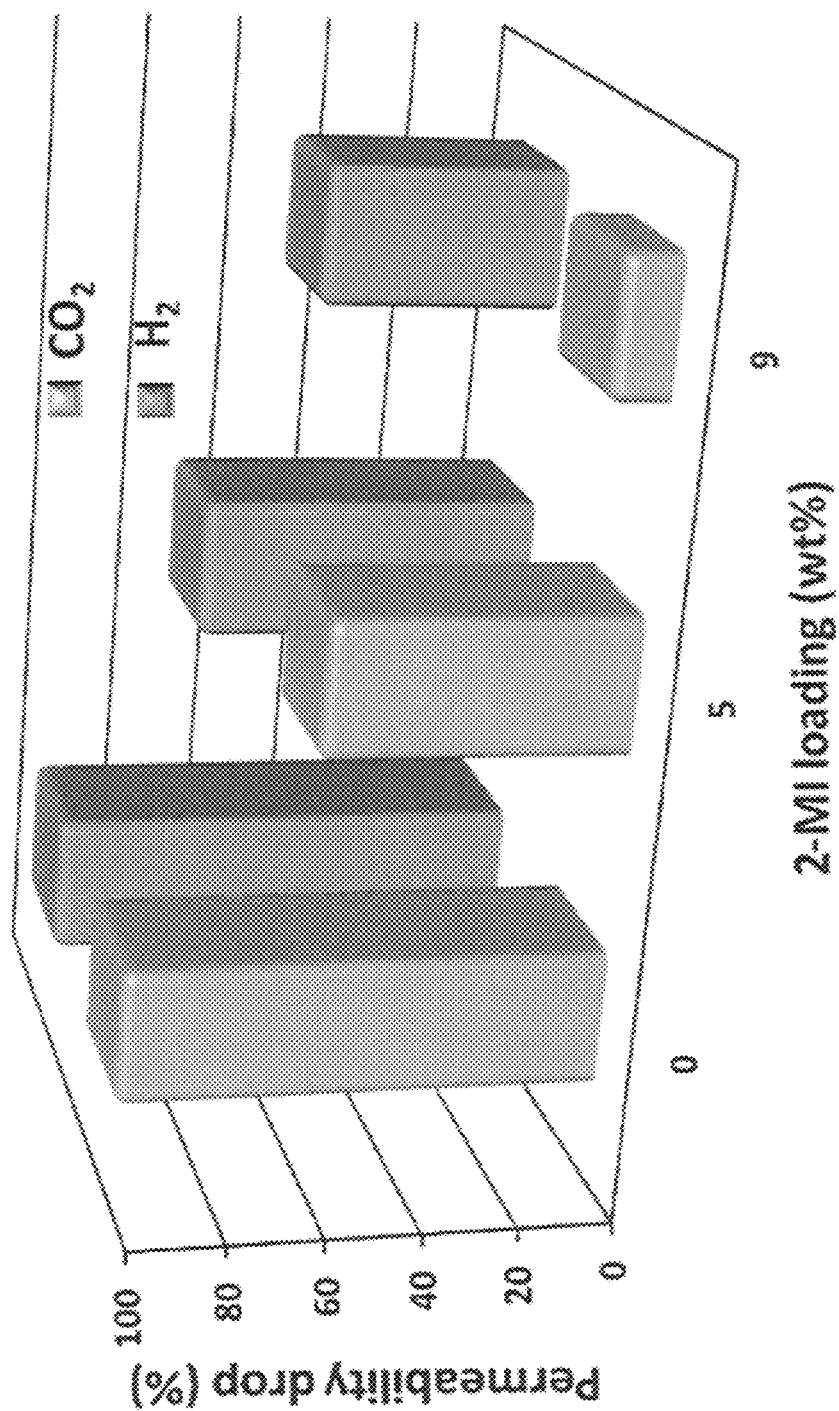
FIG. 17 shows the variation of percent gas permeability drop versus 2-methylimidazole loading.
Figure 18:
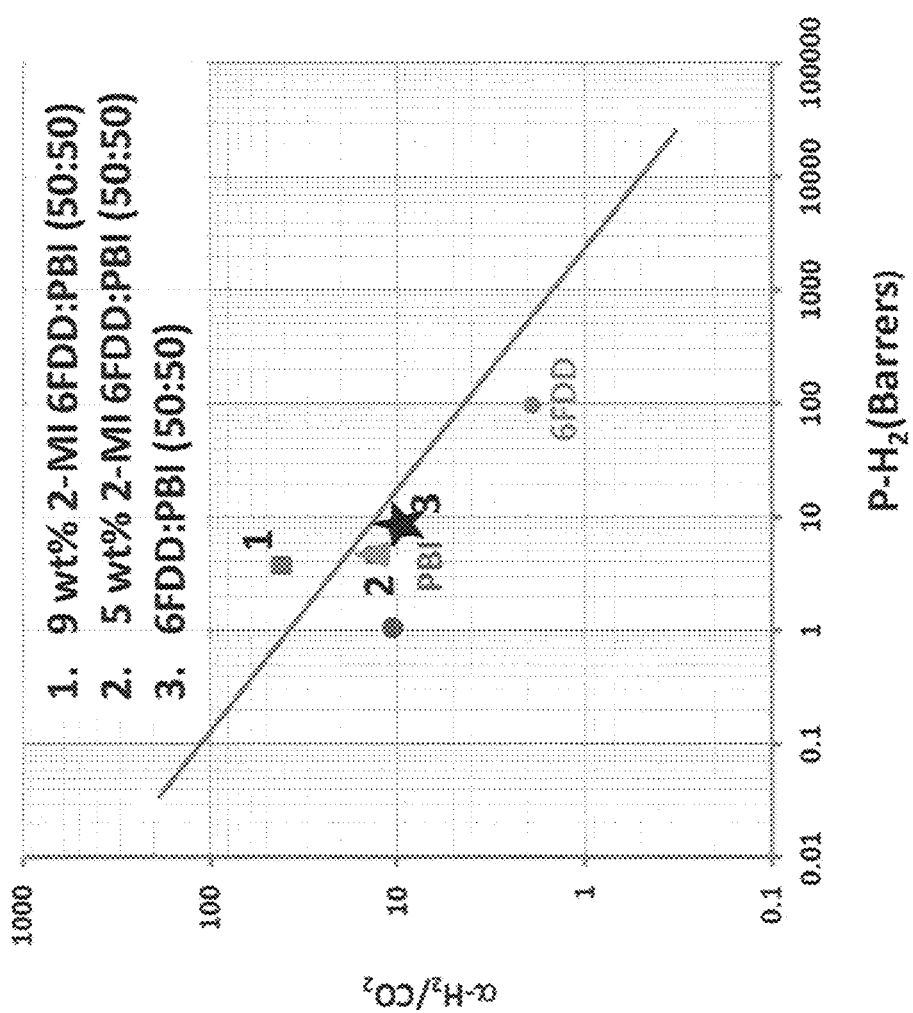
FIG. 18 shows a Robeson plot of gas separation properties.

Increase in permeability in the pure blend membrane can be attributed to the incorporation of highly permeable 6FDD to the PBI matrix. Then with the incorporation of 5 wt % 2-MI, $H_2$ permeability has decreased slightly while the selectivity has increased marginally. Then as the 2-MI loading was increased to 9 wt % the $H_2$/$CO_2$ selectivity has increased by ~350%. Without wishing to be bound by any theory, this data indicates that the incorporation of 2-MI affects the selectivity significantly in addition to the compatibilization of the polymer blend. It is important to notice that in both membranes gas permeabilities have decreased as the 2-MI loading increases. The $CO_2$ permeability has decreased significantly compared to $H_2$ which accounts for the high $H_2$/$CO_2$ selectivity of 38 (FIG. 17). 2-MI undergoes a phase transition during the membrane annealing procedure in which it melts at 142-143° C. and boils at 267-268° C. (Sigma Aldrich Item M50850) Even though the highest annealing temperature is 250° C., due to the vacuum, the majority of the 2-MI has been removed from the membranes as indicated by the TGA data (FIG. 9). Without wishing to be bound by any theory, during this evaporation process, the evaporation of molten 2-MI may create unique gas transport pathways, which are more selective for $H_2$ transportation over $CO_2$. Also, in some embodiments, since 2-MI localizes at the interface during the melting process it is possible that the polymer-polymer interface might contain residual amounts of molten 2-MI, which was not completely removed. Therefore, the presence of molten 2-MI might have contributed to the lower the gas permeabilities of all the gasses. This huge increase in $H_2$/$CO_2$ selectivity results in gas permeability properties by the instant polymer compositions that surpass the Robeson upper bound for $H_2$/$CO_2$ separations (FIG. 18).

Example 4—Metal Organic Framework Compatibilized Polymer Blends Methods and Materials i. Materials Anhydrous 1-methyl-2-pyrrolidone (NMP, 99.8% purity) was purchased from Sigma-Aldrich. Anhydrous dimethyl acetamide (DMAc, 99.8% purity) was purchased from EMD chemicals. 4,4-(hexafluoroisopropylidene)diphthalic anhydride (6FDA, >99% purity) was purchased from Akron Polymer Systems Inc. and was dried under vacuum at 150° C. prior to use. 2,4,6-trimethyl-1,3-phenylenediamine (DAM, >97% purity) was purchased from TCI America and purified further by vacuum sublimation. 3,5-diaminobenzoic acid (DABA, 98% purity) was purchased from Sigma-Aldrich and was purified by recrystallization from water. Polybenzimidazole (PBI) S26 product was purchased from PBI Performance Inc. (26 wt. % in DMAc, 1.5% (w/w) LiCl, $M_W$~30,000) and was used as received. Commercially available ZIF-8 (Basolite™ Z1200) was purchased from Sigma-Aldrich and was activated at 100° C. for 24 h under vacuum prior to use. Prior to use, all solvents were dried over activated 4 Å molecular sieves purchased from Sigma-Aldrich.

ii. Synthesis

The synthesis of 6FDD (described above in Scheme 1) was carried out using thermal imidization (in NMP) previously described in (Omole et al., 2008). The reaction was conducted under a nitrogen purge in a 100 mL three-neck flask equipped with a Dean Stark apparatus and a condenser. In the first step 2.000 g of 6FDA (4.502 mmol) in 8.5 mL of NMP were added drop wise to a solution of 0.274 g (1.808 mmol) DABA in 2.5 mL of NMP in a 100 mL three-neck flask (The monomer concentration in the flask was kept at ~20 wt. %). The mixture was stirred for 1 h at room temperature. Then 0.406 g (2.70 mmol) of DAM monomer in 2.00 mL of NMP was added to the reaction flask and stirred at room temperature for 26 h to produce polyamic acid. Next, 1 mL of NMP and 5 mL of o-dichlorobenzene were added to the reaction mixture, which was then heated to 190° C. and maintained at this temperature with stirring for 30 h. Finally, the polymer solution was precipitated into 100 mL of 1:1 water:methanol, filtered, and washed with methanol. The resultant beige powder was dried under vacuum for 2 days at 120° C. This method yielded 0.4 g of pale brown polymer (92% yield) with a Mw of 170,000 and PDI of 2.3.

iii. Membrane Fabrication

Separate solutions of 2% (w/w) PBI and 6FDD were prepared in DMAc by stirring at 80° C. for 24 h followed by filtering through 0.45 mm syringe filters. In the preparation of polymer blends, solutions of 6FDD were always added to PBI solutions. The total polymer concentration of the final polymer mixture solution was ~2% (w/w). To induce phase separation as well as to concentrate the blend solution, excess DMAc was evaporated by slowly purging with $N_2$ at 80° C. The concentrated polymer solutions were then cast onto a glass substrate using a Sheen automatic applicator (1133N) equipped with a doctor blade. The membranes were initially dried using a heated casting table (50° C. for 12 h) under a $N_2$ flow. Finally, the membranes were peeled off from the glass substrate and annealed further under vacuum using a heating cycle of 80° C. for 24 h, 150° C. for 12 h, 200° C. for 12 h and 250° C. for 24 h, followed by cooling down to room temperature under vacuum.

The mixed-matrix membranes (MMM) were fabricated in the same way as the polymer blend membranes, but with the addition of a ZIF-8 dispersion. The weight ratios of 5% and 10% (w/w) [(weight of ZIF-8)/(total polymer weight)] ZIF-8 in DMAc were prepared separately and subjected to alternate stirring and sonication (15 min each) to ensure good dispersion. This cycle was repeated for 2 h and then ⅓ of the PBI solution was added to the dispersion. The resulting ZIF-8 polymer dispersion was stirred for 30 min and sonicated for another 30 min. This cycle was repeated twice and then the rest of the PBI was added and stirred at 80° C. for 12 h in a closed glass vial. After that the 6FDD polymer solution was added dropwise to the ZIF-8/PBI mixture and stirred further. Finally, excess DMAc was evaporated by the slow purging by $N_2$ at 80° C. Casting, drying and annealing of the MMMs were performed using the same protocol as for the polymer blends.

iv. 6FDD Characterization

The chemical structure of 6FDD was confirmed by $^1$H NMR spectroscopy using a Bruker AVANCE III™ 500 NMR instrument. Samples were prepared in deuterated dimethyl sulfoxide with TMS as the internal standard.

Molecular weight ($M_w$) was determined ($M_w$~170,000, PDI 2.3) on a gel permeation chromatography (Viscotek GPC-max, VE2001) system equipped with a Viscotek TDA 302 Triple Array Detector and two ViscoGEL I-Series (I-MB-HMW 3078, Viscotek) columns in series. THF at a flow rate of 1 mL/min was used as the eluent, and polystyrene standards (Polymer Laboratories) were used for calibration. The chromatograms were analyzed using OmniSEC Software Version 4.6.

v. Membrane Characterization

Scanning electron microscope (SEM) images of membrane cross-sections were acquired using a Zeiss SUPRA®40 SEM with a field emission gun operating at 10 keV. Membrane cross-sections for SEM imaging were prepared by freeze-fracturing the samples after immersion in liquid nitrogen. These samples were coated prior to imaging using a Denton Vacuum Desk II sputter coater equipped with a gold/palladium target. The thicknesses of the membranes used in permeability studies were also measured by SEM. Thermogravimetric analysis (TGA) was done under nitrogen using a Perkin Elmer Pyris 1 TGA instrument operating from 100 to 700° C. at a heating rate of 10° C./min. Fourier transform infrared (FTIR) spectra were acquired using a Nicolet 360 FTIR spectrophotometer with a single bounce attenuated total reflectance (ATR) accessory (diamond crystal). Atomic force microscopy (AFM) images were obtained using a Bruker Multimode 8 atomic force microscope with NanoScope V controller in the PeakForce Tapping™ mode under ambient conditions. The polymer samples were clamped into a cross-section holder and cut into a triangle using a razor blade. The triangle was trimmed using a Leica UC7 with a Diatome Ultra diamond knife to generate the cross-section for imaging. Each height image was acquired using ScanAsyst® to optimize the variables for the PeakForce Tapping™ mode of operation. Off-line image analysis was completed using NanoScope Analysis 1.20 software. Transmission electron microscopy (TEM) images were obtained using a JEOL 1200 EX transmission electron microscope. The samples were sectioned using a Leica UC7 ultramicrotome with Diatome Ultra diamond knife and placed onto a c-flat holey carbon grid.

Example 5—Metal Organic Framework Compatibilized Polymer Blends Results and Discussion i. Polymer, 6FDD, Characterization Completion of the 6FDD (3:2) imidization was confirmed by the ATR-FTIR spectroscopy. TGA results show that the polymer is thermally stable up to 450° C. The GPC results indicate that the polymer has a weight average molecular weight ($M_w$) of 170,000 with a PDI of 2.3. The polymer structure was confirmed by $^1$H NMR spectroscopy.

ii. Membrane Characterization

Figure 19:
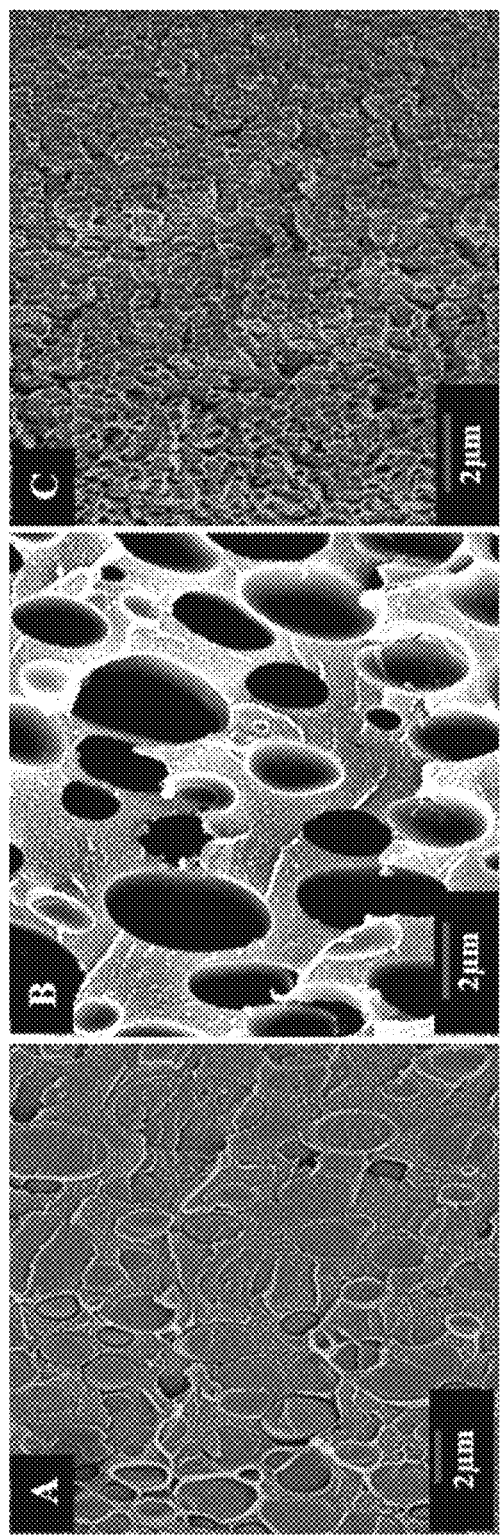
FIGS. 19A-19C show SEM images of 6FDD:PBI (50:50) membrane cross-section before (FIG. 19A) and after (FIG. 19B) THF extraction of 6FDD and (FIG. 19C) 5 wt % ZIF-8 6FDD:PBI (50:50) membrane.
Figure 20:
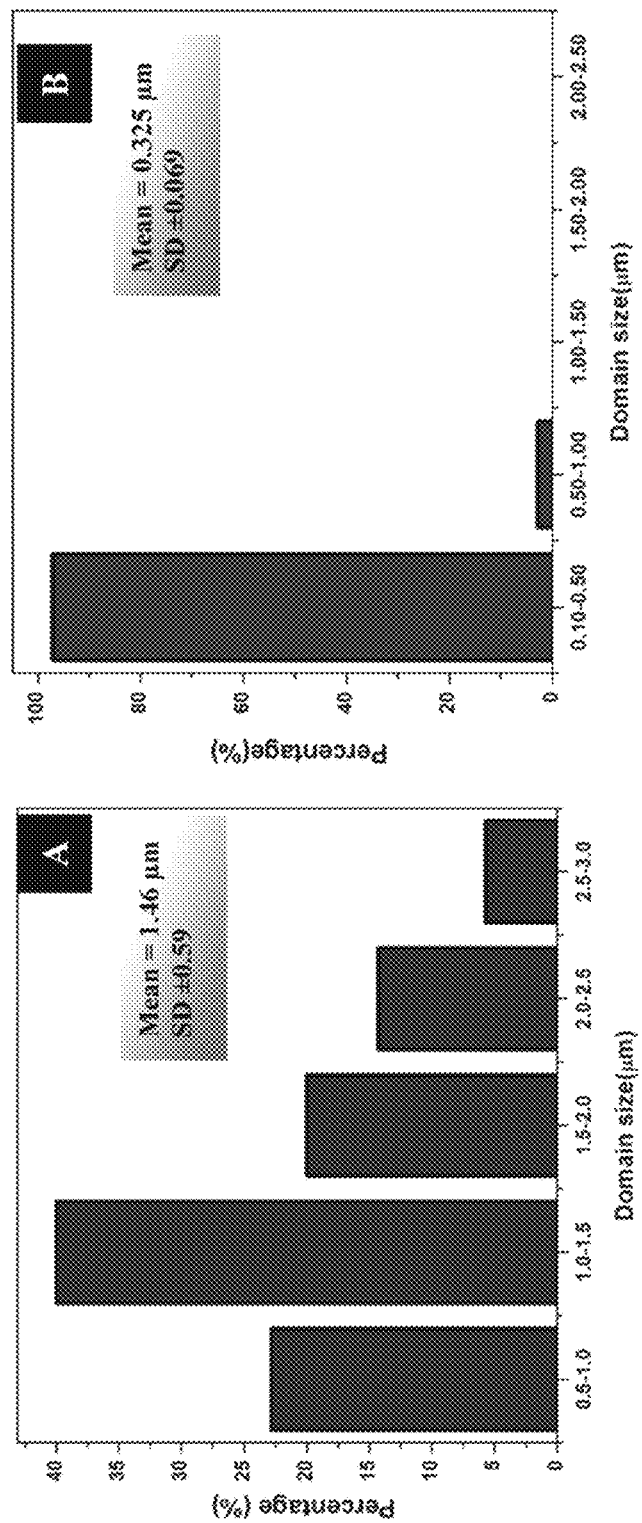
FIGS. 20A & 20B show histograms of domain sizes of the dispersed phase in 6FDD:PBI (50:50) (FIG. 20A) and 5% (w/w) ZIF-8 6FDD:PBI (50:50) membranes (FIG. 20B).
Figure 21:
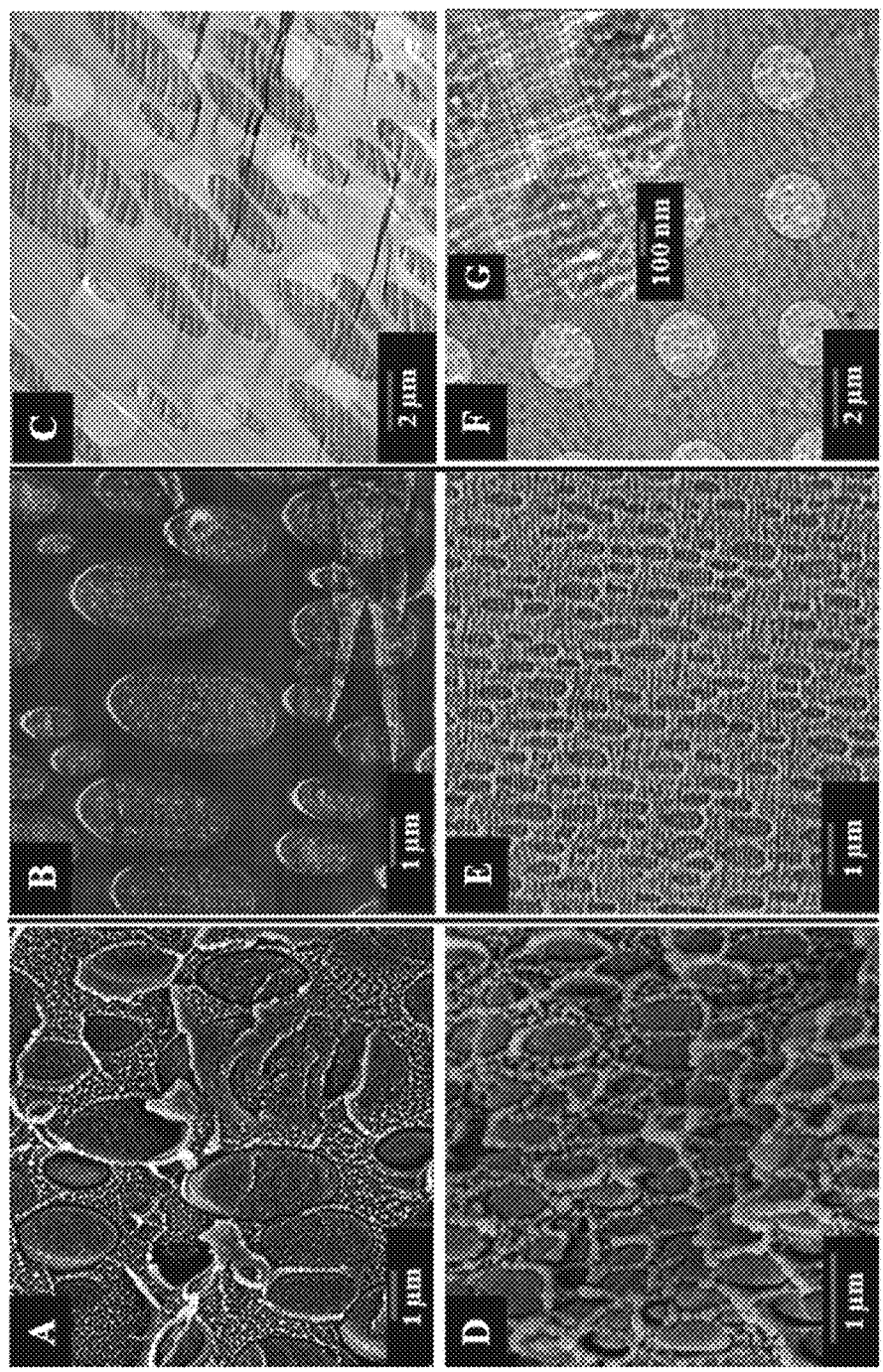
FIGS. 21A-21G show SEM (FIG. 21A), AFM (FIG. 21B), and TEM (FIG. 21C) images of 6FDD:PBI (50:50) blend membrane cross-sections and SEM (FIG. 21D), AFM (FIG. 21E), and TEM (FIGS. 21F & 21G) images of 5% (w/w) ZIF-8 6FDD:PBI (50:50) membrane cross-sections.

The membrane microstructure was confirmed by SEM, AFM and TEM imaging. The morphology of the 6FDD:PBI (50:50) membrane was investigated with SEM imaging on freeze-fractured cross-sections (FIG. 19A). To confirm the identities of the dispersed and continuous phases, samples of the membranes were subjected to Sohxlet extraction using THF, which selectively removed 6FDD. FIG. 19B shows an SEM image of a 6FDD:PBI (50:50) THF-extracted membrane confirming that the dispersed phase is 6FDD and the continuous phase is PBI. When 5% (w/w) ZIF-8 was incorporated into the 6FDD:PBI (50:50) blend, the domain sizes of the 6FDD became smaller and more uniform compared to the pure polymer blend (FIG. 19C). This effect can be further illustrated by the histograms in FIGS. 20A & 20B. For the 6FDD:PBI (50:50) blend (FIG. 20A) the average domain size of the dispersed phase is large and shows a wide distribution (1.46±0.60 µm). However, when only 5% (w/w) ZIF-8 was added to the same blend (FIG. 20B), the average domain size decreased to 330±70 nm. Not only did the dispersed domains become smaller, but they also became more uniform in size upon the incorporation of ZIF-8.

AFM and TEM images (FIGS. 21A-21G) were also acquired for both membranes and compared with SEM images. Similar to the SEM images, the AFM and TEM images show that the domain size of the dispersed phase becomes smaller and more uniform upon the addition of ZIF-8.

Figure 22:
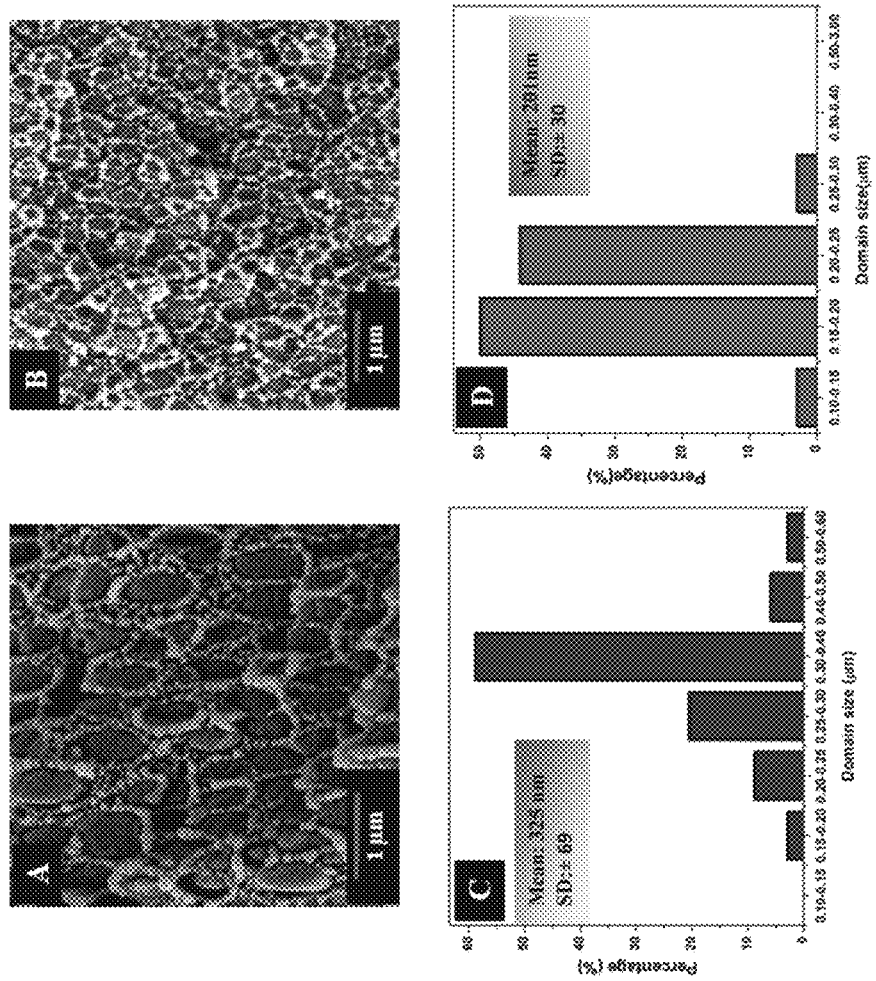
FIGS. 22A-22D show SEM images of 6FDD:PBI (50:50) with 5% (w/w) ZIF-8 (FIG. 22A), and 10% (w/w) ZIF-8 (FIG. 22B) and histogram with 6FDD:PBI (50:50) with 5% (w/w) ZIF-8 (FIG. 22C) and 10% (w/w) ZIF-8 (FIG. 22D).

As the ZIF-8 loading was increased to 10% (w/w), the domain size of the 6FDD phase became even smaller in size (FIGS. 22A & 22B). The average diameter of the dispersed phase decreased to 200±30 nm, which is a 100 nm reduction compared to that of the 5% (w/w) ZIF-8 MMM (FIGS. 22C & 22D).

iii. Compatibilization of 6FDD with ZIF

As seen in FIGS. 19-22, it is clear that the 6FDD domain sizes in the MMMs have been reduced significantly and have become more uniform in size upon the addition of ZIF-8 as compared to those of the pure polymer blend. This result shows that the compatibilizing efficiency of ZIF-8 in 6FDD:PBI blends is significant even at low ZIF-8 concentrations. A similar observation was reported by Wu and coworkers in compatibilizing a polyamideepolyphenylene oxide immiscible polymer blend using graphene oxide sheets (Cao et al., 2012). Wu et al. also observed that when the graphene oxide concentration was increased, the size of the dispersed phase domains became even smaller.

The compatibilization observed here can be attributed to both thermodynamic and kinetic factors. In the fabrication of the pure polymer blend membranes, when the two polymer solutions were mixed together, the solution remained clear, suggesting that the two polymer phases were well-mixed in the presence of excess solvent. However, as the solvent evaporated, the solution became turbid due to phase separation. Normally, in a phase-separated polymer blend, phase coarsening takes place with time as a result of coalescence lowering the interfacial tension (Isayev, 2010). In the pure polymer blend membrane this process results in a non-uniform distribution of the domain sizes of the dispersed phase. In the MMMs, with the ZIF-8 nanoparticles being dispersed first in PBI prior to the addition of 6FDD, the phase separation of the two polymers still takes place upon solvent evaporation, but under a restriction for coalescence of the dispersed 6FDD domains.

This phenomenon is well known in emulsion chemistry, where certain additives can compatibilize immiscible polymers by inhibiting coalescence (Harrats, 2006 and Fenouillot et al., 2009). Likewise, nano fillers have also been shown to compatibilize immiscible polymer blends due to the restriction of coalescence (Feng et al., 2004, Sinha et al., 2004 and Hong et al., 2006). Furthermore, as the ZIF-8 loading increases, the domain size becomes even smaller due to greater restriction for coalescence.

Example 6—Additional Polymer Components

6FDA-DAM:DABA(3:2) (6FDD) has been used due to the high $H_2$ gas permeability (~100 Barrers) and high thermal stability ($T_g$ of 450° C.) which are relevant for actual industrial conditions. The other 6FDA based co-polyimides can also be used, such as 6FDA-durene and 6FDA-DAM as the highly permeable polymer (structures).

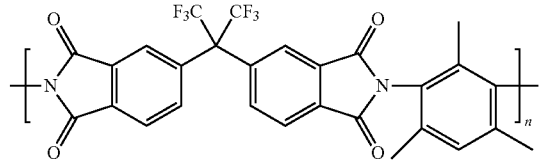

a

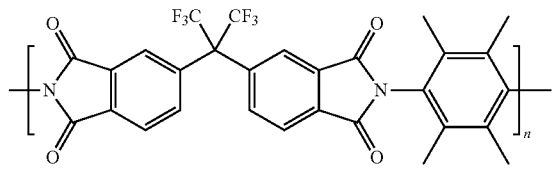

b

Furthermore, 6FDD with different compositions like 6FDA-DAM:DABA (4:1) and 6FDA-DAM:DABA (9:1) are also possible candidates as highly gas permeable polymers (shown below). Since the compatibilizing effect under thermodynamic control depends on the surface energies of the polymers and compatibilizer, the use 6FDA based polyimides are promising candidates due to similar surface properties.

TABLE 3

Gas separation properties of the membranes with different 6FDD:PBI blend ratios

| Blend Ratio | P—$H_2$ (Barrers) | P—$CO_2$ (Barrers) | α-$H_2/CO_2$ |
|---|---|---|---|
| 6FDD:PBI (10:90) | 2.3 | 0.2 | 11.5 |
| 6FDD:PBI (50:50) | 7.5 | 0.73 | 10.3 |
| 6FDD:PBI (70:30) | 44 | 23.1 | 1.9 |
| PBI | 1.1 | 0.1 | 11 |
| 6FDD | 100 | 52.6 | 1.9 |

Since the compatibilization effect of 2-MI is governed by the surface energies between the polymers as mentioned previously, the use of 2-MI is not only limited to 6FDD:PBI (50:50) blend, but can also be used with other blend ratios as well. However, the amount of 2-MI needed to compatibilize different blend ratios could be varied with the blend composition.

PBI has been selected for the fabrication of blends due to the high $H_2/CO_2$ selectivity and thermal stability (Tg of ~420° C.). However, this approach can also be applied to other polymers which are more selective for other industrially relevant gas pairs such as $CO_2/CH_4$, $CO_2/N_2$ and $O_2/N_2$ separations.

Furthermore, other small molecules structurally related to 2-MI are also capable of compatibilizing 6FDD:PBI polymer blends. 2-Ethylimidazole (2-EI) and 2-Phenylimidazole

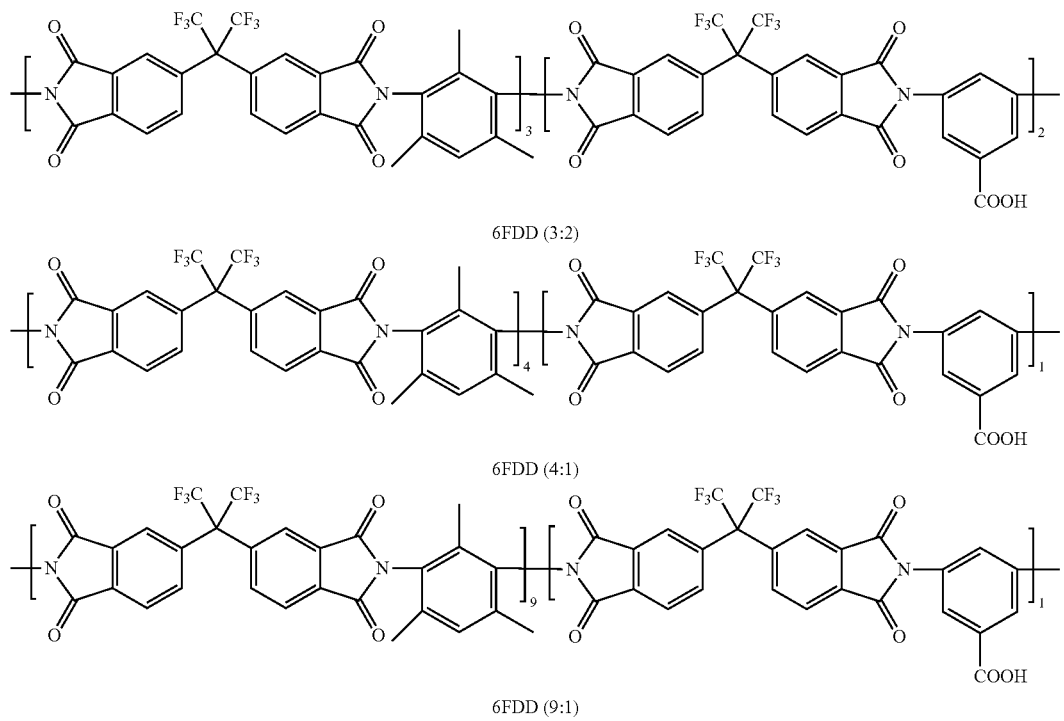

6FDD (3:2)

6FDD (4:1)

6FDD (9:1)

Figure 23:
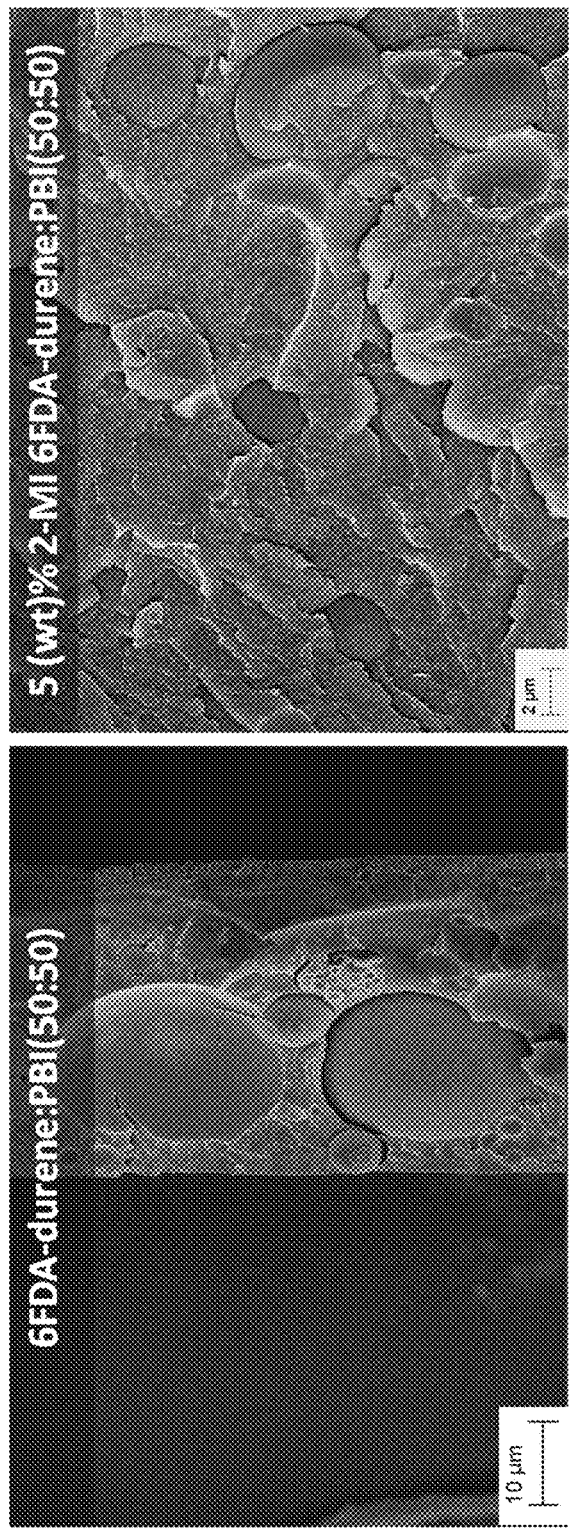
FIG. 23 shows cross-sectional SEM images of the 6FDA-durene:PBI (50:50) blend membrane with and without 2-methylimidazole (2-MI).

The SEM image in FIG. 23 shows the compatibility effect of 2-MI in 6FDA-durene:PBI (50:50) blends as an example.

Another possible variation of the system is the change of blend ratio. In this disclosure 6FDD:PBI (50:50) blend ratio has been used as the model composition, depending on the superior gas separation properties shown compared to the other blend ratios (Table 3).

Figure 24:
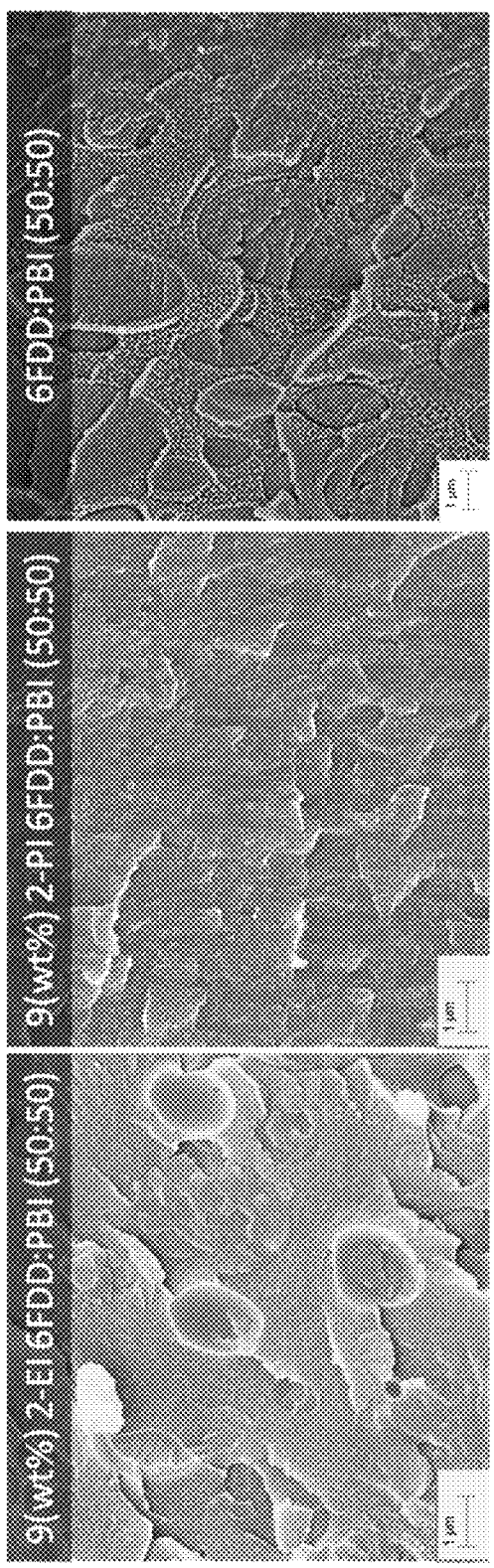
FIG. 24 shows a cross-sectional SEM images of the 6FDD:PBI (50:50) blend membrane with (2-ethylimidazole (2-EI) and 2-phenylimidazole(2-PI)) and without small molecule compatibilizers.

(2-PI) are two such examples. Similar to 2-MI, the domain size of the dispersed 6FDD phase becomes more uniform and small upon the incorporation of 2-EI and 2-PI compared to the uncompatibilized 6FDD:PBI (50:50) blend (FIG. 24).

This indicates enhanced compatibility between the polymers due to the incorporation of 2-EI and 2-PI. These small molecules have different melting and boiling points leading to slightly different properties. Without wishing to be bound by any theory, changes in the annealing temperature can affect and change the gas permeability and selectivity of the polymer composition.

Example 7—Carbon Molecular Sieve Membranes

A. Materials

All chemicals and solvents were used as received without further drying and exceptions are noted. Both anhydrous 1-methyl-2-pyrrolidone (NMP, 99.8% purity), 2-methylimidazole, 2-ethylimidazole and durene diamine were purchased from Sigma Aldrich. Anhydrous dimethyl acetamide (DMAc, 99.8% purity) was purchased from EMD chemicals. 4,4-(hexafluoroisopropylidene) diphthalic anhydride (6FDA, >99% purity) was purchased from Akron Polymer Systems Inc. and was dried under vacuum at 150° C. prior to use. 2,4,6-Trimethyl-1,3-phenylenediamine (DAM, >97% purity) was purchased from TCI America and purified further by vacuum sublimation. 3,5-Diaminobenzoic acid (DABA, 98% purity) was purchased from Sigma-Aldrich and was purified by recrystallization from water. Polybenzimidazole (PBI) was purchased from PBI Performance Inc. (26 wt. % in DMAc, 1.5% (w/w) LiCl, Mw ~30000) and was used as received.

B. Synthesis of 6FDA-DAM:DABA (6FDD, 3:2 Molar Ratio) Polyimide

The synthesis of 6FDD (Scheme 1) was carried out using thermal imidization (in NMP) following a published procedure (Hosseini, et al.). This method yielded a pale brown colored with $M_w$ of 30000 and PDI of 2.5.

Scheme 1: Synthesis of 6FDA-DAM: DABA (3:2) co-polyimide

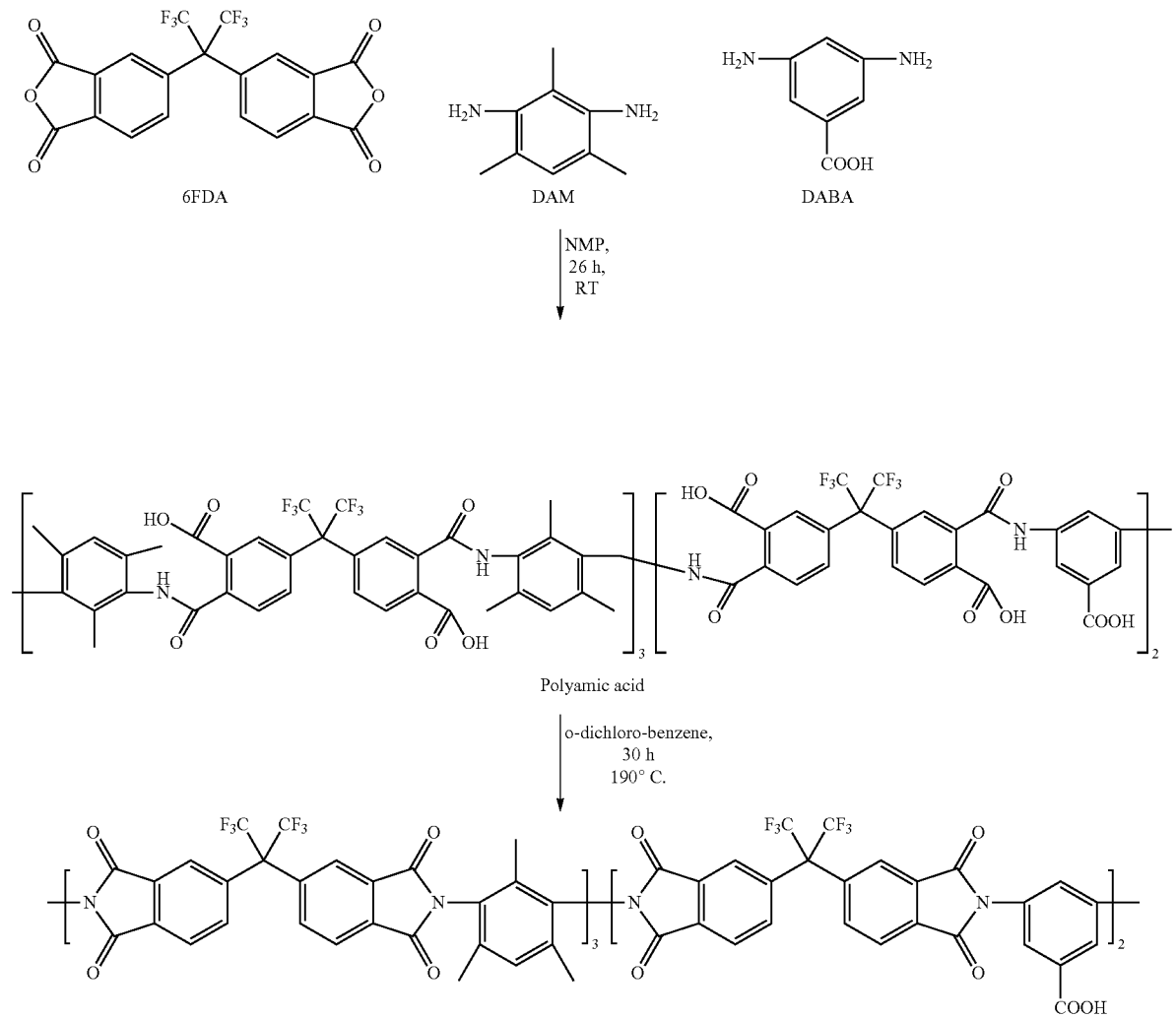

C. Membrane Fabrication

Separate solutions of ~2% (w/w) PBI and 6FDD were prepared in DMAc by stirring at 80° C. for 24 h. In the preparation of polymer blends, solutions of 6FDD were always added to PBI solutions. The total polymer concentration of the final polymer mixture solution was ~2% (w/w). To induce phase separation as well as to concentrate the blend solution, excess DMAc was evaporated at 80° C. The concentrated polymer solutions were then cast onto a glass substrate using a Sheen automatic applicator (1133N) equipped with a doctor blade. The membranes were initially dried using a heated casting table (50° C. for 12 hrs) under a $N_2$ flow. Finally, the membranes were peeled off from the glass substrate and annealed further under vacuum using a heating cycle of 80° C. for 24 h, 150° C. for 12 h, 200° C. for 12 h and 250° C. for 24 h, followed by cooling down to room temperature under vacuum.

The 2-MI compatibilized membranes were fabricated in the same way as the polymer blend membrane, but with the addition of a 2-MI solution. The weight ratio of 9% [(weight of 2-MI/(total polymer weight+2-MI weight)] in DMAc were prepared separately and subjected to alternate stirring and sonication (15 min each) to ensure good dispersion. This cycle was repeated for two hours and then ⅓ of the PBI solution was added to the dispersion. The resulting 2-MI polymer dispersion was stirred for 30 min and sonicated for another 30 min. This cycle was repeated twice and then the rest of the PBI was added and stirred at 80° C. for 12 h in a closed glass vial. After that the 6FDD polymer solution was added dropwise to the 2-MI/PBI mixture and stirred further. Finally, excess DMAc was evaporated by at 80° C. Casting, drying and annealing of the membranes were performed using the same protocol as for the polymer blends. Same protocol was followed in the preparation of membranes using 2-EI and DuDAM (1,4-diaminodurene). Carbonization of the membranes were performed following a temperature programs shown below under maximum of 800 (FIG. 25A) and 550° C. (FIG. 25B) temperature under $N_2$ purge.

D. Characterization i. Characterization of 6FDD

The chemical structure of 6FDD was confirmed by $^1$H NMR spectroscopy using a Bruker AVANCE III™ 500 NMR instrument. Samples were prepared in deuterated dimethyl sulfoxide with TMS as the internal standard. Molecular weight ($M_w$) was determined ($M_w$ 170000, PDI 2.3) on a gel permeation chromatography (Viscotek GPC-max, VE2001) system equipped with a Viscotek TDA 302 Triple Array Detector and two ViscoGEL I-Series (I-MB-HMW 3078, Viscotek) columns in series. THF at a flow rate of 1 mL/min was used as the eluent, and polystyrene standards (Polymer Laboratories) were used for calibration. The chromatograms were analyzed using OmniSEC Software Version 4.6.

ii. Characterization of Membranes (SEM, Raman Spectroscopy, FTIR Spectroscopy)

Scanning electron microscope (SEM) images of membrane cross-sections were acquired using a Zeiss SUPRA®40 SEM with a field emission gun operating at 10 keV. Membrane cross-sections for SEM imaging were prepared by freeze-fracturing the samples after immersion in liquid nitrogen. These samples were coated prior to imaging using a Denton Vacuum Desk II sputter coater equipped with a gold/palladium target. Carbon membranes were not coated with gold/palladium for SEM imaging. The thicknesses of the membranes used in permeability studies were also measured by SEM. Raman spectroscopy was performed in a JobinYvon HORIBA LabRam Raman spectrometer equipped with a 633 nm He—Ne laser. Fourier transform infrared (FTIR) spectra were acquired using a Nicolet 360 FTIR spectrophotometer with a single bounce attenuated total reflectance (ATR) accessory (diamond crystal).

iii. Permeability Testing

Gas permeability testing was carried out using a custom built permeameter reported previously (Reid, et al., 2001). Pressure monitoring and valve actuations were controlled using LabVIEW 7.1 software (National Instruments). To acquire data, 1 cm$^2$ of a membrane was mounted inside a stainless steel cell, which separates the upstream side with a feed pressure of 2000 Torr from the downstream side, which is connected to a vacuum line (1 m Torr). Both upstream and downstream sides were evacuated for at least 6 h followed by a leak rate test before starting the experiments. Pressure transducers recorded upstream and downstream pressures. The steady state slope of the downstream pressure vs. time was used for permeability calculations using the solution diffusion model (Koros, et al., 1993; Ghosal, et al., 1994). Permeability was evaluated from the last 50% of the data in the steady state region. Ideal selectivities ($\alpha_{i/j}$) were calculated using the ratio of the permeabilities ($P_i/P_j$) of gases.

E. Results and Discussion i. Characterization of the Carbon Membranes Pyrolyzed membranes were investigated with Raman spectroscopy to investigate the formation of graphitic carbon. The characteristic D and G bands appear in the Raman spectrum (FIGS. 26A & 26B) indicating the formation of ordered, graphitic carbon and therefore a CMS membrane.

Figure 27:
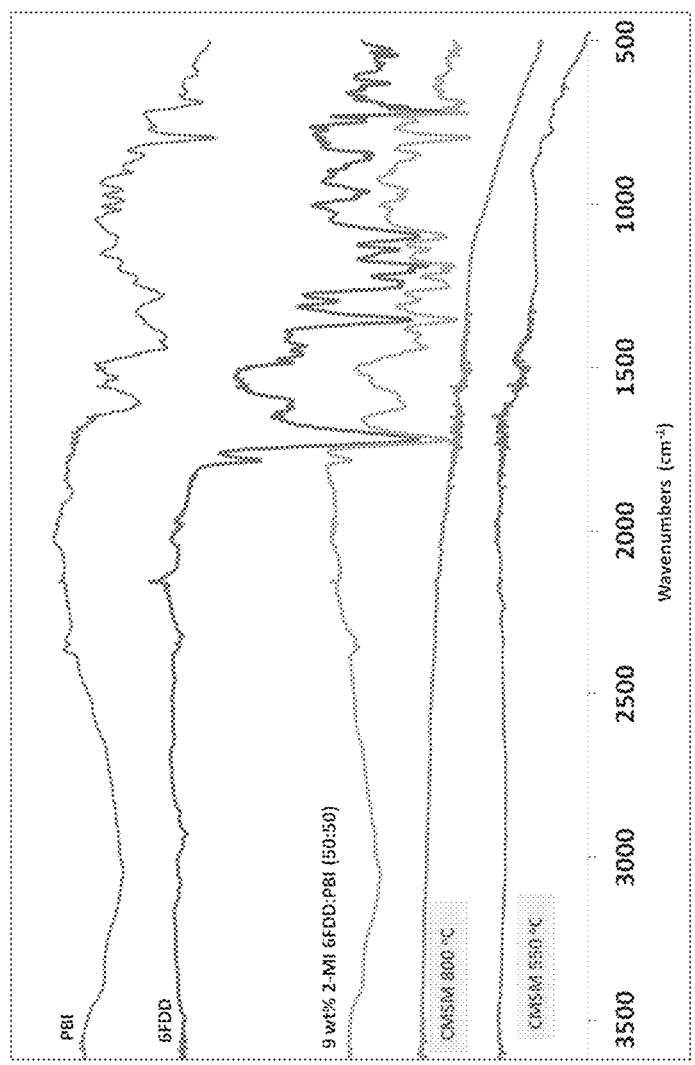
FIG. 27 shows the ATR-FTIR spectrum of CMSM carbonized at different temperatures.

A comparison of the FTIR spectra of precursor polymers and CMSM is shown in FIG. 27. The intensities of different functional groups present in precursor polymers are not observed in the CMSM. This further suggests the formation of the graphitic structure of the membranes at both carbonizing temperatures. This is consistent with the Raman spectroscopic data obtained with the CMSM.

The SEM images (FIGS. 28A-28C) obtained of CMSM carbonized at 800° C. show a uniform morphology compared to the precursor membrane. This morphology can be attributed to the formation of a carbonized material from the precursor blend and therefore the morphological differences between immiscible polymers are no longer visible at this magnification. However, the SEM images of the same membrane carbonized at 550° C. shows the presence of matrix-droplet type morphology.

CMSM derived from 2-EI were also investigated using SEM and Raman spectroscopy. These membranes were carbonized only at 550° C. due to the better mechanical properties of the membranes carbonized at 550° C. compared to the one carbonized at 800° C.

Figures 28A, 28B, 28C:
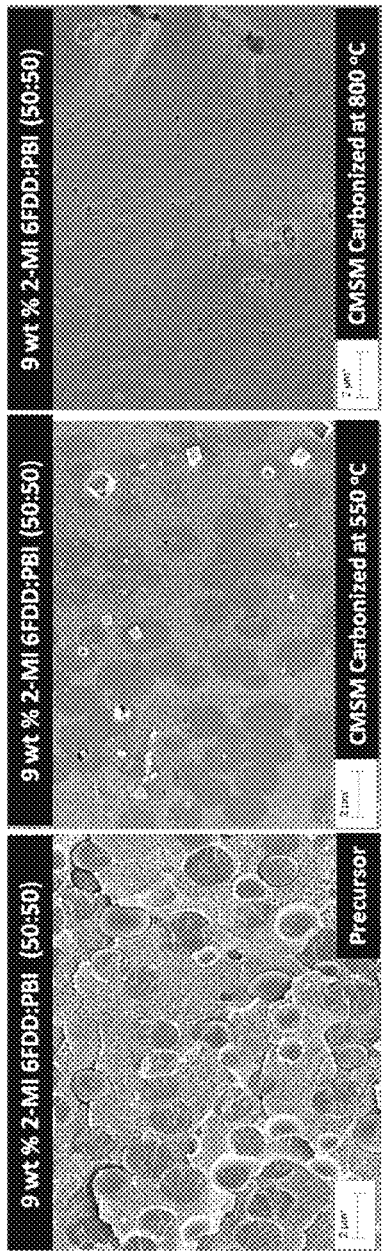
FIGS. 28A-28C show the SEM images of the membrane cross section before (FIG. 28A), and after pyrolysis at 550° C.
Figures 29A, 29B, 29C, 29D:
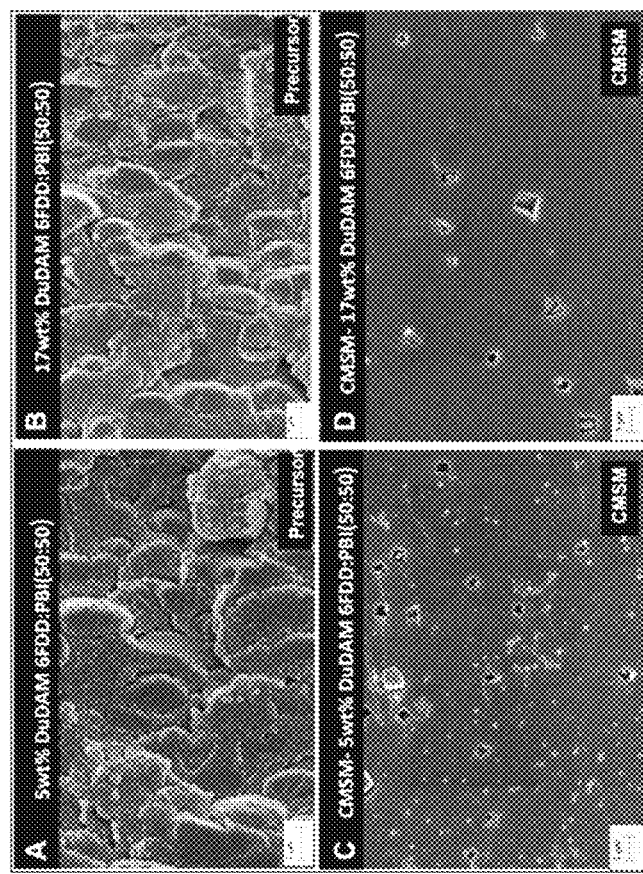
FIGS. 29A-29D show the SEM images of the DuDAM-6FDD:PBI (50:50) membrane cross-sections before and after pyrolysis.
Figures 30A, 30B, 30C, 30D:
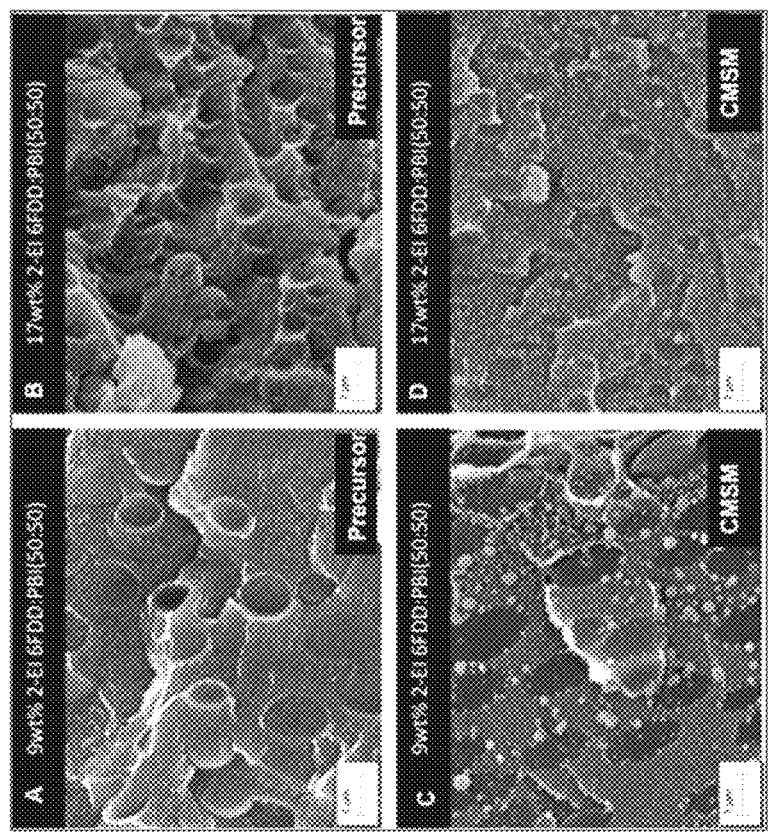
FIGS. 30A-30D show the SEM images of the 2-EI-6FDD:PBI (50:50) membrane cross-sections before and after pyrolysis.
Figures 31A, 31B, 31C, 31D:
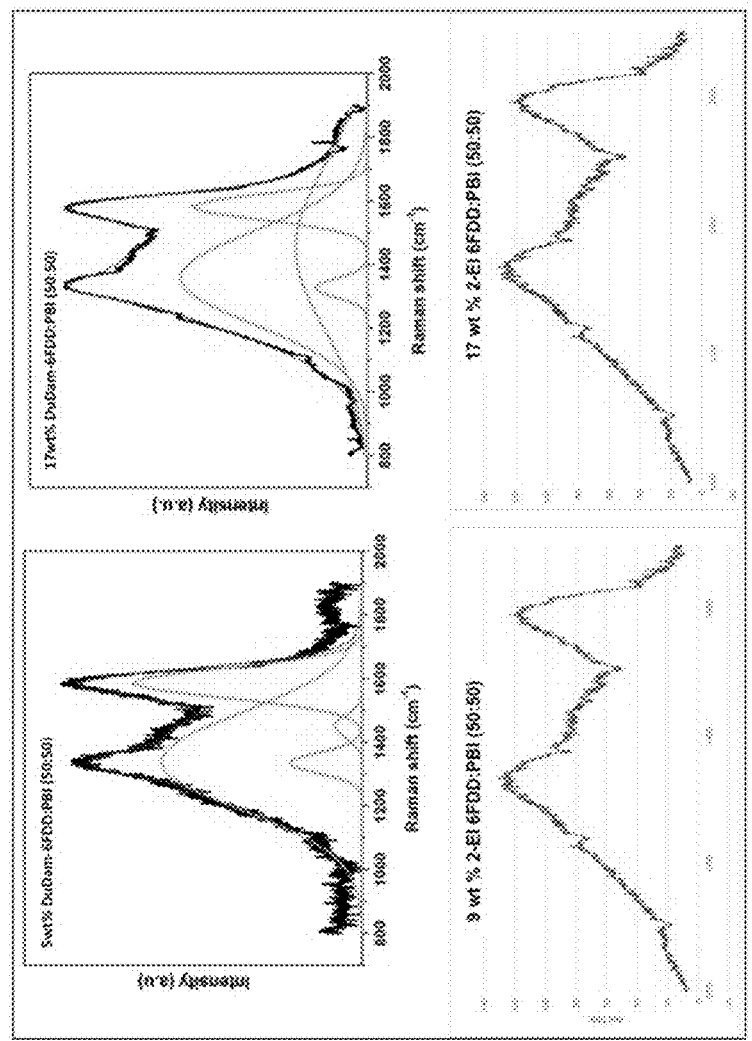
FIGS. 31A-31D show the Raman spectra of CMSM derived from 6FDD:PBI (50:50) with different loadings of DuDAM and EI.

SEM images of the DuDAM compatibilized CMSM demonstrated a uniform morphology (FIG. 29A-29D), where the phase separated morphology is not evident. This is similar to 2-MI incorporated CMSM, carbonized at 800° C. (FIGS. 28A-28C). This could be an indication of the higher degree of carbonization as a result of the addition of DuDAM. However, the SEM images obtained of the 2-EI added CMSM (FIGS. 30A-30D) show the matrix-droplet morphology similar to that of 2-MI added membranes carbonized at 550° C. These results suggest that there could be a contribution from the added small molecule to the degree of carbonization.

The Raman spectra (FIGS. 31A-31D) of the CMSM show a higher degree of carbonization with the DuDAM added CMSM compared to that of the 2-EI added membranes. The D and the G bands of the Raman spectra are much narrower and more apparent in the DuDAM added membranes compared to that of 2-EI added membranes.

ii. Gas Permeability Properties

TABLE 4

Gas permeability properties of the membranes

| Membrane | P—$H_2$ | P—$CO_2$ | $\alpha$-$H_2$/$CO_2$ |
|---|---|---|---|
| 6FDD:PBI (50:50) | 7.54 | 0.73 | 11.05 |
| 9 wt % 2-MI 6FDD:PBI (50:50) | 4.0 | 0.10 | 40 |

TABLE 4-continued

Gas permeability properties of the membranes

| Membrane | P—$H_2$ | P—$CO_2$ | $\alpha$-$H_2$/$CO_2$ |
|---|---|---|---|
| 6FDD | 100 | 52.60 | 1.9 |
| PBI | 1.11 | 0.1 | 11.1 |
| CMSM 9 wt % 2-MI 6FDD:PBI (50:50)[b] | 26.5 | 0.52 | 50.9 |
| CMSM 9 wt % 2-MI 6FDD:PBI (50:50)[b] | 64.0 | 3.61 | 17.2 |
| 9 wt % 2-EI 6FDD:PBI (50:50) | 6.0 | 0.4 | 15 |
| CMSM 9 wt % 2-EI 6FDD:PBI (50:50)[b] | 253 | 41 | 6.2 |
| 17 wt % 2-EI 6FDD:PBI (50:50) | 3.8 | 0.24 | 16 |
| CMSM 17 wt % 2-EI 6FDD:PBI (50:50)[b] | 392.25 | 160 | 2.5 |
| 5 wt % DuDAM 6FDD:PBI (50:50) | 10 | 1.65 | 6.06 |
| CMSM 5 wt % 2-DuDAM 6FDD:PBI (50:50)[b] | 84.4 | 13.3 | 6.3 |
| 17 wt % DuDAM 6FDD:PBI (50:50) | 8.83 | 1.12 | 7.40 |
| CMSM 17 wt % 2-DuDAM 6FDD:PBI | 76.1 | 14.2 | 5.4 |

Pure gas permeability measured in Barrers, under 2000 Torr pressure at 35° C.
[b]gas permeability property was measured under 4000 Torr pressure at 35° C.

Compared to both compatibilized and non-compatibilized 6FDD:PBI (50:50) blend membranes gas permeability has increased in the carbon membrane. Without wishing to be bound by any theory it is believed that this increase in permeability may be attributed to the formation of carbonized membrane microstructure where micropores are generated to improve permeability. As the degree of carbonization is increased, a unique pore structure is generated which selectively lets the $H_2$ gas pass through compared to that of $CO_2$. Therefore, as the carbonization temperature is increased, the gas permeability has dropped but the selectivity has improved significantly. Without wishing to be bound by any theory, it is believed that the improvement in higher selectivity may be attributed to the decrease in the pore size, additional compaction of the structure which eventually leads to the decrease in the large pores and to narrow pore size distribution (OMole, et al., 2008).

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope and concept of the disclosure as defined by the appended claims.

VII. REFERENCES

The following references, to the extent that they provide exemplary procedural or other details supplementary to those set forth herein, are specifically incorporated herein by reference:

Bae et al., Angew. Chem. Int. Ed., 49, 9863-9866, 2010.
Baker and Lokhandwala, Ind. Eng. Chem. Res., 47, 2109-21, 2008.
Baker, Ind. Eng. Chem. Res., 41, 1393-411, 2002.
Bernardo, et al., Ind. Eng. Chem. Res., 48, 4638-63, 2009.
Cao et al., ACS Nano, 5:5920e7, 2012.
Chung et al., ACS Macro Letters, 1, 252-256, 2012.
Chung et al., S. Prag. Polym. Sci., 32, 483-507, 2007.
Feng et al., M. Polym Int., 53:1529e 37, 2004.
Ghosal et al., Polym. Adv. Technol., 331, 21, 1994.
Goodarzi et al., Membr. Sci., 445, 76-87, 2013.
Fenouillot et al., Polymer, 50:1333e50, 2009.
Harrats and Groeninckx, Micro and nanostructured multiphase polymer blend systems: phase morphology and interfaces, 2006.
Hong et al., Polymer, 47:3967e75, 2006.
Hosseini and Chung, J. Membr. Sci., 328, (1-2), 174-185, 2009.
Hosseini et al., Polymer, 49, (6), 1594-1603, 2008.
Isayev, Encyclopedia of polymer blends In Fundamentals, vol. 1, 2010.
Khan et al., J. Membr. Sci., 380, 55-62, 2011.
Koros et al., J. Membr. Sci., 83, 1, 1993.
Kumbharkar et al., J. Membr. Sci., 375, 231-240, 2011.
Li et al., Polymer, 42, 6859-6869 22, 2001.
Liu and Li, J Appl Polym Sci, 117, 3220-3227, 2010.
Lively et al., J. Membr. Sci., 423-424, 302-313, 2012.
Low et al., Carbon, 49, 2104-2112, 2011.
Ma et al., Carbon, 62, 88-96, 2013.
Madaeni et al., Asia Pac. J. Chem. Eng., 7, 747-754, 2011.
Mannan, Chem Eng Technol., 36, 1838-1846, 2013.
Ning and Koros, Carbon, 66, 511-522, 2014.
Omole et al., Macromolecules, 41:6367e75, 2008.
Ordonez et al., J. Membr. Sci., 361, 28-37, 2010.
Park et al., Science, 318, 254-258, 2007.
Paul, Science, 335, 413, 2012.
Perez et al., J. Membr. Sci., 328, 165-173, 2009;
Qiu et al., Macromolecules, 44, 6046-6056, 2011.
Qu, Acta Crystallographica Section E, 63(10), 4071, 2007.
Reid et al., Chem. Mater., 13, 2366, 2001.
Ribeiro et al., J. Membr. Sci., 377, 110-123, 2011.
Robeson, J. Membr. Sci., 320, 390-400, 2008.
Robeson, J. Membr. Sci., 62, 165-185, 1991.
Robeson, Polymer Blends: A Comprehensive Review. HANSER: 2007
Rungta et al., J. Carbon, 50, 1488, 2012.
Sakaguchi et al., Macromolecules, 38, 8327-8332, 2005.
Sanders et al., J. Membr. Sci., 409-410, 232-241, 2012.
Semsarzadeh and Ghalei, Membr. Sci., 401-402, 97-108, 2012.
Sigma Aldrich Item M50850 "2-Methylimidazole, 99%".
Sinha Ray et al., Polymer, 45:8403e13, 2004.
Suzuki, et al., Polymer, 45, 7167-7171, 2004.
U.S. Pat. No. 6,339,121
U.S. Pat. No. 8,211,689
Utracki, Polymer alloys and blends. Hanser; 1990.
Wijenayake et al., Ind. Eng. Chem. Res., 52, 6991-7001, 2013.
Yang, et al., Adv. Energy Mater. 2, 1358-1367, 2012.

What is claimed is:

1. A composition comprising a mixture of compounds comprising:

(A) a polyimide polymer of the formula:

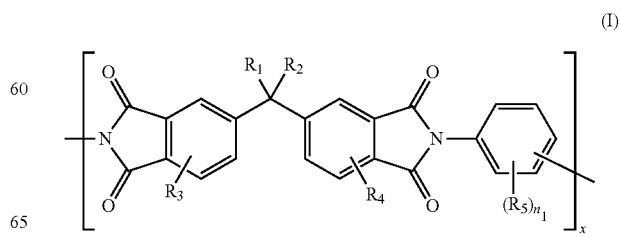

(I)

wherein:
  x is 1-500; wherein each repeating unit can have different substituents at $R_1$, $R_2$, $R_3$, $R_4$, $R_5$, and $n_1$;
  $R_1$ and $R_2$ are each independent selected from alkyl$_{(C\leq12)}$, substituted alkyl$_{(C\leq12)}$, aryl$_{(C\leq12)}$, or substituted aryl$_{(C\leq12)}$;
  $R_3$ and $R_4$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$;
  $R_5$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and
  $n_1$ is 0, 1, 2, 3, or 4;
(B) a polybenzimidazole polymer of the formula:

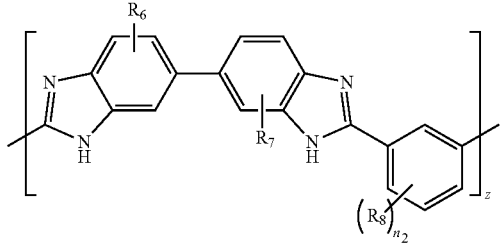

(II)

wherein:
  z is 1-200;
  $R_6$ and $R_7$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$, alkylamino$_{(C\leq12)}$, substituted alkylamino$_{(C\leq12)}$, dialkylamino$_{(C\leq12)}$, substituted dialkylamino$_{(C\leq12)}$;
  $R_8$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and
  $n_2$ is 0, 1, 2, 3, or 4; and
(C) a chemical compound of the formula:

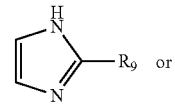

(III)

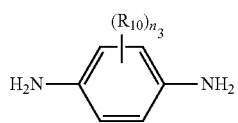

(IV)

wherein:
  $R_9$ is alkyl$_{(C\leq12)}$, aryl$_{(C\leq12)}$, aralkyl$_{(C\leq12)}$, or a substituted version of any of these groups;
  $R_{10}$ is amino, cyano, halo, hydroxy, or nitro, or alkyl$_{(C\leq8)}$, cycloalkyl$_{(C\leq8)}$, alkoxy$_{(C\leq8)}$, acyl$_{(C\leq8)}$, amido$_{(C\leq8)}$, acyloxy$_{(C\leq8)}$, alkylamino$_{(C\leq8)}$, dialkylamino$_{(C\leq8)}$, or a substituted version of any of these groups;
  $n_3$ is 0, 1, 2, 3, or 4.

2. The composition of claim 1, wherein the compound of formula I is further defined as:

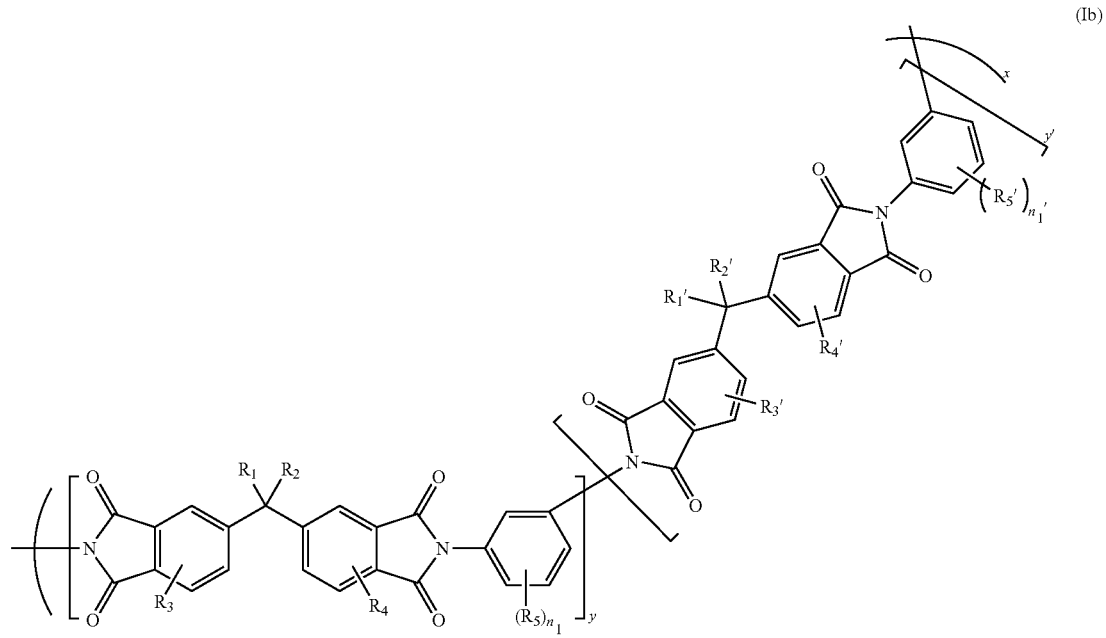

(Ib)

wherein:
  y and y' are each independently selected from 0, 1, 2, 3, 4, 5, 6, 7, 8, 9, or 10, provided that the sum of y and y' is greater than 1 and less than 10 and the product of x and the sum of y and y' is less than 500;
  $R_1$, $R_2$, $R_1'$, and $R_2'$ are each independent selected from alkyl$_{(C\leq12)}$, substituted alkyl$_{(C\leq12)}$, aryl$_{(C\leq12)}$, or substituted aryl$_{(C\leq12)}$;
  $R_3$, $R_4$, $R_3'$ and $R_4'$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$;
  $R_5$ and $R_5'$ are each independently selected from hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and
  $n_1$ and $n_1'$ are each independently selected from 0, 1, 2, 3, or 4.

3. The composition of claim 2, wherein $R_1$, $R_2$, $R_1^1$, and $R_2'$ are fluoroalkyl$_{(C\leq12)}$.

4. The composition of claim 2, wherein $R_5$ is alkyl$_{(C\leq12)}$ or substituted alkyl$_{(C\leq12)}$ or carboxy.

5. The composition of claim 2, wherein $R_5'$ is alkyl$_{(C\leq12)}$ or substituted alkyl$_{(C\leq12)}$ or carboxy.

6. The composition of claim 2, wherein y is 2, 3, 4, 5, 8, 9, or 10.

7. The composition of claim 2, wherein y' is 1, 2, 3, 4, or 5.

8. The composition of claim 1, wherein (C) is a compound of the formula:

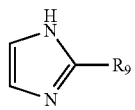

(III)

wherein:
  $R_9$ is alkyl$_{(C\leq12)}$, aryl$_{(C\leq12)}$, aralkyl$_{(C\leq12)}$, or a substituted version of any of these groups.

9. The composition of claim 1, wherein the composition of the polymer of formula I and the polymer of formula II are immiscible when the chemical compound is not present but are miscible when the chemical compound is present.

10. The composition of claim 1, wherein the composition comprises from about 1 wt % to about 20 wt % of the chemical compound of formula III.

11. A membrane formed from the composition of claim 1.

12. A method of preparing a composition comprising admixing an immiscible polyimide polymer with polybenzimidazole polymer with a small molecule compatibilizer agent to obtain the composition, wherein the composition comprises a mixture of the polyimide and polybenzimidazole, and wherein the mixture comprises a polymer domain of less than 1.25 μm.

13. The method of claim 12, wherein the small molecule compatibilizer agent has the formula:

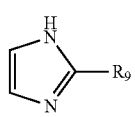

(III)

wherein:
  $R_9$ is alkyl$_{(C\leq12)}$, aryl$_{(C\leq12)}$, aralkyl$_{(C\leq12)}$, or a substituted version of any of these groups.

14. The method of claim 12, wherein the polybenzimidazole has the formula:

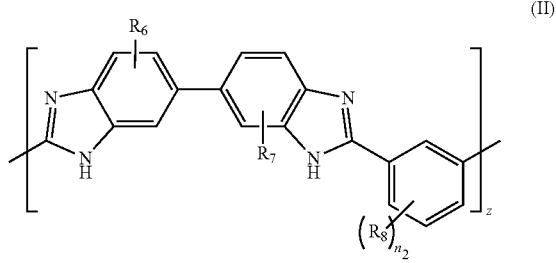

(II)

wherein:
  z is 1-200;
  $R_6$ and $R_7$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$, alkylamino$_{(C\leq12)}$, substituted alkylamino$_{(C\leq12)}$, dialkylamino$_{(C\leq12)}$, substituted dialkylamino$_{(C\leq12)}$;
  $R_8$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and
  $n_2$ is 0, 1, 2, 3, or 4.

15. The method of claim 12, wherein the polyimide has the formula:

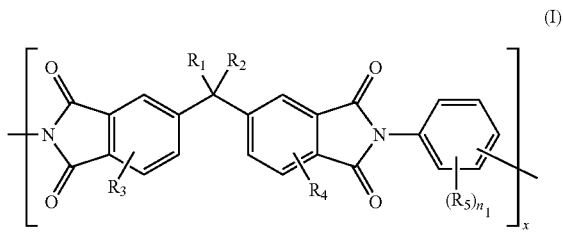

(I)

wherein:
  x is 1-500; wherein each repeating unit can have different substituents at $R_1$, $R_2$, $R_3$, $R_4$, $R_5$, and $n_1$;
  $R_1$ and $R_2$ are each independent selected from alkyl$_{(C\leq12)}$, substituted alkyl$_{(C\leq12)}$, aryl$_{(C\leq12)}$, or substituted aryl$_{(C\leq12)}$;
  $R_3$ and $R_4$ are each independently selected from hydrogen, halo, hydroxy, amino, cyano, carboxy, nitro, alkyl$_{(C\leq12)}$, substituted alkyl$_{(C\leq12)}$, alkoxy$_{(C\leq12)}$, or substituted alkoxy$_{(C\leq12)}$;
  $R_5$ is hydrogen, halo, hydroxy, amino, cyano, carboxy, nitro, alkyl$_{(C\leq12)}$, substituted alkyl$_{(C\leq12)}$, aryl$_{(C\leq12)}$, substituted aryl$_{(C\leq12)}$, alkoxy$_{(C\leq12)}$, or substituted alkoxy$_{(C\leq12)}$; and
  $n_1$ is 0, 1, 2, 3, or 4.

16. The method of claim 15, wherein the polyimide is further defined as:

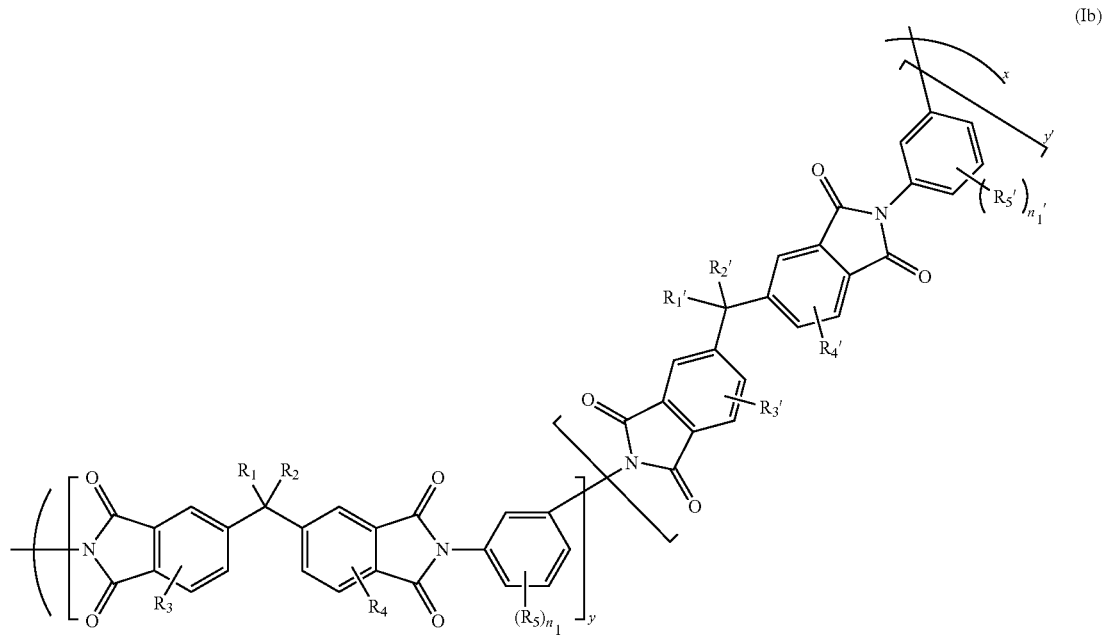

wherein:
- y and y' are each independently selected from 0, 1, 2, 3, 4, 5, 6, 7, 8, 9, or 10, provided that the sum of y and y' is greater than 1 and less than 10 and the product of x and the sum of y and y' is less than 500;
- $R_1$, $R_2$, $R_1'$, and $R_2'$ are each independent selected from alkyl$_{(C \leq 12)}$, substituted alkyl$_{(C \leq 12)}$, aryl$_{(C \leq 12)}$, or substituted aryl$_{(C \leq 12)}$;
- $R_3$, $R_4$, $R_3'$ and $R_4'$ are each independently selected from hydrogen, halo, hydroxy, amino, cyano, carboxy, nitro, alkyl$_{(C \leq 12)}$, substituted alkyl$_{(C \leq 12)}$, alkoxy$_{(C \leq 12)}$, or substituted alkoxy$_{(C \leq 12)}$;
- $R_5$ and $R_5'$ are each independently selected from hydrogen, halo, hydroxy, amino, cyano, carboxy, nitro, alkyl$_{(C \leq 12)}$, substituted alkyl$_{(C \leq 12)}$, aryl$_{(C \leq 12)}$, substituted aryl$_{(C \leq 12)}$, alkoxy$_{(C \leq 12)}$, or substituted alkoxy$_{(C \leq 12)}$; and
- $n_1$ and $n_1'$ are each independently selected from 0, 1, 2, 3, or 4.

17. A method of preparing a carbon molecular sieve membrane comprising:
(A) obtaining a membrane from the composition of claim 12; and
(B) heating the membrane to a temperature from about 400° C. to about 1000° C.

18. A method of using a composition of claim 1 to separate one gas from a mixture of two or more gases comprising:
A) exposing the mixture of two or more gases to the composition, wherein one or more gases is absorbed to the composition to a greater extent than the other one or more gases;
B) separating the one or more non-absorbed gases from the one or more absorbed gases.

19. The method of claim 18, wherein the gas mixture is hydrogen and carbon dioxide.

20. A carbon molecular sieve membrane formed from the composition of claim 1.

21. The composition of claim 20, wherein the carbon molecular sieve membrane comprises a matrix-droplet type morphology.

* * * * *